United States Patent [12]
Sato

(10) Patent No.: US 11,451,725 B2
(45) Date of Patent: Sep. 20, 2022

(54) SOLID-STATE IMAGING ELEMENT, IMAGING APPARATUS, AND METHOD FOR CONTROLLING SOLID-STATE IMAGING ELEMENT

(71) Applicant: Sony Semiconductor Solutions Corporation, Kanagawa (JP)

(72) Inventor: Mamoru Sato, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 149 days.

(21) Appl. No.: 17/051,675

(22) PCT Filed: Mar. 18, 2019

(86) PCT No.: PCT/JP2019/011034
§ 371 (c)(1),
(2) Date: Oct. 29, 2020

(87) PCT Pub. No.: WO2020/003646
PCT Pub. Date: Jan. 2, 2020

(65) Prior Publication Data
US 2021/0092311 A1 Mar. 25, 2021

(30) Foreign Application Priority Data

Jun. 27, 2018 (JP) .............................. JP2018-122328

(51) Int. Cl.
*H04N 5/3745* (2011.01)
*H04N 5/355* (2011.01)
*H04N 5/378* (2011.01)

(52) U.S. Cl.
CPC ............. *H04N 5/355* (2013.01); *H04N 5/378* (2013.01); *H04N 5/37457* (2013.01)

(58) Field of Classification Search
None
See application file for complete search history.

(56) References Cited

U.S. PATENT DOCUMENTS

2007/0177043 A1* 8/2007 Kok .................... H04N 5/37457
348/E3.018

FOREIGN PATENT DOCUMENTS

| JP | 2008-271280 A | 11/2008 |
| JP | 2016-201649 A | 12/2016 |
| WO | 2017/179319 A1 | 10/2017 |

OTHER PUBLICATIONS

International Search Report, International Application No. PCT/JP2019/011034 dated May 24, 2019.

* cited by examiner

*Primary Examiner* — Mark T Monk
(74) *Attorney, Agent, or Firm* — Michael Best & Friedrich LLP

(57) ABSTRACT

To widen a dynamic range without reducing a frame rate in a solid-state imaging element provided with a differential amplifier circuit.

The solid-state imaging element includes a reading circuit and a processing unit. The reading circuit performs processing of outputting a differentially amplified signal obtained by amplifying a difference between generated voltages of a pair of pixels and processing of outputting a pixel signal of the generated voltage of at least one of the pair of pixels each time the pair of pixels are exposed. The processing unit performs synthesis processing of synthesizing the output differentially amplified signal and the output pixel signal.

19 Claims, 32 Drawing Sheets

FIG. 13
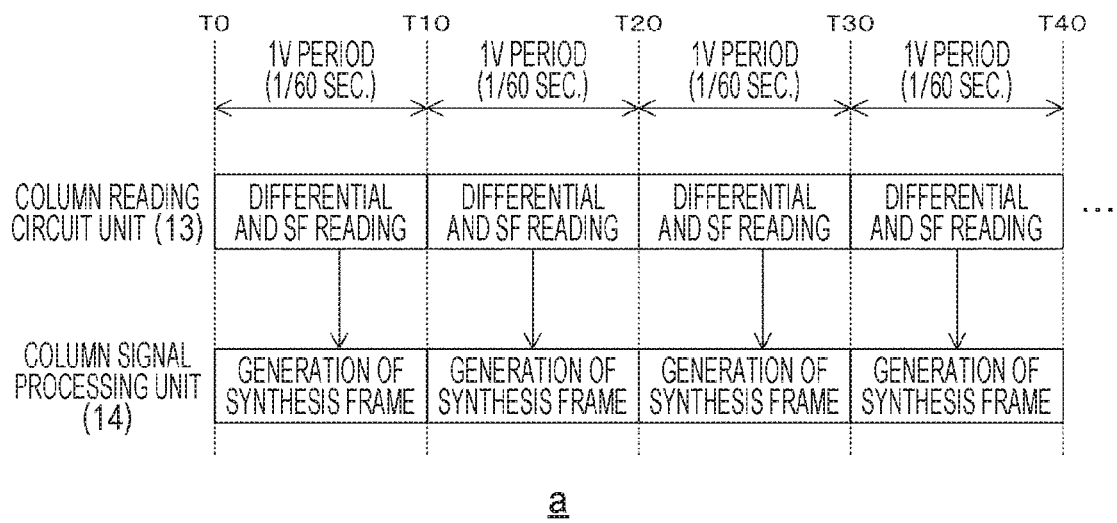
a
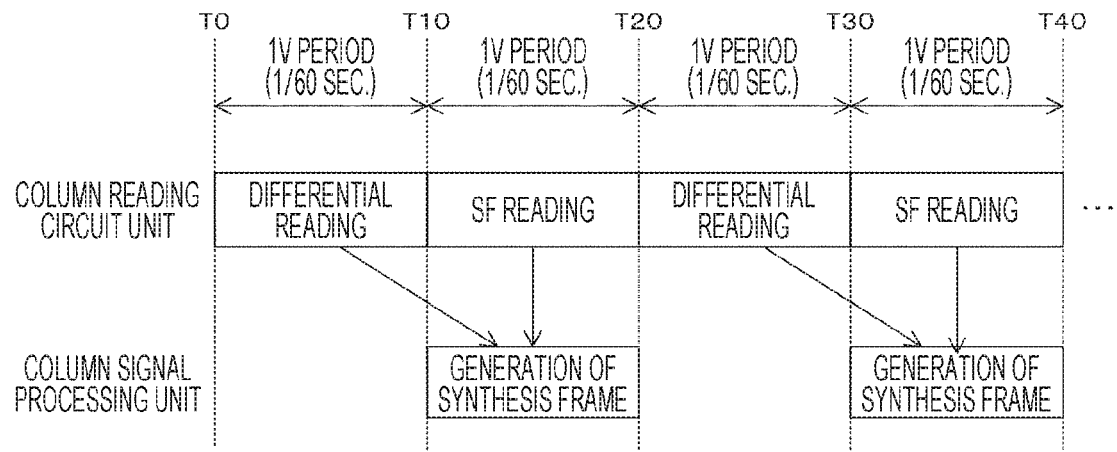
b

SOLID-STATE IMAGING ELEMENT, IMAGING APPARATUS, AND METHOD FOR CONTROLLING SOLID-STATE IMAGING ELEMENT

TECHNICAL FIELD

The present technology relates to a solid-state imaging element, an imaging apparatus, and a method for controlling a solid-state imaging element. More specifically, the present technology relates to a solid-state imaging element that differentially amplifies a pixel signal, an imaging apparatus, and a method for controlling a solid-state imaging element.

BACKGROUND ART

Conventionally, a solid-state imaging element has been used to capture image data in an imaging apparatus or the like. When the sensitivity of each pixel of the solid-state imaging element is relatively low, the image data may be dark as a whole and the image quality may be deteriorated in a case where the light amount of ambient light is relatively small. Therefore, in order to increase the sensitivity, for example, a solid-state imaging element is proposed in which a current mirror circuit is connected to a pair of pixels, and a differential amplifier circuit including the pixels and the current mirror circuit is configured (see, for example, Patent Document 1).

CITATION LIST

Patent Document

Patent Document 1: Japanese Patent Application Laid-Open No. 2005-311487

SUMMARY OF THE INVENTION

Problems to be Solved by the Invention

In the above-mentioned conventional technique, the differential amplifier circuit differentially amplifies the signals of the pair of pixels, so that the sensitivity of the pixel can be higher than that in a case where the current mirror circuit is not connected. However, in the above-described solid-state imaging element, in a case where the light amount of ambient light fluctuates greatly, such as in a case where a shadow is generated by strong light, the dynamic range may be insufficient and the image quality may be deteriorated. When a plurality of pieces of image data (frames) having different exposure times is captured and synthesized, a synthesis frame with a wide dynamic range can be obtained, but instead, the frame rate decreases. For example, in a case where a plurality of frames is captured at a frame rate of 60 hertz (Hz) and two frames are synthesized, the frame rate of the synthesis frame is reduced to 30 hertz (Hz). As described above, the above-mentioned solid-state imaging element has a problem that the dynamic range of image data cannot be widened without reduction in frame rate.

The present technology has been created in view of such a situation, and an object is to widen a dynamic range in a solid-state imaging element provided with a differential amplifier circuit without a reduction in frame rate.

Solutions to Problems

The present technology has been made in order to solve the above-mentioned problems, and a first aspect thereof is a solid-state imaging element including: a reading circuit that performs processing of outputting a differentially amplified signal obtained by amplifying a difference between generated voltages of a pair of pixels and processing of outputting a pixel signal of the generated voltage of at least one of the pair of pixels each time the pair of pixels are exposed; and a processing unit that performs synthesis processing of synthesizing the output differentially amplified signal and the output pixel signal, and a method for controlling the solid-state imaging element. Therefore, the effect that the dynamic range is expanded by synthesizing the differentially amplified signal and the image signal is provided.

Furthermore, in the first aspect, each of the pair of pixels may generate a reset level as the generated voltage when initialized, and generate a signal level as the generated voltage when exposure is ended. Therefore, the effect that the dynamic range is expanded by synthesizing the signals obtained from the reset level and the signal level is provided.

Furthermore, in the first aspect, the reading circuit may output at least one of a first reset level obtained by differentially amplifying the reset level of each of the pair of pixels or a second reset level that is the reset level of one of the pair of pixels, and output a first signal level obtained by differentially amplifying the signal level of each of the pair of pixels and a second signal level that is the signal level of one of the pair of pixels. Therefore, the effect that the dynamic range is expanded by synthesizing the signals obtained from at least one of the first reset level or the second reset level, the first signal level, and the second signal level is provided.

Furthermore, in the first aspect, the reading circuit may output the first signal level and the second signal level after outputting the first reset level and the second reset level. Therefore, the effect that the dynamic range is expanded by synthesizing the signals obtained from the first reset level, the second reset level, the first signal level, and the second signal level is provided.

Furthermore, in the first aspect, the reading circuit may further output the second signal level and the second reset level after outputting the first reset level and the first signal level. Therefore, the effect that the dynamic range is expanded by synthesizing the signals obtained from the first reset level, the first signal level, the second signal level, and the second reset level is provided.

Furthermore, in the first aspect, the processing unit may include: an analog-digital converter that sequentially converts the first reset level, the first signal level, the second signal level, and the second reset level into a digital signal in a case where illuminance is higher than a predetermined value, and sequentially converts the first reset level and the first signal level into a digital signal in a case where the illuminance is less than the predetermined value; and a synthesis processing unit that performs the synthesis processing on the basis of the digital signal. Therefore, the effect that the conversion of the second signal level and the second reset level is stopped in a case where the illuminance is less than a predetermined value is provided.

Furthermore, in the first aspect, the processing unit may select and output the differentially amplified signal in a case where illuminance is less than a predetermined value, and select and output the pixel signal in a case where the illuminance exceeds the predetermined value. Therefore, the effect that a signal corresponding to the illuminance is selected is provided.

Furthermore, in the first aspect, the reading circuit may output one of the first signal level and the second signal level after outputting the first reset level and the second reset level. Therefore, the effect that the conversion of one of the first signal level and the second signal level becomes unnecessary is provided.

Furthermore, in the first aspect, in the reading circuit, a plurality of unit reading circuits each including a current mirror circuit, a current source, and a switch may be arranged in a predetermined direction, and the switch may connect the current mirror circuit and the current source of each of the plurality of unit reading circuits to each other. Therefore, the effect that the current mirror circuit and the current source are horizontally connected is provided.

Furthermore, the first aspect may further include a pixel array unit in which a plurality of pixels is arranged in a two-dimensional grid pattern, in which the pair of pixels are horizontally arranged in the pixel array unit. Therefore, the effect that the differentially amplified signal is read from the pair of pixels arranged horizontally is provided.

Furthermore, the first aspect may further include a pixel array unit in which a plurality of pixels is arranged in a two-dimensional grid pattern, in which the pair of pixels are vertically arranged in the pixel array unit. Therefore, the effect that the differentially amplified signal is read from the pair of pixels arranged vertically is provided.

Furthermore, the first aspect may further include a pixel array unit in which a plurality of pixels to each of which a vertical address and a horizontal address are assigned is arranged in a two-dimensional grid pattern, in which the pair of pixels are pixels in which the vertical addresses and the horizontal addresses are different from each other in the pixel array unit. Therefore, the effect that the differentially amplified signal is read from the pair of pixels arranged diagonally is provided.

Furthermore, the first aspect may further include a pixel array unit in which a plurality of read pixels and a reference pixel associated with the plurality of read pixels are arranged, in which one of the pair of pixels is one of the plurality of read pixels, and another of the pair of pixels is the reference pixel, the reading circuit performs processing of outputting a differentially amplified signal obtained by amplifying a difference between pixel signals of the read pixel and the reference pixel, and processing of outputting the pixel signal of the read pixel. Therefore, the effect that the differentially amplified signal is read from the read pixel and the reference pixel is provided.

Furthermore, in the first aspect, the reading circuit may include a current mirror circuit. Therefore, the effect that the differentially amplified signal is read from the pair of pixels to which the current mirror circuit is connected is provided.

Furthermore, in the first aspect, the current mirror circuit may include a cascode current mirror circuit. Therefore, the effect that the differentially amplified signal is read from the pair of pixels to which the cascode current mirror circuit is connected is provided.

Furthermore, in the first aspect, the current mirror circuit may be connected to a pair of vertical signal lines, and the reading circuit may further include a switch that selects one of the pair of vertical signal lines and connects the vertical signal line to the processing unit. Therefore, the effect that the differentially amplified signal or the pixel signal is read from one of the pair of vertical signal lines is provided.

Furthermore, the first aspect may further include: a digital-analog converter that includes a current source that generates a predetermined reference current and a resistor that generates a predetermined reference signal according to the reference current; and a system control unit that controls a value of the reference current, in which the processing unit includes a comparator that compares a signal output by the reading circuit with a predetermined reference signal. Therefore, the effect that power consumption is reduced by controlling the reference current is provided.

Furthermore, a second aspect of the present technology is an imaging apparatus including: a pair of pixels; a reading circuit that performs processing of outputting a differentially amplified signal obtained by amplifying a difference between generated voltages of the pair of pixels and processing of outputting a pixel signal of the generated voltage of at least one of the pair of pixels each time the pair of pixels are exposed; and a processing unit that performs synthesis processing of synthesizing the output differentially amplified signal and the output pixel signal. The effect that the dynamic range is expanded by synthesizing the differentially amplified signal and the image signal from the pair of pixels is provided.

Effects of the Invention

According to the present technology, it is possible to provide an excellent effect that a dynamic range can be widened in a solid-state imaging element provided with a differential amplifier circuit without a reduction in frame rate. Note that effects described herein are not necessarily limited, but may also be any of those described in the present disclosure.

BRIEF DESCRIPTION OF DRAWINGS

FIG. 13 is a diagram illustrating an example of operations of a column reading circuit unit and a column signal processing unit according to the first embodiment of the present technology and a comparative example.

MODE FOR CARRYING OUT THE INVENTION

Modes for carrying out the present technology (hereinafter, the embodiments) are described below. A description is given in the order described below.

1. First embodiment (example of synthesizing differentially amplified signal and pixel signal)
2. Second embodiment (example in which nodes are horizontally connected and differentially amplified signal and pixel signal are synthesized)
3. Third embodiment (example in which counter is reduced and differentially amplified signal and pixel signal are synthesized)
4. Fourth embodiment (example of reducing the number of times of signal level conversion and synthesizing differentially amplified signal and pixel signal)
5. Fifth embodiment (example of synthesizing differentially amplified signal and pixel signal from a pair of pixels arranged in vertical direction)
6. Sixth embodiment (example of synthesizing differentially amplified signal and pixel signal from read pixel and reference pixel)
7. Seventh embodiment (example of synthesizing differentially amplified signal and pixel signal from cascode current mirror circuit)
8. Eighth embodiment (example of synthesizing differentially amplified signal and pixel signal from reading circuit in which switch is arranged)
9. Ninth embodiment (example in which current in column signal processing unit is controlled and differentially amplified signal and pixel signal are synthesized)
10. Application examples to mobile objects

1. First Embodiment

[Configuration Example of Solid-State Imaging Element]

Figure 1:
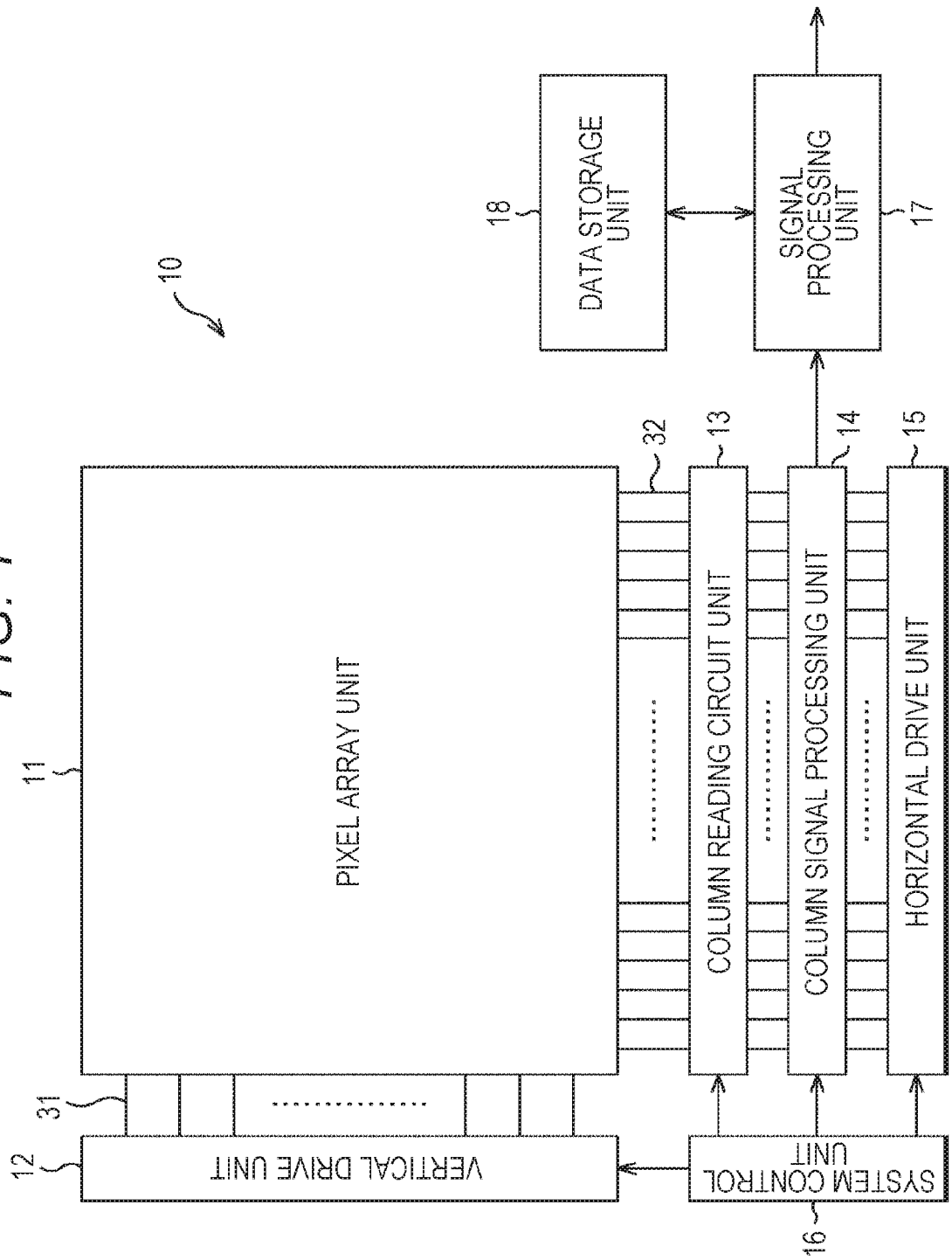
FIG. 1 is a block diagram illustrating a configuration example of a solid-state imaging element according to a first embodiment of the present technology.

FIG. 1 is a block diagram illustrating a configuration example of a solid-state imaging element 10 according to the first embodiment of the present technology. The solid-state imaging element 10 includes a pixel array unit 11, a vertical drive unit 12, a column reading circuit unit 13, a column signal processing unit 14, a horizontal drive unit 15, a system control unit 16, a signal processing unit 17, and a data storage unit 18. The circuits such as the pixel array unit 11 and the like are formed on the same or a plurality of electrically connected, stacked semiconductor substrates (chips).

The pixel array unit 11 includes, two-dimensionally in a matrix, a unit pixel (hereinafter referred to as an effective unit pixel) having a photoelectric conversion element capable of photoelectrically converting the charge amount according to the incident light amount and accumulating it internally and outputting it as a signal. Furthermore, the pixel array unit 11 may include a region in which dummy unit pixels or light-shielding unit pixels are two-dimensionally arranged in a matrix in addition to the effective unit pixels described above. The dummy unit pixel is a pixel having a structure that does not have a photodiode for photoelectric conversion, and the light-shielding unit pixel is a pixel equivalent to an effective pixel except that the light-receiving surface is shielded and light incident from the outside is blocked.

Note that, in the following, the photocharge having the charge amount corresponding to the incident light amount may be simply referred to as "charge", and the unit pixel may be simply referred to as "pixel".

Moreover, on the pixel array unit 11, pixel drive lines 31 are formed for each row with respect to a matrix pixel arrangement along the left-right direction (arrangement direction of pixels in pixel rows) in the drawing, and vertical pixel wirings 32 are formed for each column along the up-down direction (arrangement direction of pixels in pixel columns) in the drawing. One end of the pixel drive line 31 is connected to an output end corresponding to each row of the vertical drive unit 12.

The column reading circuit unit 13 includes at least a circuit that supplies a constant current to each column in the pixels of a selected row of the pixel array unit 11, a current mirror circuit that constitutes a high gain amplifier, and a read mode changeover switch. These constitute an amplifier together with a transistor in the selected pixel of the pixel array unit 11. This amplifier converts a photocharge signal into a voltage signal and outputs it to the vertical pixel wiring 32. Note that the column reading circuit unit 13 is an example of the reading circuit described in the claims.

The vertical drive unit 12 is a pixel drive unit including a shift register, an address decoder, or the like, and driving each pixel of the pixel array unit 11 simultaneously, in unit of rows, or the like. An illustration of a specific configuration of the vertical drive unit 12 is omitted. However, the vertical drive unit 12 includes a read scanning system, a sweep scanning system, or batch sweeping, and batch transfer.

The read scanning system selectively scans unit pixels of the pixel array unit in order in units of rows in order to read a signal from the unit pixels. In the case of row drive (rolling shutter operation), for sweeping, sweep scanning is performed before read scanning by the read scanning system by the shutter speed time with respect to a read row on which the read scanning is performed by the read scanning system. Furthermore, in the case of global exposure (global shutter operation), batch sweeping is performed prior to batch transfer by the shutter speed time. By this sweeping, unnecessary charges are swept (reset) from the photoelectric conversion element of the unit pixel of the read row. Then, by sweeping (resetting) the unnecessary charges, a so-called electronic shutter operation is performed. Here, the electronic shutter operation refers to an operation in which unnecessary photocharges retained in the photoelectric conversion element until immediately before are discarded and exposure is newly started (accumulation of photocharges is started). A signal read by the read operation by the read scanning system corresponds to the amount of light received after the read operation immediately before or the electronic shutter operation. In the case of row drive, a period from the read timing by the read operation immediately before or the sweep timing by the electronic shutter operation to the read timing by the present read operation is time of accumulation (exposure time) of photocharges in the unit pixel. In the case of global exposure, the time from batch sweeping to batch transfer is the accumulation time (exposure time).

A pixel signal output from each unit pixel of the pixel row selectively scanned by the vertical drive unit 12 is supplied to the column signal processing unit 14 through each of vertical pixel wirings 32. The column signal processing unit 14 performs, for each pixel column of the pixel array unit, predetermined signal processing on the pixel signal output from each unit pixel of the selected row through the vertical pixel wiring 32, and temporarily holds the pixel signal after the signal processing.

Specifically, the column signal processing unit 14 performs at least noise removal processing, such as correlated double sampling (CDS) processing, as signal processing. Correlated double sampling by the column signal processing unit 14 removes pixel-specific fixed pattern noise such as reset noise and threshold value variation of the amplification transistor. Note that, in addition to the noise removal processing, the column signal processing unit may have an analog-digital (AD) conversion function, for example, so as to output a signal level as a digital signal. Note that the column signal processing unit 14 is an example of the processing unit described in the claims.

The horizontal drive unit 15 includes a shift register, an address decoder, or the like, and selects a unit circuit corresponding to the pixel column of the column signal processing unit 14 in sequence. By selection scanning by the horizontal drive unit 15, pixel signals subjected to the signal processing in the column signal processing unit 14 are output to the signal processing unit 17 in sequence.

The system control unit 16 includes, for example, a timing generator that generates various timing signals. The system control unit 16 controls the drive of the vertical drive unit 12, the column reading circuit unit 13, the column signal processing unit 14, the horizontal drive unit 15, and the like on the basis of the various timing signals generated by the timing generator.

The solid-state imaging element 10 further includes a signal processing unit 17 and a data storage unit 18. The signal processing unit 17 at least has an addition processing function and performs various signal processing such as addition processing on the pixel signal output from the column signal processing unit 14. For signal processing in the signal processing unit 17, the data storage unit 18 temporarily stores data required for the processing. For the signal processing unit 17 and the data storage unit 18, processing by an external signal processing unit provided on a substrate, which is different from the substrate of the solid-state imaging element 10, e.g., a digital signal processor (DSP) or software may be used. Alternatively, they may be mounted on the same substrate as the solid-state imaging element 10.

[Configuration Example of the Pixel]

Figure 2:
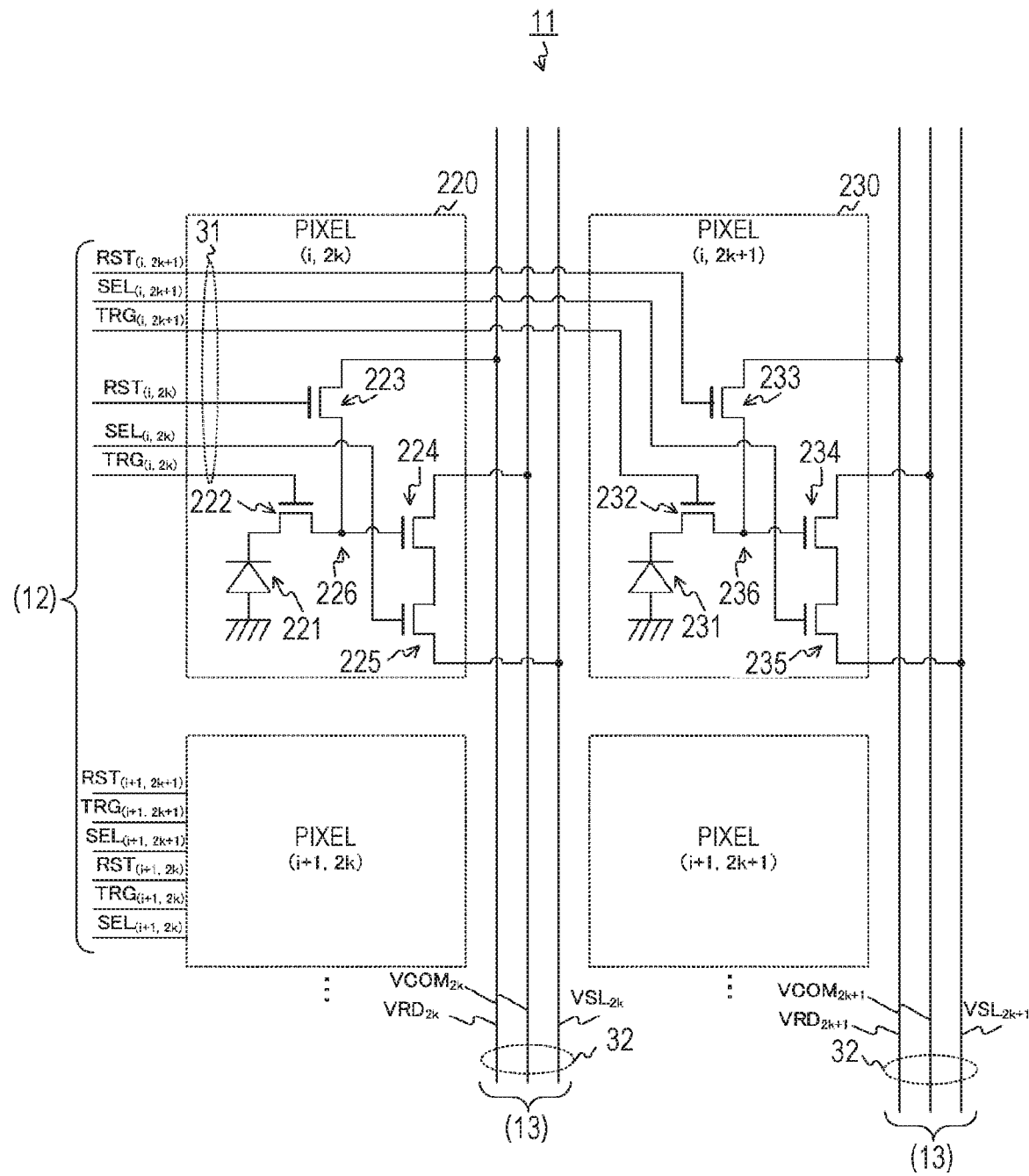
FIG. 2 is a block diagram illustrating a configuration example of a pixel circuit according to the first embodiment of the present technology.

FIG. 2 is a circuit diagram illustrating a configuration example of pixels 220 and 230 according to the first embodiment of the present technology. In the pixel array unit 11, a plurality of pixels such as the pixels 220 and 230 is arranged in a two-dimensional grid shape. The pixel 220 is a pixel adjacent to the pixel 230. For example, the pixels 220 are arranged in 2k (k is an integer) column which is an even column, and the pixels 230 are arranged in 2k+1 column which is an odd column.

The pixel 220 includes a photodiode 221, a transfer transistor 222, a floating diffusion region 226, a reset transistor 223, an amplification transistor 224, and a selection transistor 225. As these transistors, for example, metal-oxide-semiconductor (MOS) transistors are used.

Furthermore, in the pixel array unit 11, a pixel drive line 31 whose one end is connected to the vertical drive unit 12 is arranged for each row along the horizontal direction. The pixel drive line 31 of each row includes six signal lines. Those signal lines transmit six drive signals.

Furthermore, in the pixel array unit 11, a vertical pixel wiring 32 whose one end is connected to the column reading circuit unit 13 is arranged for each column along the vertical direction. The vertical pixel wiring 32 of each even number column includes a vertical signal line $VSL_{2k}$, a vertical reset input line $VRD_{2k}$, and a vertical current supply line $VCOM_{2k}$. The vertical pixel wiring 32 of each odd number column includes a vertical signal line $VSL_{2k+1}$, a vertical reset input line $VRD_{2k+1}$, and a vertical current supply line $VCOM_{2k+1}$. For example, assuming that the number of columns is J (J is an integer), the number of wirings in the vertical direction is 3×J.

The anode of the photodiode 221 is grounded, and the cathode of the photodiode 221 is connected to the source of the transfer transistor 222. The drain of the transfer transistor 222 is connected to the source of the reset transistor 223 and the gate of the amplification transistor 224. This connection point constitutes the floating diffusion region 226.

Furthermore, the drain of the reset transistor 223 is connected to the vertical reset input line $VRD_{2k}$. The source of the amplification transistor 224 is connected to the vertical current supply line $VCOM_{2k}$. The drain of the amplification transistor 224 is connected to the source of the selection transistor 225, and the drain of the selection transistor 225 is connected to the vertical signal line $VSL_{2k}$. The gates of the transfer transistor 222, the reset transistor 223, and the selection transistor 225 are connected to the vertical drive unit 12 via the pixel drive line 31. A pulse as a drive signal is supplied to each of these transistors.

The pixel 230 includes a photodiode 231, a transfer transistor 232, a floating diffusion region 236, a reset transistor 233, an amplification transistor 234, and a selection transistor 235. The connection configuration of these elements is similar to that of the pixel 220. The configuration of pixels of even number columns other than the pixel 220 is similar to that of the pixel 220, and the configuration of pixels of odd number columns other than the pixel 230 is similar to that of the pixel 230. That is, the even number columns are connected to the vertical signal line $VSL_{2k}$, and the odd number columns are connected to the vertical signal line $VSL_{2k+1}$.

Next, the basic function of the pixel 220 will be described. The reset transistor 223 turns on/off the discharge of the charges accumulated in the floating diffusion region 226 according to a drive signal $RST_{(i,2k)}$ supplied from the vertical drive unit 12. Here, the number of rows is I (I is an integer), and the subscript i is an integer from 0 to I. For example, when a high level drive signal $RST_{(i,2k)}$ is supplied, the floating diffusion region 226 is clamped to the voltage applied through the vertical reset input line $VRD_{2k}$. Then, the reset transistor 223 discharges (resets) the charges accumulated in the floating diffusion region 226.

Furthermore, when a low level drive signal $RST_{(i,2k)}$ is supplied to the reset transistor 223, the floating diffusion region 226 is electrically disconnected from the vertical reset input line $VRD_{2k}$ and becomes a floating state.

Furthermore, the photodiode 221 photoelectrically converts incident light, and generates and accumulates charges according to the light amount. The transfer transistor 222 turns on/off the transfer of the charges from the photodiode 221 to the floating diffusion region 226 according to the drive signal $TRG_{(i,2k)}$ supplied from the vertical drive unit 12. For example, the transfer transistor 222, when the high level drive signal $TRG_{(i,2k)}$ is supplied, transfers the charges accumulated in the photodiode 221 to the floating diffusion region 226, and when the low level drive signal $TRG_{(i,2k)}$ is supplied, stops the transfer of the charges. Note that, while the transfer transistor 222 stops transferring the charges to the floating diffusion region 226, the photoelectrically converted charge is accumulated in the photodiode 221.

The floating diffusion region 226 has a function of accumulating the charges transferred from the photodiode 221 via the transfer transistor 222. In the floating state in which the reset transistor 223 is turned off, the potential of the floating diffusion region 226 is modulated according to the accumulated charge amount.

The amplification transistor 224 serves as an amplifier that has the potential fluctuation of the floating diffusion region 226 connected to the gate as an input signal, and the output voltage signal is output to the vertical signal line $VSL_{2k}$ via the selection transistor 225.

The selection transistor 225 turns on/off the output of the voltage signal from the amplification transistor 224 to the vertical signal line $VSL_{2k}$ according to the drive signal $SEL_{(i,2k)}$ supplied from the vertical drive unit 12. For example, the selection transistor 225 outputs a voltage signal to the vertical signal line $VSL_{2k}$ when the high level drive signal $SEL_{(i,2k)}$ is supplied, and stops the output of the voltage signal when the low level drive signal $SEL_{(i,2k)}$ is supplied. This makes it possible to take out only the output of the selected pixel in the vertical signal line to which a plurality of pixels is connected.

On the other hand, the transistors in the pixel 230 are supplied with the drive signals $RST_{(i,2k+1)}$, $TRG_{(i,2k+1)}$, and $SEL_{(i,2k+1)}$, and operate similarly to the corresponding transistors in the pixel 220 according to the drive signals.

[Configuration Example of the Column Reading Circuit Unit]

Figure 3:
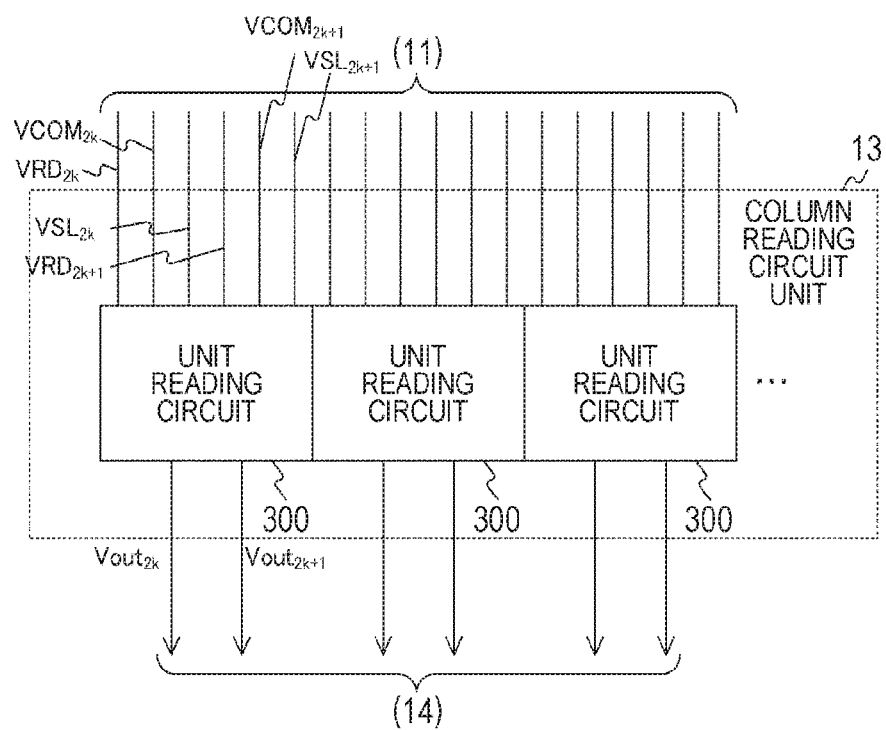
FIG. 3 is a circuit diagram illustrating a configuration example of a column reading circuit unit according to the first embodiment of the present technology.

FIG. 3 is a block diagram illustrating a configuration example of the column reading circuit unit 13 according to the first embodiment of the present technology. In the column reading circuit unit 13, a unit reading circuit 300 is arranged every two columns. When the number of columns is J, J/2 unit reading circuits 300 are arranged.

Each unit reading circuit 300 is connected to the pixel array unit 11 via the vertical signal lines $VSL_{2k}$ and $VSL_{2k+1}$, the vertical reset input lines $VRD_{2k}$ and $VRD_{2k+1}$, and the vertical current supply lines $VCOM_{2k}$ and $VCOM_{2k+1}$. Furthermore, the unit reading circuit 300 supplies the voltage signals from the vertical signal lines $VSL_{2k}$ and $VSL_{2k+1}$ to the column signal processing unit 14 as pixel signals $Vout_{2k}$ and $Vout_{2k+1}$.

Figure 4:
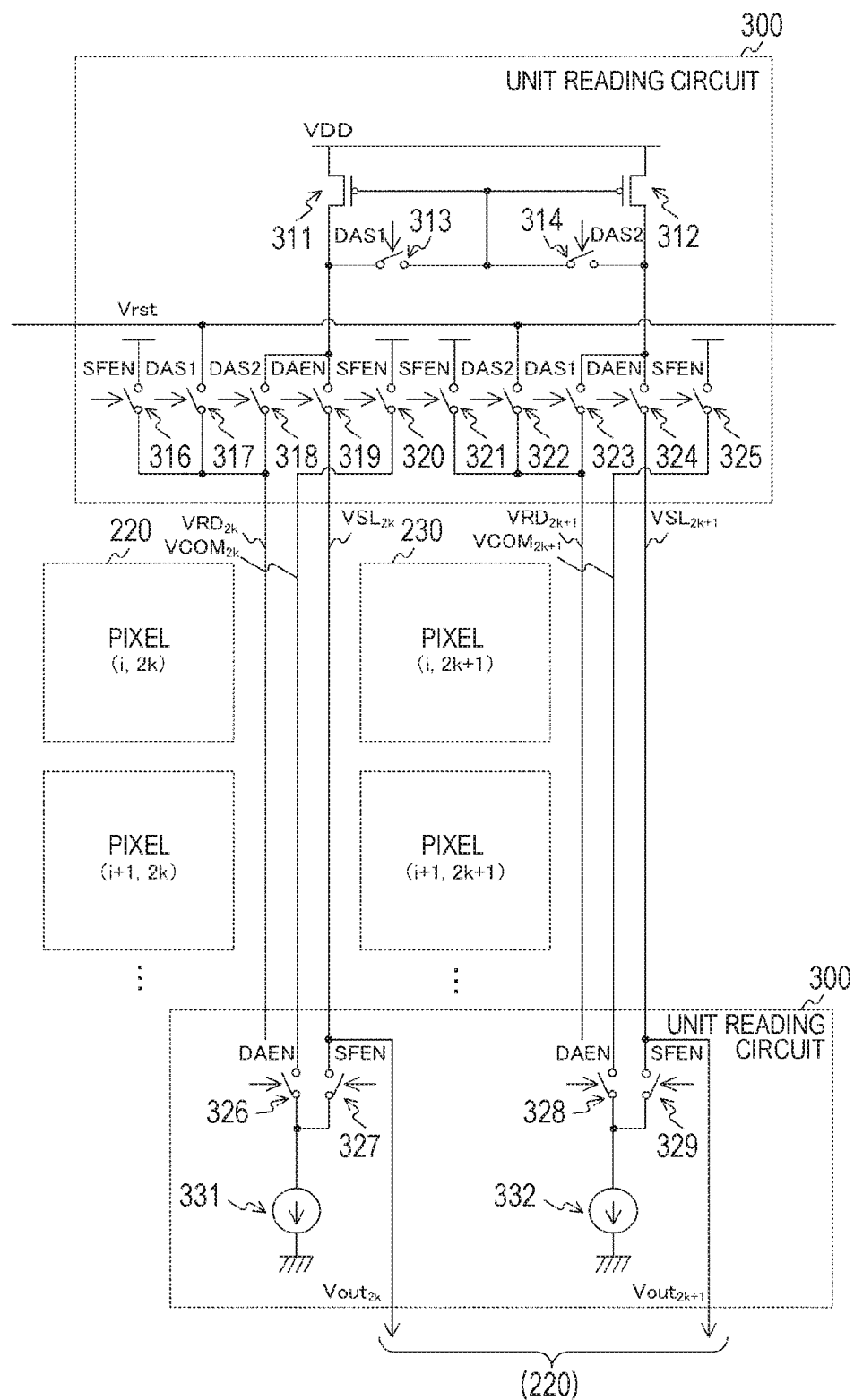
FIG. 4 is a circuit diagram illustrating a configuration example of a unit reading circuit according to the first embodiment of the present technology.

FIG. 4 is a circuit diagram illustrating a configuration example of the unit reading circuit 300 according to the first embodiment of the present technology. The unit reading circuit 300 includes P-type transistors 311 and 312, switches 313 and 314, switches 316 to 329, and current sources 331 and 332. As the P-type transistors 311 and 312, for example, a MOS transistor is used. The P-type transistors 311 and 312 are connected in parallel to the terminal of power supply voltage VDD, and their gates are connected.

The switch 313 short-circuits the gate and drain of the P-type transistor 311 according to a drive signal DAS1 from the system control unit 16. For example, when the drive signal DAS1 is at high level, the switch 313 shifts to the ON state, and the gate and drain of the P-type transistor 311 are short-circuited.

The switch 314 short-circuits the gate and drain of the P-type transistor 312 according to a drive signal DAS2 from the system control unit 16. For example, when the drive signal DAS2 is at high level, the switch 314 shifts to the ON state, and the gate and drain of the P-type transistor 312 are short-circuited.

When one of the switches 313 and 314 shifts to the ON state and the other shifts to the OFF state, the P-type transistors 311 and 312 function as a current mirror circuit.

The switch 316 connects the terminal of the power supply voltage VDD to the vertical reset input line $VRD_{2k}$ according to a drive signal SFEN from the system control unit 16. For example, in a case where the drive signal SFEN is at high level, the power supply voltage VDD is connected to the vertical reset input line $VRD_{2k}$.

The switch 317 connects the terminal of a reset voltage Vrst, different from the power supply voltage VDD, to the vertical reset input line $VRD_{2k}$ according to the drive signal DAS1 from the system control unit 16. For example, in a case where the drive signal DAS1 is at high level, the reset voltage Vrst is connected to the vertical reset input line $VRD_{2k}$.

Here, for example, a voltage lower than the power supply voltage VDD is applied as the reset voltage Vrst. For example, the power supply voltage VDD is 3.3 volts (V) and the reset voltage Vrst is 2.2 volts (V). The higher the reset voltage Vrst, the more advantageous for the charge transfer, and the more signal charges can be transferred. On the other hand, the lower the reset voltage Vrst, the larger the amplitude of the output voltage. Note that in a case where the polarities of the photodiodes are opposite, it is advantageous to set the potentials opposite to each other.

The switch 318 connects the P-type transistor 311 to the vertical reset input line $VRD_{2k}$ according to the drive signal DAS2 from the system control unit 16. For example, in a case where the drive signal DAS2 is at high level, the P-type transistor 311 is connected to the vertical reset input line $VRD_{2k}$.

The switch 319 connects the P-type transistor 311 to the vertical signal line $VSL_{2k}$ according to the drive signal DAEN from the system control unit 16. For example, in a case where the drive signal DAEN is at high level, the P-type transistor 311 is connected to the vertical signal line $VSL_{2k}$.

The switch 320 connects the terminal of the power supply voltage VDD to the vertical current supply line $VCOM_{2k}$ according to the drive signal SFEN from the system control unit 16. For example, in a case where the drive signal SFEN is at high level, the power supply voltage VDD is connected to the vertical current supply line $VCOM_{2k}$.

The switch 321 connects the terminal of the power supply voltage VDD to the vertical reset input line $VRD_{2k+1}$ according to the drive signal SFEN from the system control unit 16. For example, in a case where the drive signal SFEN is at high level, the power supply voltage VDD is connected to the vertical reset input line $VRD_{2k+1}$.

The switch 322 connects the terminal of the reset voltage Vrst to the vertical reset input line $VRD_{2k+1}$ according to the drive signal DAS2 from the system control unit 16. For example, in a case where the drive signal DAS2 is at high level, the reset voltage Vrst is connected to the vertical reset input line $VRD_{2k+1}$.

The switch 323 connects the P-type transistor 312 to the vertical reset input line $VRD_{2k+1}$ according to the drive signal DAS1 from the system control unit 16. For example, in a case where the drive signal DAS1 is at high level, the P-type transistor 312 is connected to the vertical reset input line $VRD_{2k+1}$.

The switch 324 connects the P-type transistor 312 to the vertical signal line $VSL_{2k+1}$ according to the drive signal DAEN from the system control unit 16. For example, in a case where the drive signal DAEN is at high level, the P-type transistor 312 is connected to the vertical signal line $VSL_{2k+1}$.

The switch 325 connects the terminal of the power supply voltage VDD to the vertical current supply line $VCOM_{2k+1}$ according to the drive signal SFEN from the system control unit 16. For example, in a case where the drive signal SFEN is at high level, the power supply voltage VDD is connected to the vertical current supply line $VCOM_{2k+1}$.

The switch 326 connects the vertical current supply line $VCOM_{2k}$ to the current source 331 according to the drive signal DAEN from the system control unit 16. For example, in a case where the drive signal DAEN is at high level, the vertical current supply line $VCOM_{2k}$ is connected to the current source 331.

The switch 327 connects the vertical signal line $VSL_{2k}$ to the current source 331 according to the drive signal SFEN from the system control unit 16. For example, in a case where the drive signal SFEN is at high level, the vertical signal line $VSL_{2k}$ is connected to the current source 331.

The switch 328 connects the vertical current supply line $VCOM_{2k+1}$ to the current source 332 according to the drive signal DAEN from the system control unit 16. For example, in a case where the drive signal DAEN is at high level, the vertical current supply line $VCOM_{2k+1}$ is connected to the current source 332.

The switch 329 connects the vertical signal line $VSL_{2k+1}$ to the current source 332 according to the drive signal SFEN from the system control unit 16. For example, in a case where the drive signal SFEN is at high level, the vertical signal line $VSL_{2k+1}$ is connected to the current source 332.

In the above configuration, the unit reading circuit 300 and the pixels 220 and 230 constitute a differential amplifier circuit according to the low level drive signal SFEN and the high level drive signal DAEN. The operation of reading the differentially amplified signal from the differential amplifier circuit is called "differential reading". Furthermore, a mode in which only differential reading is performed in a 1 V period which is the period of the vertical synchronization signal is hereinafter referred to as a "differential mode".

On the other hand, the unit reading circuit 300 and the pixels 220 and 230 constitute a source follower circuit according to the high level drive signal SFEN and the low level drive signal DAEN. The operation of reading the pixel signal from the source follower circuit is called "source follower (SF) reading". Furthermore, a mode in which only SF reading is performed in the 1 V period is hereinafter referred to as "SF mode".

In the differential mode, the conversion efficiency can be significantly increased by increasing the gain for an image signal, but the operation point is narrow and it is difficult to widen the dynamic range. However, since the image signal can be amplified with a relatively high gain, the differential mode is suitable for imaging in a dark place. On the other hand, in the SF mode, the image signal can be amplified only with a relatively low gain, but since the dynamic range can be relatively widened, it is suitable for imaging in a bright place. Therefore, for example, the differential mode is set in a case where the photometric amount of ambient light is smaller than a predetermined threshold value, and the SF mode is set in a case where the photometric amount is equal to or larger than the threshold value.

Furthermore, in the differential mode, a pair of pixels arranged in the vertical direction are selected, and one of which is selected as a "read pixel" and the other is selected as a "reference pixel". Of these, the read pixel is a pixel from which a voltage corresponding to the amount of photoelectrically converted charges is read as a signal voltage. On the other hand, the reference pixel is a voltage in which the voltage of the floating diffusion region is initialized to a predetermined reference voltage. In the differential mode, a signal obtained by amplifying the difference between the signal voltage and the reference voltage is read.

Furthermore, in the differential mode, the read pixel and the reference pixel can be switched by controlling the drive signals DAS1 and DAS2. For example, in a case where only the drive signal DAS1 of the drive signals DAS1 and DAS2 is set to high level, one of the pixels 220 and 230 becomes the read pixel, and conversely, in a case where only the drive signal DAS2 is set to high level, the other of the pixels 220 and 230 becomes the read pixel.

Furthermore, in addition to the differential mode and the SF mode, both the differential reading and the SF reading can be performed within the 1 V period. Since this mode is used to perform high dynamic range synthesis, this mode is hereinafter referred to as "high dynamic range (HDR) mode".

Figure 5:
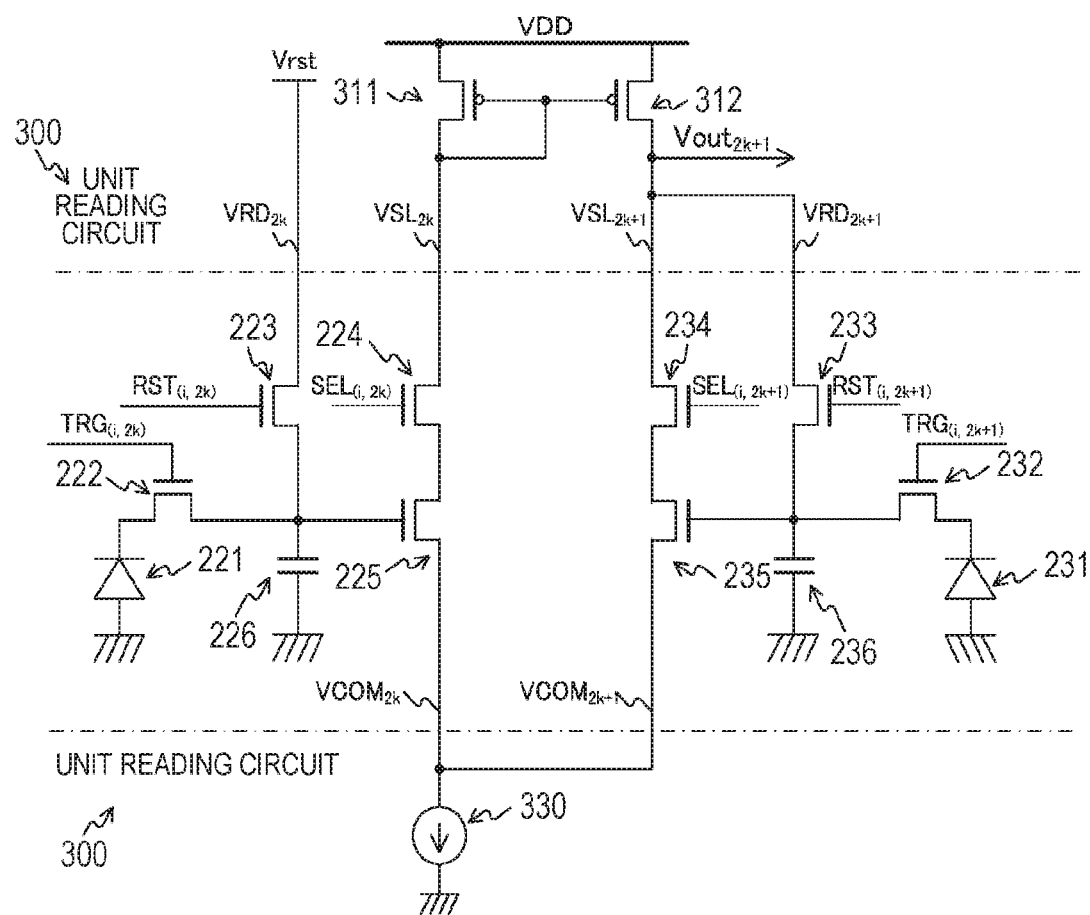
FIG. 5 is a circuit diagram illustrating a configuration example of a differential amplifier circuit including a unit reading circuit and a pixel according to the first embodiment of the present technology.

FIG. 5 is a circuit diagram illustrating a configuration example of a differential amplifier circuit including the unit reading circuit 300 and the pixels 220 and 230 according to the first embodiment of the present technology. The differential amplifier circuit includes a read pixel to be read, a reference pixel that gives a reference voltage, a current mirror circuit arranged in the column reading circuit unit 13, and a current source 330. For example, the pixel 220 is used as a reference pixel and the pixel 230 is used as a read pixel. The current source 330 is an element in which the current sources 331 and 332 are integrated for the sake of convenience of description. Note that, for the sake of convenience of description, the switch group is omitted in the drawing.

The vertical reset input line $VRD_{2k}$ is connected to a predetermined reset voltage Vrst in the unit reading circuit 300 in the column reading circuit unit 13. At the time of resetting, a desired input voltage signal is applied to the floating diffusion region 226 of the reference pixel selected through the wiring, that is, to the input terminal of the amplification transistor 224 on the reference side.

The vertical signal line $VSL_{2k}$ on the reference side is connected to the drain and gate of the P-type transistor 311 and the gate of the P-type transistor 312, which are the current mirror circuits, in the column reading circuit unit 13.

On the other hand, the vertical signal line $VSL_{2k+1}$ on the read side is connected to the drain of the P-type transistor 312 and the floating diffusion region 236 of the read pixel (that is, the input terminal of the amplification transistor 234 on the read side) via the reset transistor 233 in the column reading circuit unit 13. Therefore, the output signal of the differential-type amplifier circuit is negatively fed back. The output signal of the differential-type amplifier circuit is taken out from the vertical signal line $VSL_{2k+1}$. Furthermore, the vertical current supply lines $VCOM_{2k}$ and $VCOM_{2k+1}$ on the reference side and the read side are connected to the current source 330.

In a case where the reference pixel (here, the pixel 220) generates the reference voltage, the reset transistor 223 becomes the ON state, and the reset voltage Vrst is supplied to the floating diffusion region 226. On the other hand, in the read pixel (here, the pixel 230), the reset transistor 233 becomes the ON state immediately before the transfer in a case where the signal voltage is read, and a voltage different from the reset voltage Vrst corresponding to the power supply voltage VDD is supplied via the current mirror circuit to the floating diffusion region 236. Then, in the read pixel, charges are transferred from the photodiode 231 and a signal voltage is generated. A signal obtained by amplifying the difference between the reference voltage and the signal voltage is read as the pixel signal $Vout_{2k+1}$.

The positional relationship between the reference pixel and the read pixel is not fixed and can be interchanged as described above. For example, after the pixel 220 is selected as the reference pixel and the pixel 230 is selected as the read pixel, the pixel 220 is then selected as the read pixel and the pixel 230 is selected as the reference pixel.

[Configuration Example of the Column Signal Processing Unit]

Figure 6:
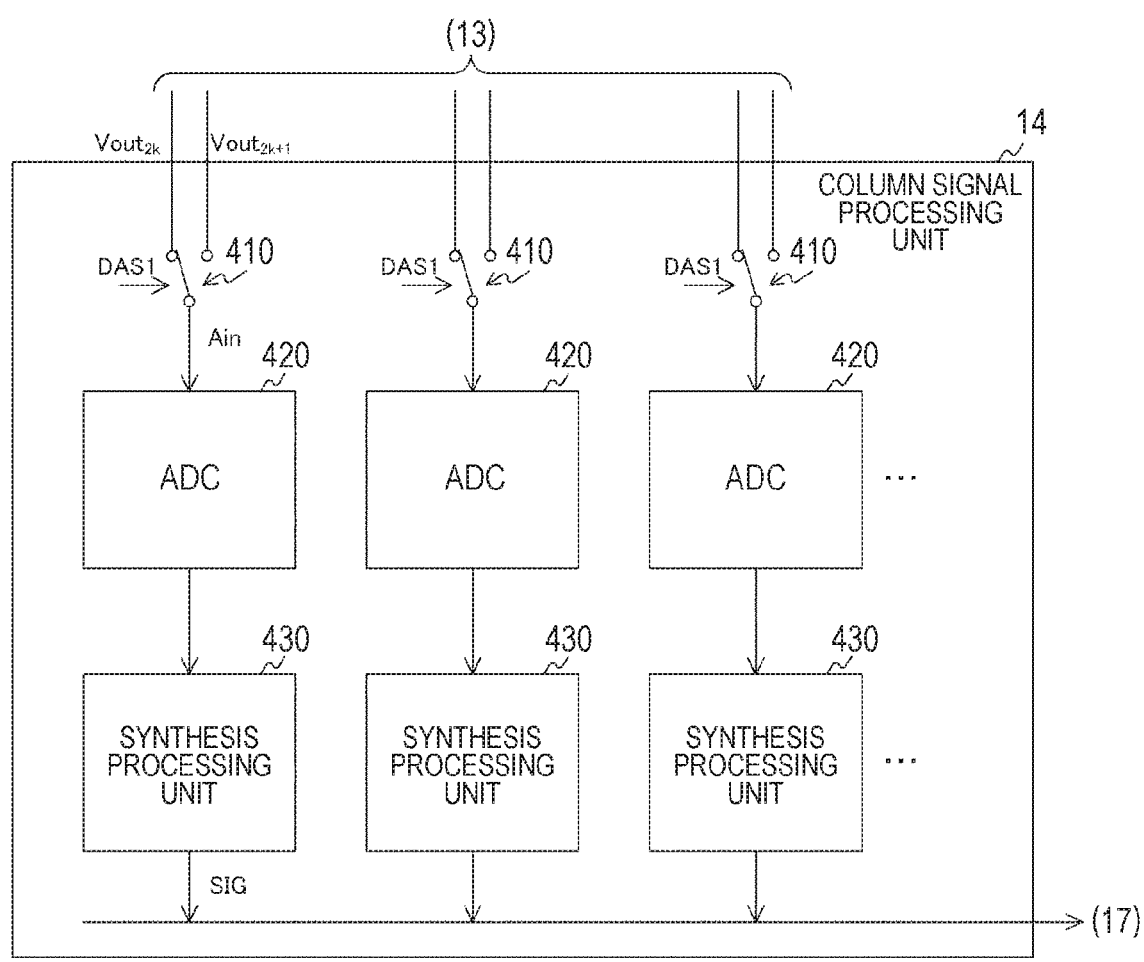
FIG. 6 is a block diagram illustrating a configuration example of a column signal processing unit according to the first embodiment of the present technology.

FIG. 6 is a block diagram illustrating a configuration example of the column signal processing unit 14 according to the first embodiment of the present technology. The column signal processing unit 14 includes a switch 410, an ADC 420, and a synthesis processing unit 430 for every two columns.

The switch 410 selects one of the pixel signals $Vout_{2k}$ and $Vout_{2k+1}$ from the corresponding two columns in the pixel array unit 11 according to the drive signal DAS1 and supplies it to the ADC 420 as an analog signal Ain.

The ADC 420 converts the analog signal Ain into a digital signal. The ADC 420 supplies the digital signal to the synthesis processing unit 430.

The synthesis processing unit 430 performs HDR synthesis processing for widening the dynamic range with respect to the digital signal from the ADC 420 in the HDR mode. On the other hand, the HDR synthesis processing is not executed in the differential mode and the SF mode. The synthesis processing unit 430 outputs pixel data SIG after the HDR synthesis processing to the signal processing unit 17.

Figure 7:
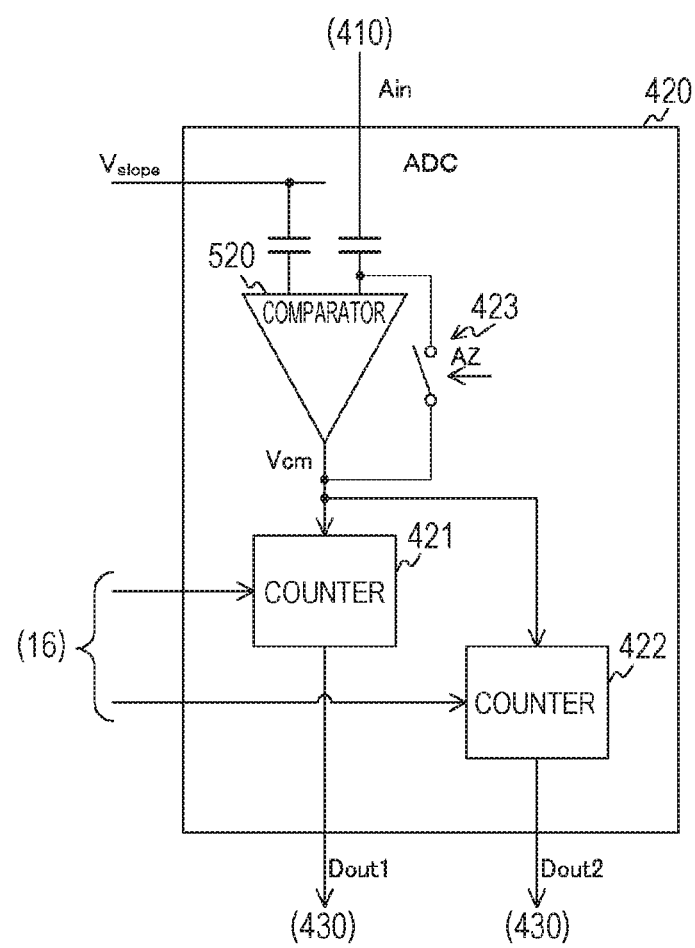
FIG. 7 is a circuit diagram illustrating a configuration example of an analog to digital converter (ADC) according to the first embodiment of the present technology.

FIG. 7 is a circuit diagram illustrating a configuration example of an ADC 420 according to the first embodiment of the present technology. The ADC 420 includes a comparator 520, a switch 423, and counters 421 and 422.

The comparator 520 compares a reference signal $V_{slope}$ whose level changes in a slope shape with the analog signal Ain. It is assumed that the amplitude range of the reference signal $V_{slope}$ at the time of differential reading is similar to that at the time of SF reading. The comparator 520 supplies a comparison result to the counters 421 and 422.

The switch 423 short-circuits the output terminal of the comparator 520 and the input terminal on the analog signal Ain side according to a drive signal AZ for auto zero from the system control unit 16.

The counters 421 and 422 count a count value within the period until the comparison result is inverted under the control of the system control unit 16.

The system control unit 16 causes the counter 422 to count the difference between the P-phase level and the D-phase level from the source follower circuit. Here, the P-phase level is the voltage (level) of the pixel signals $Vout_{2k}$ and $Vout_{2k+1}$ generated by the pixels 220 and 230 when the floating diffusion region is initialized. Furthermore, the D-phase level is the voltage (level) of the pixel signals $Vout_{2k}$ and $Vout_{2k+1}$ generated by the pixels 220 and 230 when the exposure of the pixels 220 and 230 is ended. Hereinafter, the P-phase level and the D-phase level of the source follower circuit are referred to as "P2 level" and "D2 level". Note that the P-phase level and the D-phase level are examples of the generated voltage described in the claims. The P2 level is an example of the second reset level described in the claims, and the D2 level is an example of the second signal level described in the claims.

Furthermore, the system control unit 16 causes the counter 421 to count the difference between the P-phase level and the D-phase level from the differential amplifier circuit. Here, the P-phase level from the differential amplifier circuit is the level of the differentially amplified signal obtained by amplifying the difference between the P-phase level of the read pixel and the P-phase level of the reference pixel. Furthermore, the D-phase level from the differential amplifier circuit is the level of the differentially amplified signal obtained by amplifying the difference between the D-phase level of the read pixel and the D-phase level of the reference pixel. Hereinafter, the P-phase level and the D-phase level of the differential amplifier circuit are referred to as "P1 level" and "D1 level". Note that the P1 level and the D1 level are examples of the differentially amplified signal described in the claims. Furthermore, the P1 level is an example of the first reset level described in the claims, and the D1 level is an example of the first signal level described in the claims.

The counter 421 outputs a digital signal indicating the difference between the P1 level and the D1 level to the synthesis processing unit 430 as a digital signal Dout1. The counter 422 outputs a digital signal indicating the difference between the P2 level and the D2 level to the synthesis processing unit 430 as a digital signal Dout2. The processing of obtaining these differences corresponds to the CDS processing.

[Configuration Example of the Synthesis Processing Unit]

Figure 8:
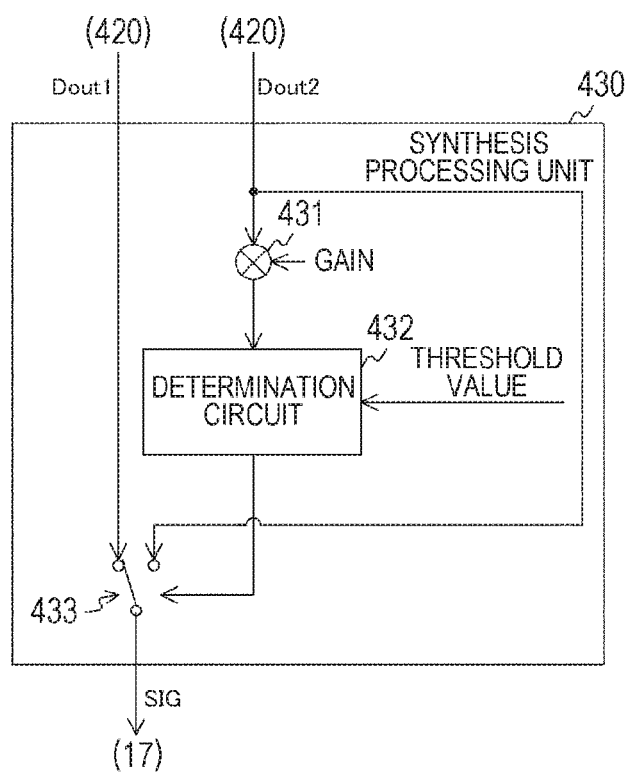
FIG. 8 is a circuit diagram illustrating a configuration example of a synthesis processing unit according to the first embodiment of the present technology.

FIG. 8 is a circuit diagram illustrating a configuration example of the synthesis processing unit 430 according to the first embodiment of the present technology. The synthesis processing unit 430 includes a multiplier 431, a determination circuit 432, and a switch 433. The multiplier 431 multiplies the digital signal Dout2 indicating the difference between the P2 level and the D2 level by a predetermined coefficient A, and outputs the multiplication result to the determination circuit 432. As the coefficient A, for example, a value shown in the following formula is set.

$$A = (\eta_D \times G_{AD}) \div (\eta_S \times G_{AS})$$

In the above formula, $\eta_D$ is the conversion efficiency during differential reading, and $G_{AD}$ is an analog gain during differential reading. The symbol $\eta_S$ is the conversion efficiency during SF reading, and $G_{AS}$ is an analog gain during SF reading.

The determination circuit 432 determines whether or not the multiplication result is larger than a predetermined threshold value. The determination circuit 432 supplies the determination result to the switch 433.

The switch 433 selects either the digital signal Dout1 indicating the difference between the P1 level and the D1 level or the digital signal Dout2 indicating the difference between the P2 level and the D2 level according to the determination result. For example, in a case where the multiplication result is determined to be equal to or less than the threshold value, the switch 433 selects the differentially read digital signal Dout1 and outputs it as the pixel data SIG. On the other hand, in a case where the multiplication result is determined to be larger than the threshold value, the switch 433 selects the SF read digital signal Dout2 and outputs it as the pixel data SIG. Through these processing, a synthesis frame is generated by synthesizing a frame including the differentially read digital signal Dout1 and a frame including the SF read digital signal Dout2.

Figure 9:
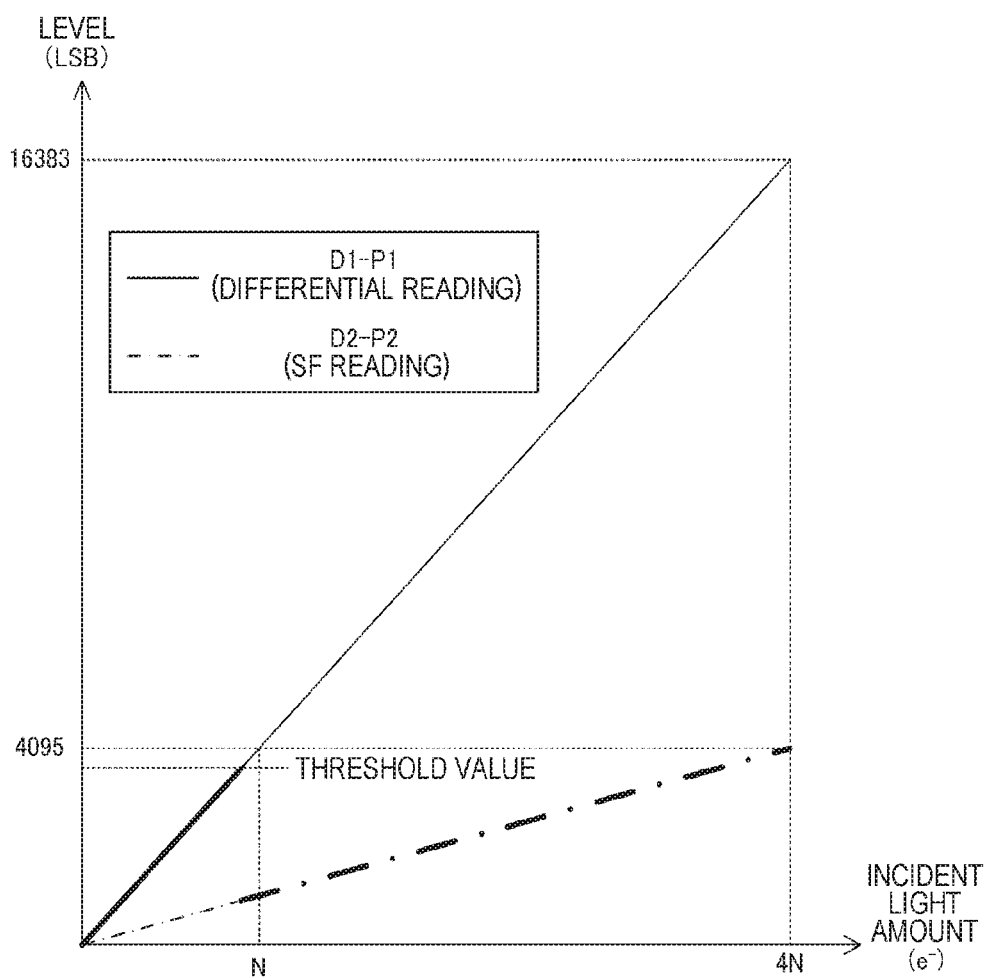
FIG. 9 is a graph illustrating an example of a relationship between incident light amount and pixel signal level according to the first embodiment of the present technology.

FIG. 9 is a graph illustrating an example of a relationship between incident light amount and pixel signal level according to the first embodiment of the present technology. The vertical axis in the drawing is a value representing the level of the digital signal in units of least significant bit (LSB). The horizontal axis in the drawing is the incident light amount of a pixel. Furthermore, the solid line indicates the characteristic of the digital signal Dout1 indicating the difference between the P1 level and the D1 level, and the dashed-dotted line indicates the characteristic of the digital signal Dout2 indicating the difference between the P2 level and the D2 level.

When the incident light amount is equal, the differentially amplified and read digital signal Dout1 (=D1−P1) is, for example, four times the level of the SF read digital signal Dout2 (=D2−P2). When the output range of the ADC420 with 12-bit gradation is 4095 LSB, the output value will be saturated when the incident light amount is N(e−) in the case of differential reading, whereas the output value will not be saturated until 4N(e−) in the case of SF reading.

Therefore, the synthesis processing unit 430 multiplies Dout2 (=D2−P2) by a factor of four times (digital gain), sets the threshold value to 4000 LSB, and compares the result with the multiplication result. Then, the synthesis processing unit 430 selects a digital signal for differential reading in the case of 4000 LSB or less, and selects a digital signal for source follower reading in the case of exceeding 4000 LSB. Therefore, the dynamic range can be expanded four times (in other words, +12 decibels) as compared with reading of only differential reading.

Furthermore, when the value of $\eta_D/\eta_S$ is "4" and the value of $G_{AD}/G_{AS}$ is "2", the digital signal Dout1 subjected to differential amplification and reading becomes eight times the level of the digital signal Dout2 subjected to SF reading. When the output range of the ADC420 with 12-bit gradation is 4095 LSB, the output value will be saturated when the incident light amount is N(e−) in the case of differential reading, whereas the output value will not be saturated until 8N(e−) in the case of SF reading. At this time, the synthesis processing unit 430 is only required to multiply Dout2 (=D2−P2) by a factor of eight times (digital gain).

[Operation Example of the Solid-State Imaging Element]

Figure 10:
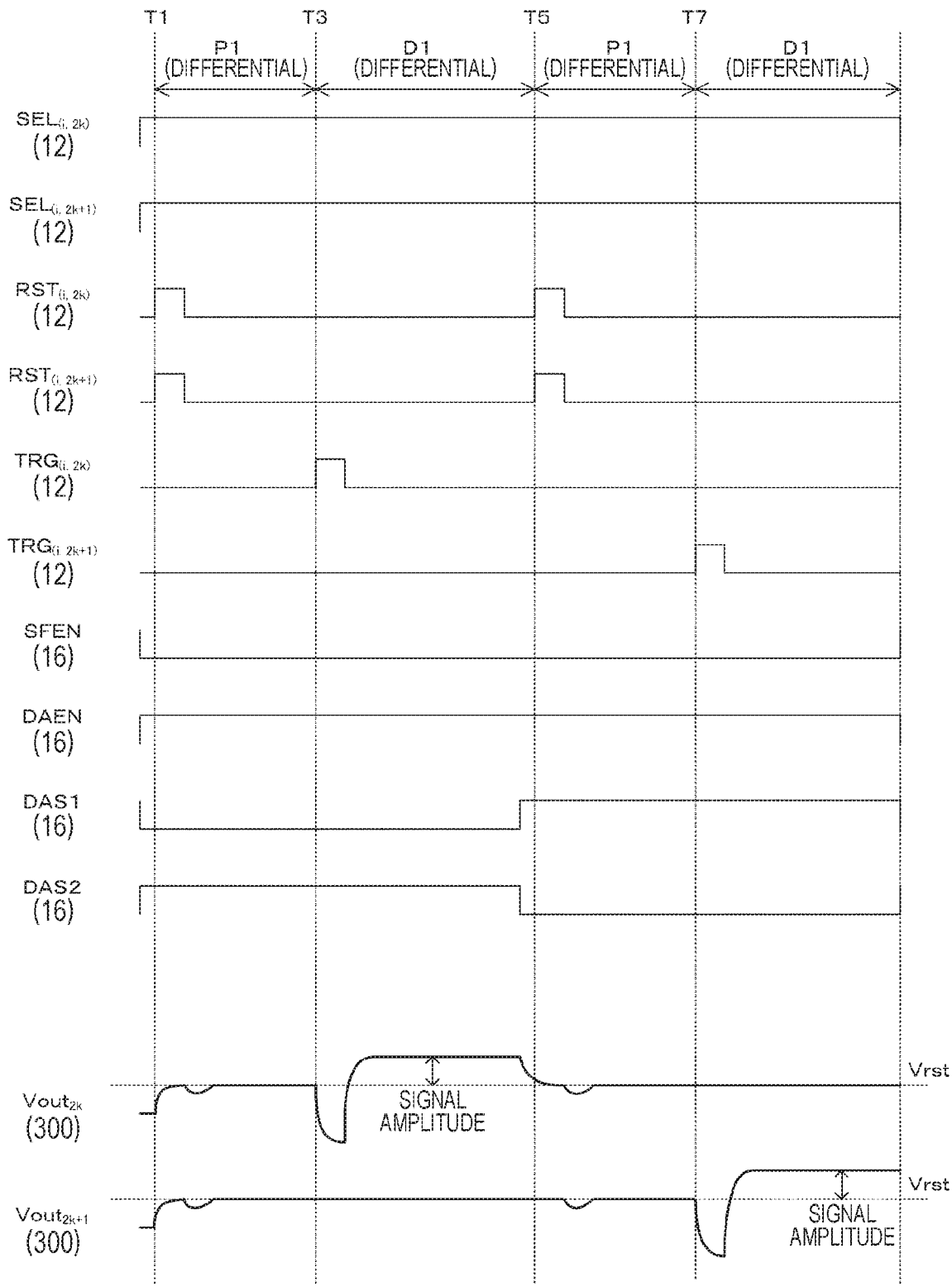
FIG. 10 is a timing chart illustrating an example of differential reading according to the first embodiment of the present technology.

FIG. 10 is a timing chart illustrating an example of differential reading according to the first embodiment of the present technology. For example, the vertical drive unit 12 supplies the drive signals $RS_{(i,2k)}$ and $RST_{(i,2k+1)}$ at timing T1, and supplies the drive signal $TRG_{(i,2k)}$ at timing T3. Then, the vertical drive unit 12 supplies the drive signals $RST_{(i,2k)}$ and $RST_{(i,2k+1)}$ at timing T5, and supplies the drive signal $TRG_{(i,2k+1)}$ at timing T7. The drive signals $SEL_{(i,2k)}$ and $SEL_{(i,2k+1)}$ are controlled to high level.

Furthermore, the system control unit 16 sets the drive signal SFEN to low level and sets the drive signal DAEN to high level. Therefore, the differential amplifier circuit is constituted. The system control unit 16 sets the drive signal DAS1 to low level and the drive signal DAS2 to high level from immediately before the timing T1 to immediately before the timing T5. Therefore, the pixel (i,2k) becomes the read pixel and the pixel (i,2k+1) becomes the reference pixel. Then, the system control unit 16 sets the drive signal DAS1 to high level and the drive signal DAS2 to low level after immediately before the timing T5. Therefore, the reference pixel and the read pixel are interchanged.

By the above control, the P1 level pixel signal $Vout_{2k}$ (differentially amplified signal) is read during the period from the timings T1 to T3, and the D1 level pixel signal $Vout_{2k}$ is read during the period from the timings T3 to T5. The P1 level pixel signal $Vout_{2k+1}$ is read during the period from the timings T5 to T7, and the D1 level pixel signal $Vout_{2k+1}$ is read after the timing T7.

The differential reading described above is performed within the 1 V period in the differential mode. Furthermore, in the HDR mode, the SF reading is performed in addition to this differential reading.

Figure 11:
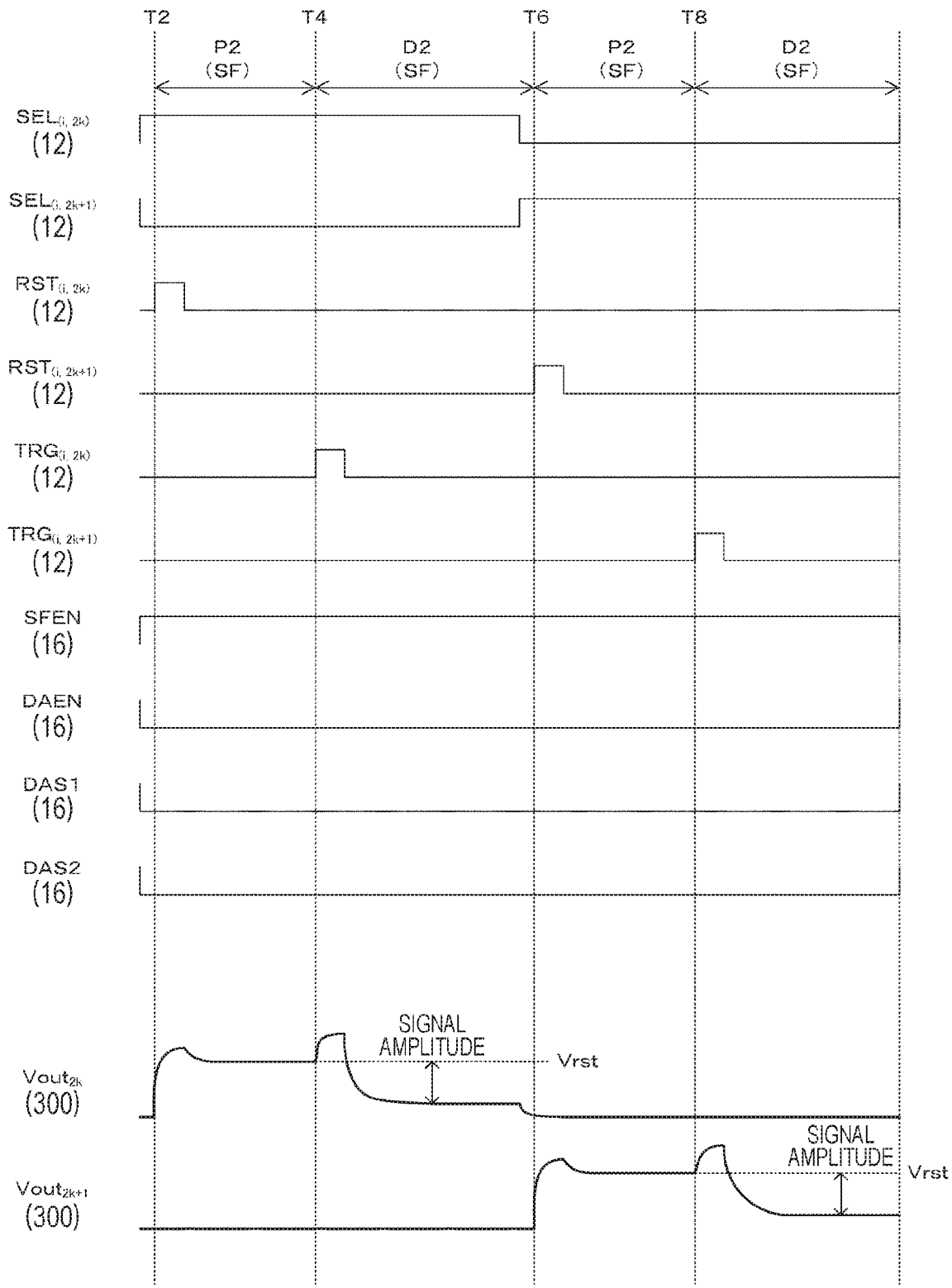
FIG. 11 is a timing chart illustrating an example of source follower (SF) reading according to the first embodiment of the present technology.

FIG. 11 is a timing chart illustrating an example of SF reading according to the first embodiment of the present technology. For example, the vertical drive unit 12 supplies the drive signal $RST_{(i,2k)}$ at the timing T2, and supplies the drive signal $TRG_{(i,2k)}$ at the timing T4. Then, the vertical drive unit 12 supplies the drive signal $RST_{(i,2k+1)}$ at the timing T6, and supplies the drive signal $TRG_{(i,2k+1)}$ at the timing T8. The drive signal $SEL_{(i,2k)}$ is controlled to high level until immediately before the timing T6, and $SEL_{(i,2k+1)}$ is controlled to low level. Furthermore, thereafter, the drive signal $SEL_{(i,2k)}$ is controlled to low level and $SEL_{(i,2k+1)}$ is controlled to high level.

Furthermore, the system control unit 16 sets the drive signal SFEN to high level and the drive signal DAEN to low level. Therefore, the source follower circuit is constituted. The drive signals DAS1 and DAS2 are controlled to low level.

By the above control, the P2 level pixel signal $Vout_{2k}$ is read during the period from the timings T2 to T4, and the D2 level pixel signal $Vout_{2k}$ is read during the period from the timings T4 to T6. The P2 level pixel signal $Vout_{2k}+1$ is read during the period from the timings T6 to T8, and the D2 level pixel signal $Vout_{2k+1}$ is read after the timing T8.

The SF reading described above is performed within the 1 V period in the SF mode. Furthermore, in the HDR mode, the differential reading is performed in addition to this SF reading.

Figure 12:
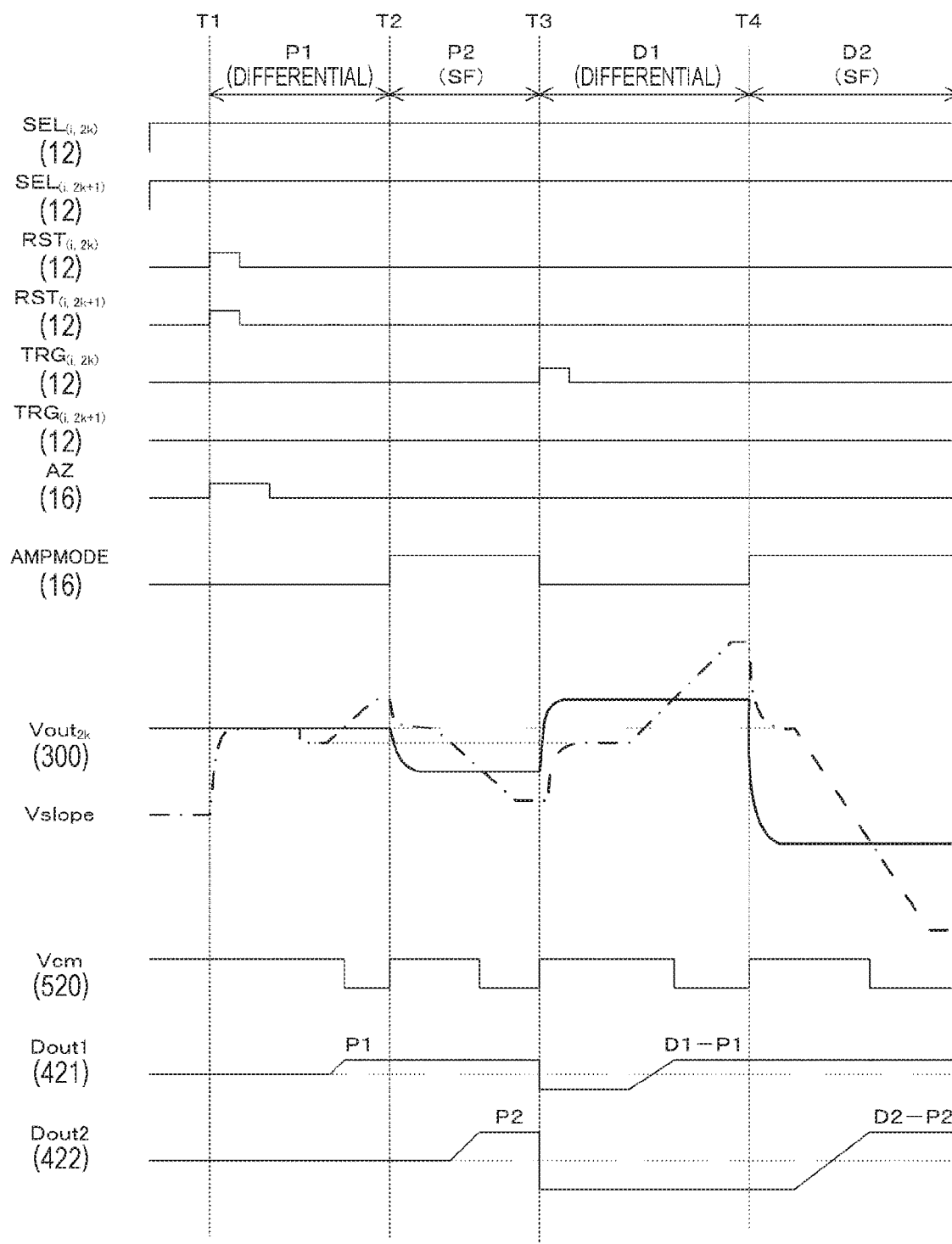
FIG. 12 is a timing chart illustrating an example of control for reading a pixel signal according to the first embodiment of the present technology.

FIG. 12 is a timing chart illustrating an example of control for reading a pixel signal according to the first embodiment of the present technology. This read control is executed each time the 1 V period elapses (in other words, each time the exposure of the reference pixel and the read pixel is ended).

The vertical drive unit 12 supplies the drive signals $RST_{(i,2k)}$ and $RST_{(i,2k+1)}$ at the timing T1, and supplies the drive signal $TRG_{(i,2k)}$ at the timing T3. The drive signals $SEL_{(i,2k)}$ and $SEL_{(i,2k+1)}$ are controlled to high level.

Furthermore, the system control unit 16 supplies the drive signal AZ at the timing T1, sets AMPMODE indicating whether or not differential reading is performed to low level between the timings T1 and T2, and sets AMPMODE to high level between the timings T2 and T3.

The comparator 520 compares the pixel signal $Vout_{2k}$ with the reference signal $V_{slope}$ and outputs the comparison result Vcm.

Furthermore, the system control unit 16 sets an initial value (such as "0") to the counter 421 at the timing T1 and causes the counter 421 to start counting. The counter 421 counts until the comparison result Vcm is inverted. Therefore, the P1 level from the differential amplifier circuit is converted into a digital signal.

The system control unit 16 sets an initial value (such as "0") to the counter 422 at the timing T2 and causes the counter 422 to start counting. The counter 422 counts until the comparison result Vcm is inverted. Therefore, the P2 level from the source follower circuit is converted into a digital signal.

Then, the system control unit 16 inverts the positive and negative of the held value of the counter 421 at the timing T3 and causes the counter 421 to start counting from the value. The counter 421 counts until the comparison result Vcm is inverted. Therefore, the D1 level from the differential amplifier circuit is converted into a digital signal. Since the counting is started from the inverted value of the P1 level, the digital signal Dout1 at the end of the counting shows the difference between the D1 level and the P1 level.

Then, the system control unit 16 inverts the positive and negative of the held value of the counter 422 at the timing T3 and causes the counter 422 to start counting from the value after the timing T4. The counter 422 counts until the comparison result Vcm is inverted. Therefore, the D2 level from the source follower circuit is converted into a digital signal. Since the counting is started from the inverted value of the D2 level, the digital signal Dout2 at the end of the counting shows the difference between the D2 level and the P2 level.

Next, the read pixel and the reference pixel are interchanged, and the similar control is performed. Therefore, two columns are read. After that, the similar control is repeated until all columns are read.

Note that the column reading circuit unit 13 reads in the order of P1, P2, D1, and D2 levels, but the order is not limited to this. Furthermore, as described later, only one of the D1 level and the D2 level can be read. That is, the column reading circuit unit 13 reads the P1 level and the P2 level and at least one of the D1 level or the D2 level.

By synthesizing these digital signals Dout1 and Dout2, pixel data of a synthesis frame having a wide dynamic range can be obtained.

FIG. 13 is a diagram illustrating an example of operations of the column reading circuit unit 13 and the column signal processing unit 14 according to the first embodiment of the present technology and a comparative example. In the drawing, a illustrates an example of the operation of the HDR mode of the first embodiment. In the drawing, b illustrates an example of the operation of the comparative example in which only one of differential reading and SF reading is performed within the 1 V period.

The column reading circuit unit 13 in the HDR mode sequentially performs differential reading and SF reading at the end of exposure in the 1 V period (1/60 seconds or the like) from the timing T0 to the timing T10. Furthermore, the column signal processing unit 14 synthesizes the differentially read signal and the SF read signal to generate an HDR frame. Similarly, after the timing T10, the differential reading and the SF reading are sequentially performed each time the 1 V period elapses (in other words, each time the exposure ends). Therefore, a synthesis frame having a wide dynamic range is generated each time the 1 V period elapses.

On the other hand, in the comparative example, the column reading circuit unit 13 only performs differential reading at the end of exposure in the 1 V period from the timing T0 to the timing T10. Then, the column reading circuit unit 13 only performs SF reading at the end of exposure in the 1 V period from the timing T10 to timing T20. The column signal processing unit 14 can generate a synthesis frame by synthesizing a frame obtained by differential reading and a frame obtained by SF reading. Note that the solid-state imaging element can read a plurality of frames by changing the exposure time and synthesize them in the SF mode only. Similarly, in this case, a synthesis frame having a wide dynamic range can be generated.

In the comparative example, the dynamic range can be expanded, but the frame rate of the synthesis frame decreases. For example, in a case where a plurality of frames is captured at a frame rate of 60 hertz (Hz) and two frames are synthesized, the frame rate of the synthesis frame is reduced to 30 hertz (Hz).

On the other hand, in the solid-state imaging element 10 that performs both differential reading and SF reading within a 1 V period, it is possible to generate a synthesis frame for each 1 V period, and thus it is possible to suppress a reduction in frame rate.

Figure 14:
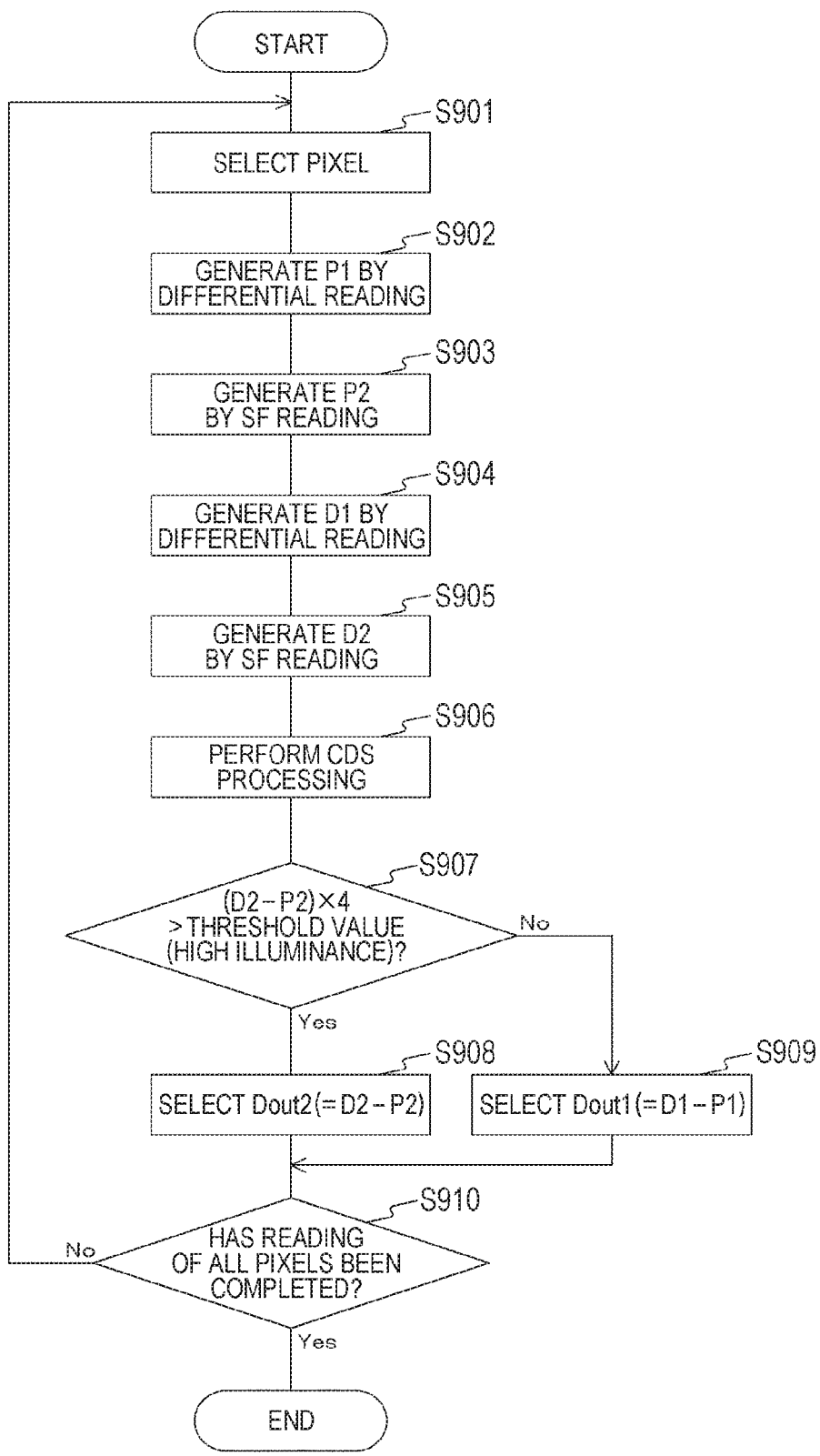
FIG. 14 is a flowchart illustrating an example of an operation of a solid-state imaging element according to the first embodiment of the present technology.

FIG. 14 is a flowchart illustrating an example of the operation of the solid-state imaging element 10 according to the first embodiment of the present technology. This operation is started, for example, when the HDR mode is set.

At the end of exposure, the vertical drive unit 12 and the system control unit 16 select a pixel to be read (step S901), control the pixel, and generate a P1 level by differential reading (step S902). Then, the vertical drive unit 12 and the like generate a P2 level by the SF reading (step S903) and generate a D1 level by the differential reading (step S904). The vertical drive unit 12 and the like generate a D2 level by the SF reading (step S905). The ADC 420 performs the CDS processing (step S906), and the synthesis processing unit 430 determines whether or not the difference between the D2 level and the P2 level related to SF reading exceeds a threshold value (that is, high illuminance) (step S907).

In a case where the difference exceeds the threshold value (step S907: Yes), the synthesis processing unit 430 selects the digital signal Dout2 indicating the difference between the D2 level and the P2 level and outputs it as the pixel data SIG (step S908). On the other hand, in a case where the difference is equal to or less than the threshold value (step S907: No), the synthesis processing unit 430 selects the digital signal Dout1 indicating the difference between the D1 level and the P1 level and outputs it as the pixel data SIG (step S909).

After step S908 or S909, the vertical drive unit 12 determines whether or not reading of all pixels has been completed (step S910). In a case where reading of all pixels has not been completed (step S910: No), the vertical drive unit 12 repeats step S901 and subsequent steps. On the other hand, in a case where reading of all pixels is completed (step S910: Yes), the solid-state imaging element 10 ends an operation for capturing. In a case where two or more synthesis frames are continuously captured, the processing from step S901 to step S910 is repeatedly executed in synchronization with the vertical synchronization signal.

As described above, according to the first embodiment of the present technology, the solid-state imaging element 10 can synthesize the differentially amplified signal with a large gain and the pixel signal in the SF mode with a small gain to widen the dynamic range compared with the case where synthesis is not performed.

2. Second Embodiment

In the above-described first embodiment, the solid-state imaging element 10 performs differential reading, but there is a possibility that the differential reading increases the signal amplification factor and noise is also amplified. The solid-state imaging element 10 of the second embodiment differs from that of the first embodiment in that noise is suppressed by horizontally connecting nodes in the column reading circuit unit 13.

Figure 15:
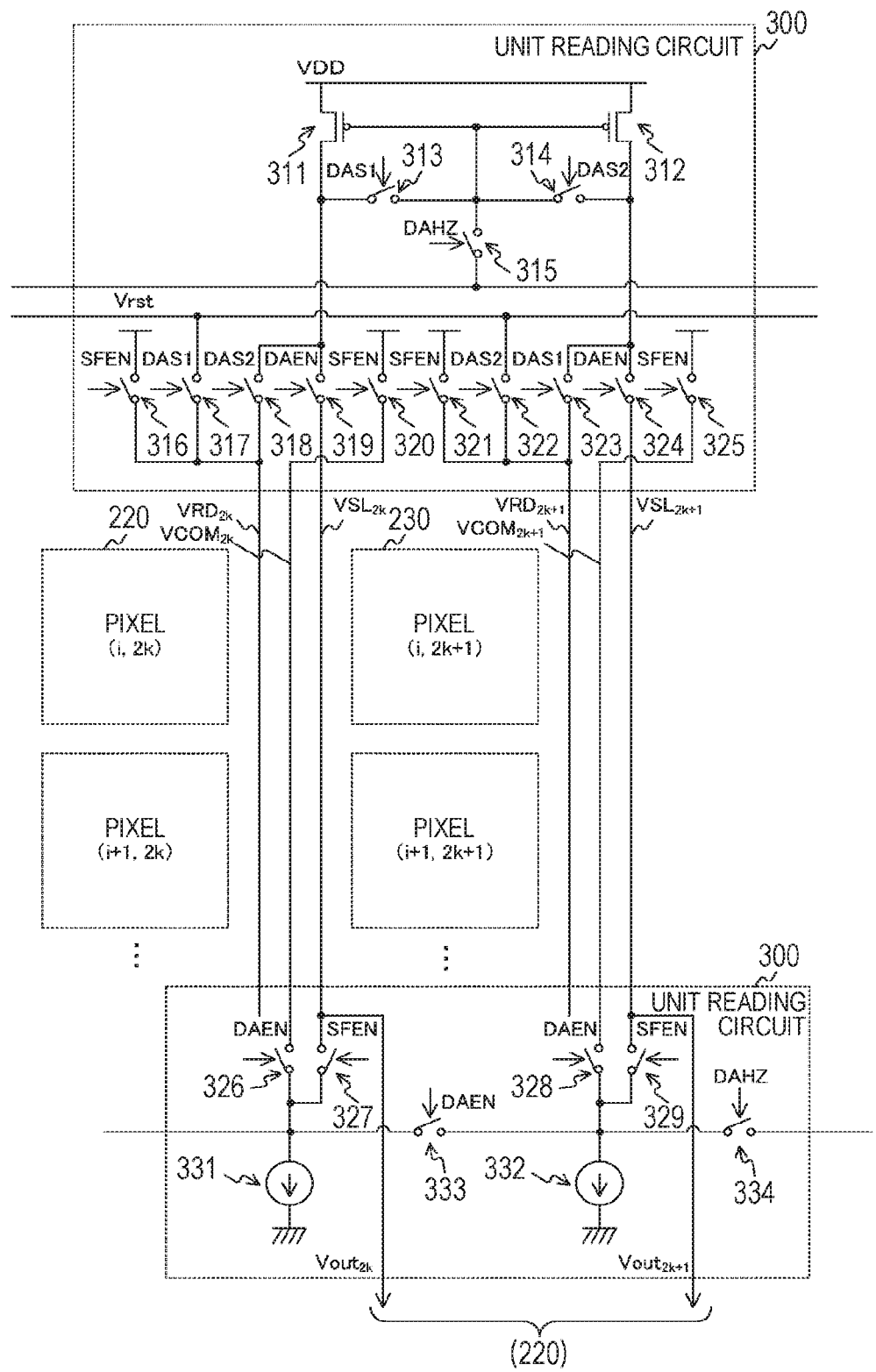
FIG. 15 is a circuit diagram illustrating a configuration example of a unit reading circuit according to a second embodiment of the present technology.

FIG. 15 is a circuit diagram illustrating a configuration example of the unit reading circuit 300 according to the second embodiment of the present technology. The unit reading circuit 300 of the second embodiment differs from that of the first embodiment in that the unit reading circuit 300 further includes switches 315, 333, and 334.

The switch 315 connects the gates of the P-type transistors 311 and 312 and one end of each of the switches 313 and 314 to a horizontal signal line wired in the horizontal direction according to a drive signal DAHZ from the system control unit 16. For example, when a high level drive signal DAHZ is supplied, the switch 315 shifts to the ON state.

The system control unit 16 can horizontally connect a plurality of horizontally arranged current mirror circuits by supplying the high level drive signal DAHZ.

The switch 333 connects the connection point of the current source 331 and the switch 326 and the connection point of the current source 332 and the switch 328 according to a drive signal DAEN from the system control unit 16. For example, the switch 333 connects the current sources 331 and 332 when the high level drive signal DAEN is supplied.

Furthermore, the switch 334 connects the connection point of the current source 332 and the switch 328 and the connection point of the current source 331 and the switch 326 in an adjacent unit reading circuit 300 according to the drive signal DAHZ. For example, the switch 334 connects the current sources 332 and 331 when the high level drive signal DAHZ is supplied.

The system control unit 16 can horizontally connect a plurality of horizontally arranged current sources by supplying the high level drive signal DAEN or DAHZ.

By performing such horizontal connection, it is possible to connect both the source side and the drain side of the amplification transistor of each pixel, and suppress the noise generated at each horizontally connected node according to the number of horizontal connections.

Note that although all the switches 315, 333, and 334 are arranged, only the switch 315 or only the switches 333 and 334 can be arranged. By arranging all of them, the noise suppression effect can be increased.

As for the unit of horizontal connection, the greater the number of columns, the greater the noise suppression effect. Not only in a case where all pixel pairs (differential pairs) in the pixel array arranged in the pixel array unit 11 are connected, the effect of noise reduction can be obtained by horizontal connection in units of two columns or more.

For example, pixels may be separated by colors of R (Red), G (Green), and B (Blue) and connected horizontally, horizontal connections are performed in a plurality of regions according to the angle of view, or such regions may be switched depending on mode.

Figure 16:
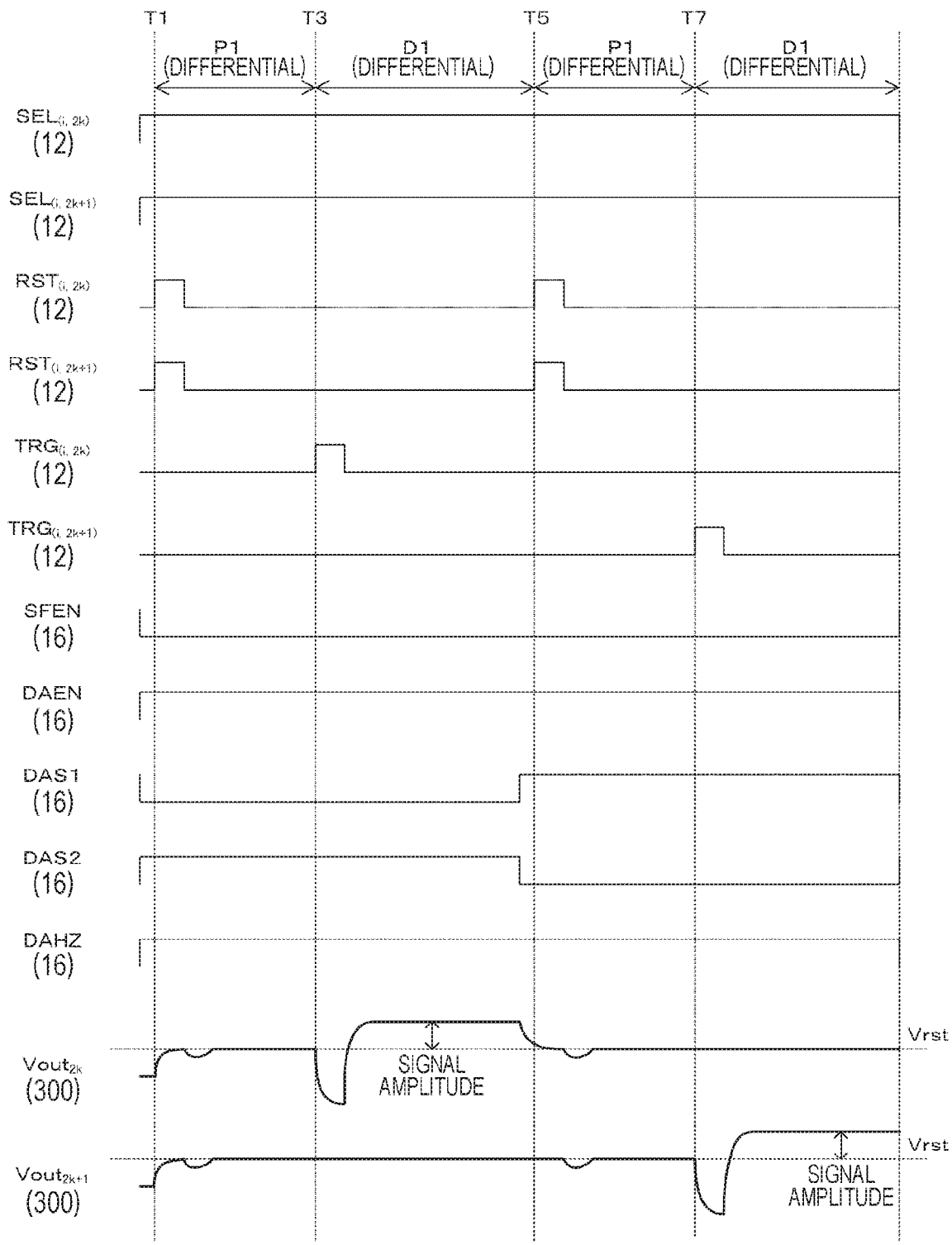
FIG. 16 is a timing chart illustrating an example of differential reading according to the second embodiment of the present technology.

FIG. 16 is a timing chart illustrating an example of differential reading according to the second embodiment of the present technology. In the second embodiment, the system control unit 16 further supplies a high level drive signal DAHZ. Therefore, it is possible to suppress noise by means of horizontal connection at the time of differential reading.

Figure 17:
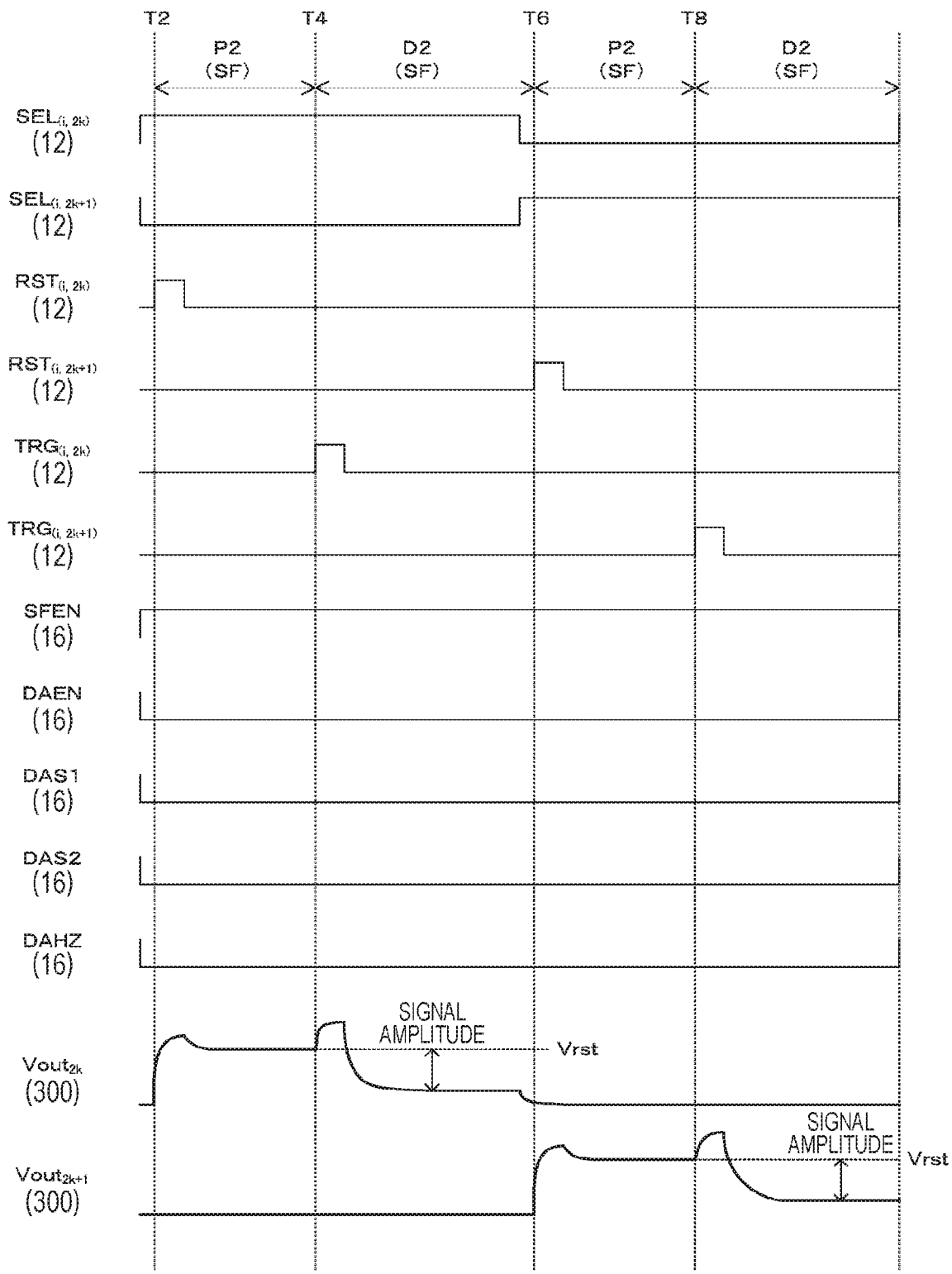
FIG. 17 is a timing chart illustrating an example of SF reading according to the second embodiment of the present technology.

FIG. 17 is a timing chart illustrating an example of SF reading according to the second embodiment of the present technology. In the second embodiment, the system control unit 16 further supplies a low level drive signal DAHZ.

As described above, according to the second embodiment of the present technology, since the switches 315, 333, and 334 horizontally connect the current mirror circuits and the current sources at the time of the differential reading, noise can be suppressed and signal quality can be increased.

3. Third Embodiment

In the above-described first embodiment, the counters 421 and 422 are arranged for every two columns to perform counting, but there is a possibility that the circuit scale increases as the number of columns increases. The solid-state imaging element 10 of the third embodiment differs from that of the first embodiment in that one counter is reduced for every two columns.

Figure 18:
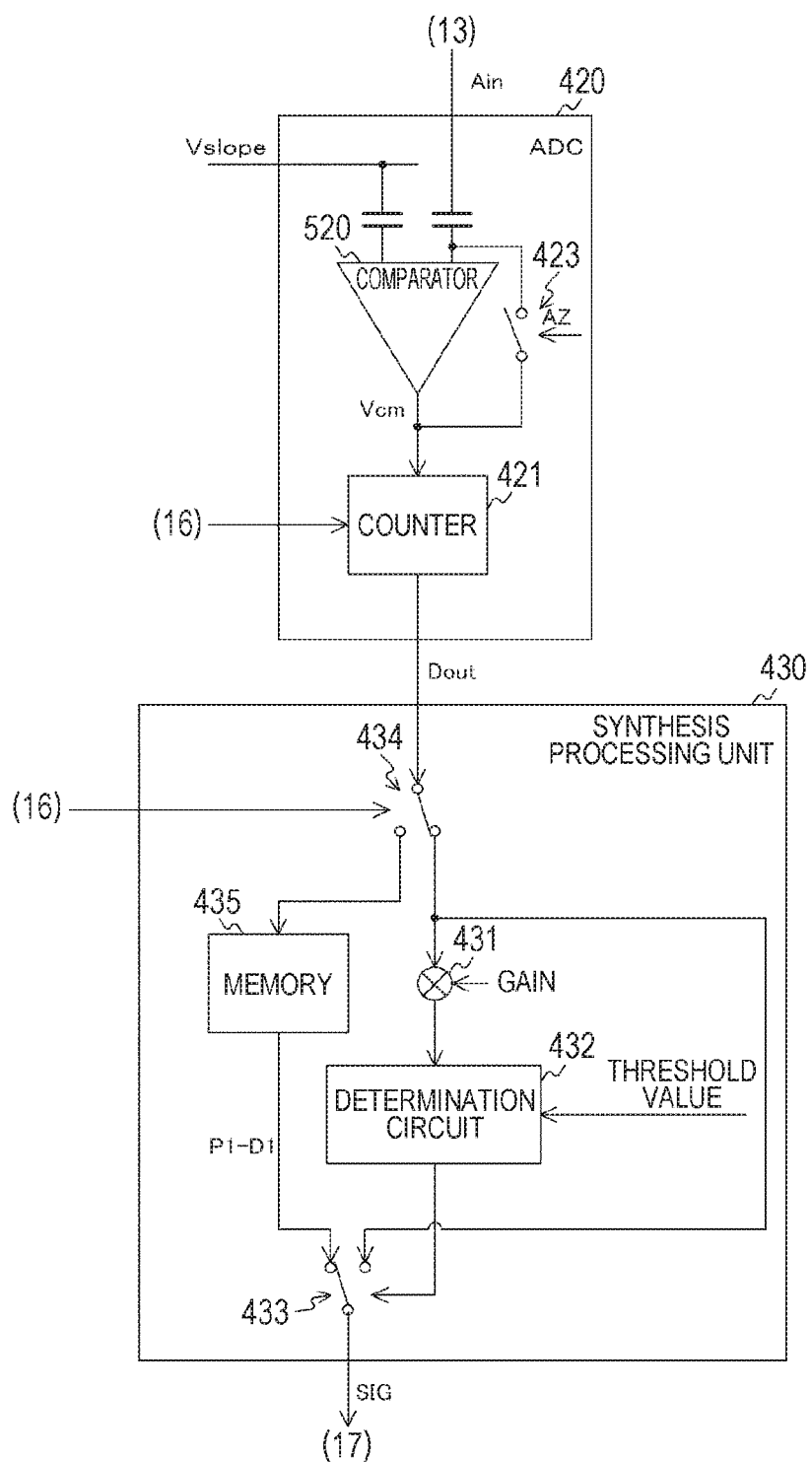
FIG. 18 is a circuit diagram illustrating a configuration example of an ADC and a synthesis processing unit according to a third embodiment of the present technology.

FIG. 18 is a circuit diagram illustrating a configuration example of an ADC 420 and a synthesis processing unit 430 according to the third embodiment of the present technology. The ADC 420 of the third embodiment is different from that of the first embodiment in that the counter 422 is not arranged. Furthermore, the synthesis processing unit 430 of the third embodiment differs from that of the first embodiment in that the synthesis processing unit 430 further includes a switch 434 and a memory 435. The ADC 420 of the third embodiment outputs the digital signal Dout.

The switch 434 supplies the digital signal Dout to either the multiplier 431 or the memory 435 under the control of the system control unit 16.

The memory 435 holds the digital signal Dout (=P1−D1) at the time of differential reading as Dout1.

The switch 434 of the third embodiment selects either Dout2, which is the digital signal Dout at the time of SF reading, or digital signal Dout1 held in the memory 435.

Figure 19:
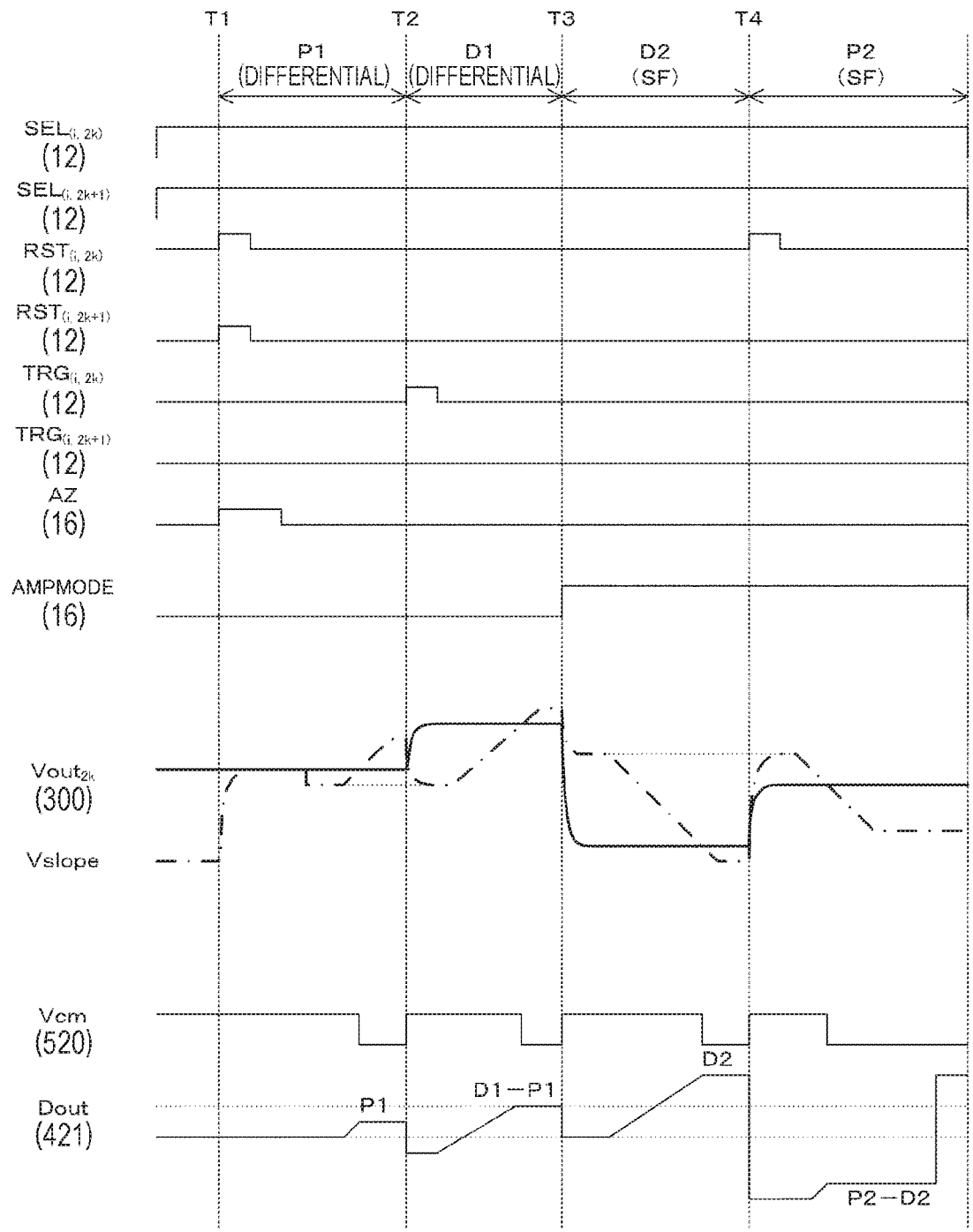
FIG. 19 is a timing chart illustrating an example of an operation of a solid-state imaging element according to the third embodiment of the present technology.

FIG. 19 is a timing chart illustrating an example of an operation of the solid-state imaging element 10 according to the third embodiment of the present technology. The vertical drive unit 12 causes the P1 level to be generated by the differential reading during the timings T1 to T2, and causes the D1 level to be generated by the differential reading during the timings T2 to T3.

Furthermore, the system control unit 16 inverts the sign of the count value of the counter 421 at the timing T2. Therefore, the digital signal Dout at the end of counting indicates the difference between the D1 level and the P1 level. Furthermore, the system control unit 16 controls the switch 434 and holds the difference between the D1 level and the P1 level as the digital signal Dout1 in the memory 435.

The vertical drive unit 12 causes D2 level to be generated by the SF reading between timings T3 and T4, and causes the P2 level to be generated by the differential reading after the timing T4. Furthermore, the system control unit 16 initializes the counter 421 at the timing T3, and reverses the sign of the count value at the timing T4. Therefore, the digital signal Dout at the end of counting indicates the difference between the D2 level and the P2 level. The system control unit 16 controls the switch 434 and supplies the difference between the D2 level and the P2 level to the multiplier 431 as the digital signal Dout2.

Here, the difference between the D2 level and the P2 level is a double data sampling (DDS) reading signal having no correlation with kTC noise in the floating diffusion region. This DDS reading has more noise than CDS reading. However, SF reading is targeted at bright signals, and optical shot noise is dominant at bright time, so that the influence of noise increase can be ignored.

The synthesis processing unit 430 selects either the digital signal Dout1 for differential reading or the digital signal Dout2 for SF reading, which is held in the memory 435. Therefore, HDR synthesis processing is performed.

As described above, according to the third embodiment of the present technology, since the P1 level, the D1 level, the D2 level, and the P2 level are sequentially read, the counter 421 can sequentially obtain the difference between the P1 level and the D1 level and the difference between the D2 level and the P2 level. Therefore, it is possible to reduce the counter 422 that operates in parallel with the counter 421 and obtains the difference between the P2 level and the D2 level.

Variation Example

In the above-described third embodiment, the ADC 420 AD-converts all of the P1, D1, D2, and P2 levels, but as the number of columns increases, there is a possibility that the number of times of conversion increases and power consumption increases. The ADC 420 of a variation example of the third embodiment is different from the third embodiment in that power consumption is reduced by stopping AD conversion of the D2 level and the P2 level related to SF reading at the time of low illuminance.

Figure 20:
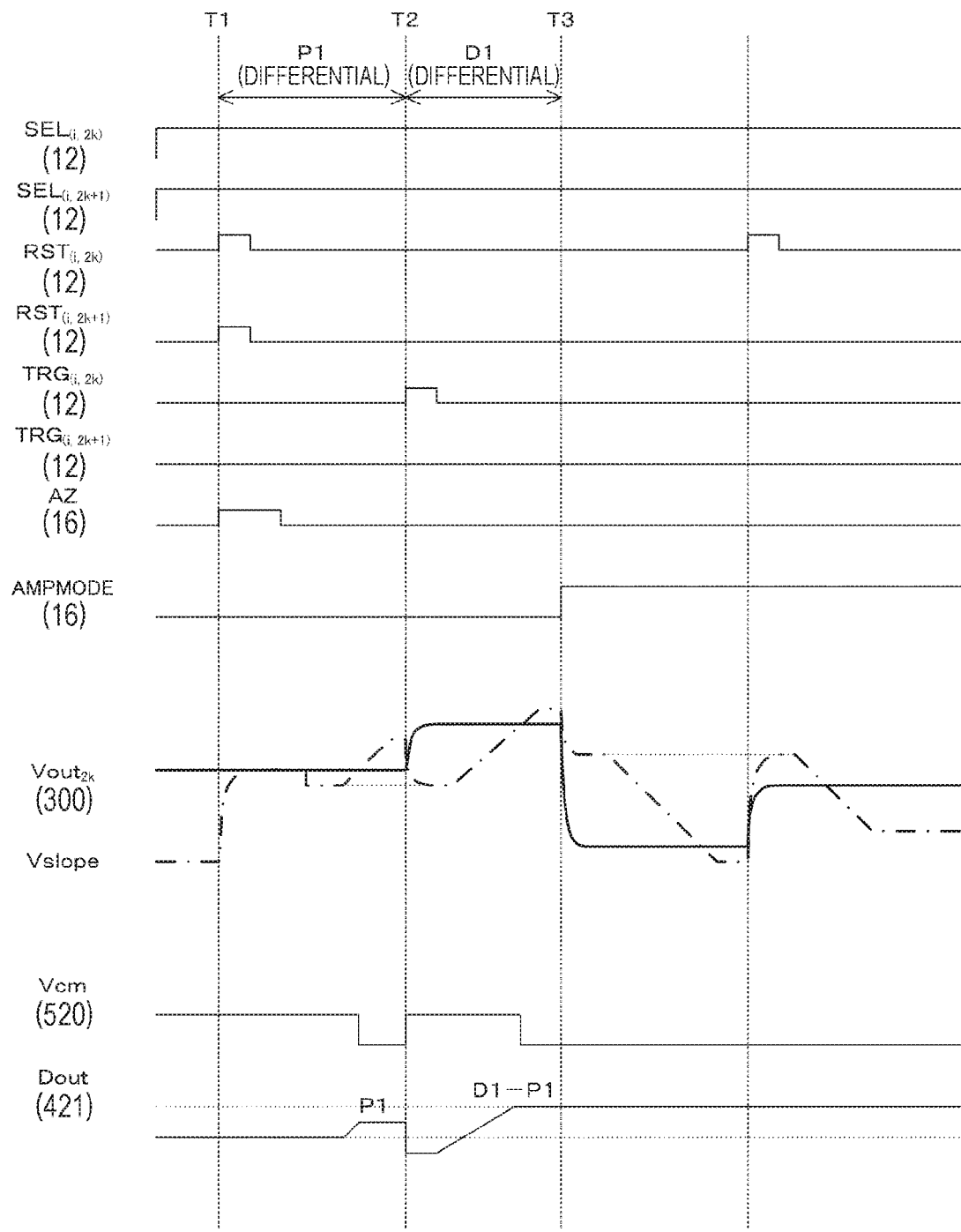
FIG. 20 is a timing chart illustrating an example of an operation of a solid-state imaging element according to a variation example of the third embodiment of the present technology.

FIG. 20 is a timing chart illustrating an example of an operation of the solid-state imaging element 10 according to the variation example of the third embodiment of the present technology. The system control unit 16 of the variation example of the third embodiment refers to the determination result of the determination circuit 432 at the timing T3, and determines whether or not the difference between the D1 level and the P1 level exceeds the threshold value (that is, the illuminance is higher than a predetermined value). Then, in a case where the illuminance is equal to or less than the predetermined value, the system control unit 16 disables the counter 421 and stops the AD conversion of the D2 level and the P2 level.

On the other hand, in a case where the illuminance exceeds the predetermined value, the system control unit 16 operates the counter 421 to AD-convert the D2 level and the P2 level.

As described above, according to the variation example of the third embodiment of the present technology, in a case where the illuminance is equal to or less than a predetermined value, the counter 421 does not perform AD conversion of the D2 level and the P2 level. Therefore, it is possible to reduce power consumption as compared with the case where the conversion is performed, regardless of the illuminance.

4. Fourth Embodiment

In the above-described third embodiment, the ADC 420 reads and AD-converts all of the P1, P2, D1, and D2 levels, but as the number of columns increases, there is a possibility that the number of times of conversion increases and reading speed can be reduced. The ADC 420 of the variation example of the fourth embodiment differs from that of the third embodiment in that the reading speed is improved by reading only one of the D1 level and the D2 level.

Figure 21:
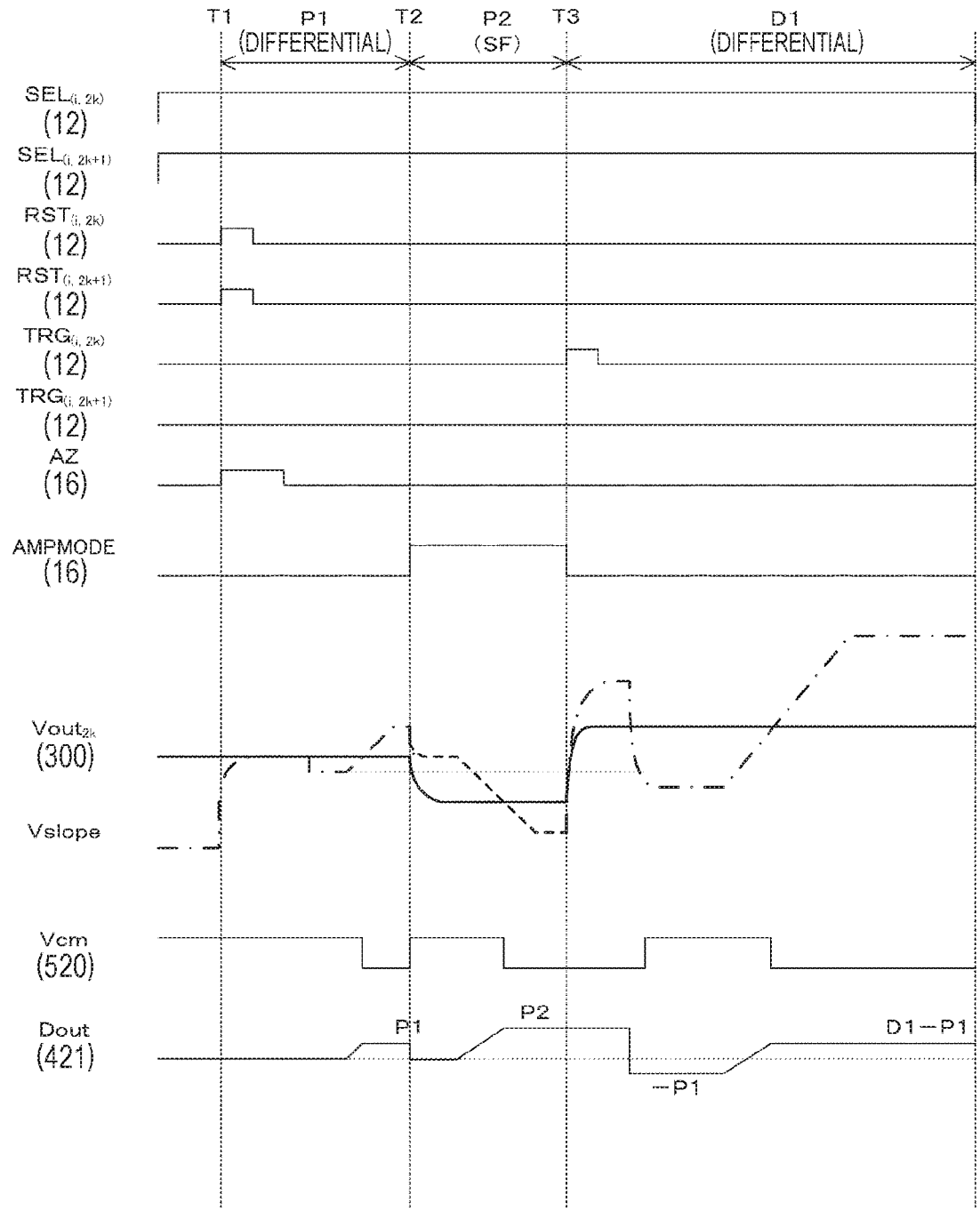
FIG. 21 is a timing chart illustrating an example of an operation of a solid-state imaging element at the time of low illuminance according to a fourth embodiment of the present technology.

FIG. 21 is a timing chart illustrating an example of an operation of the solid-state imaging element at the time of low illuminance according to the fourth embodiment of the present technology. The vertical drive unit 12 causes the P1 level to be generated by the differential reading during the timings T1 to T2, and causes the P2 level to be generated by the SF reading during the timings T2 to T3.

Furthermore, the system control unit 16 controls the switch 434 and holds the P1 level in the memory 435. Then, at a predetermined timing immediately after the timing T3, the system control unit 16 refers to the comparison result Vcm of the comparator 520 and determines whether or not the comparison result Vcm is inverted (that is, the illuminance is higher than a predetermined value). In a case where the illuminance is equal to or less than the predetermined value, the system control unit 16 initializes the count value of the counter 421 to −P1. Furthermore, the vertical drive unit 12 also refers to the comparison result Vcm, and in a case where the illuminance is equal to or less than a predetermined value, causes the D1 level to be generated by differential reading. The count value of the counter 421 at the end of counting is the difference between the D1 level and the P1 level. The difference between the D1 level and the P1 level is output as it is as pixel data SIG.

Furthermore, the column signal processing unit 14 of the fourth embodiment is different from that of the third embodiment in that only the memory 435 is arranged instead of the synthesis processing unit 430.

Figure 22:
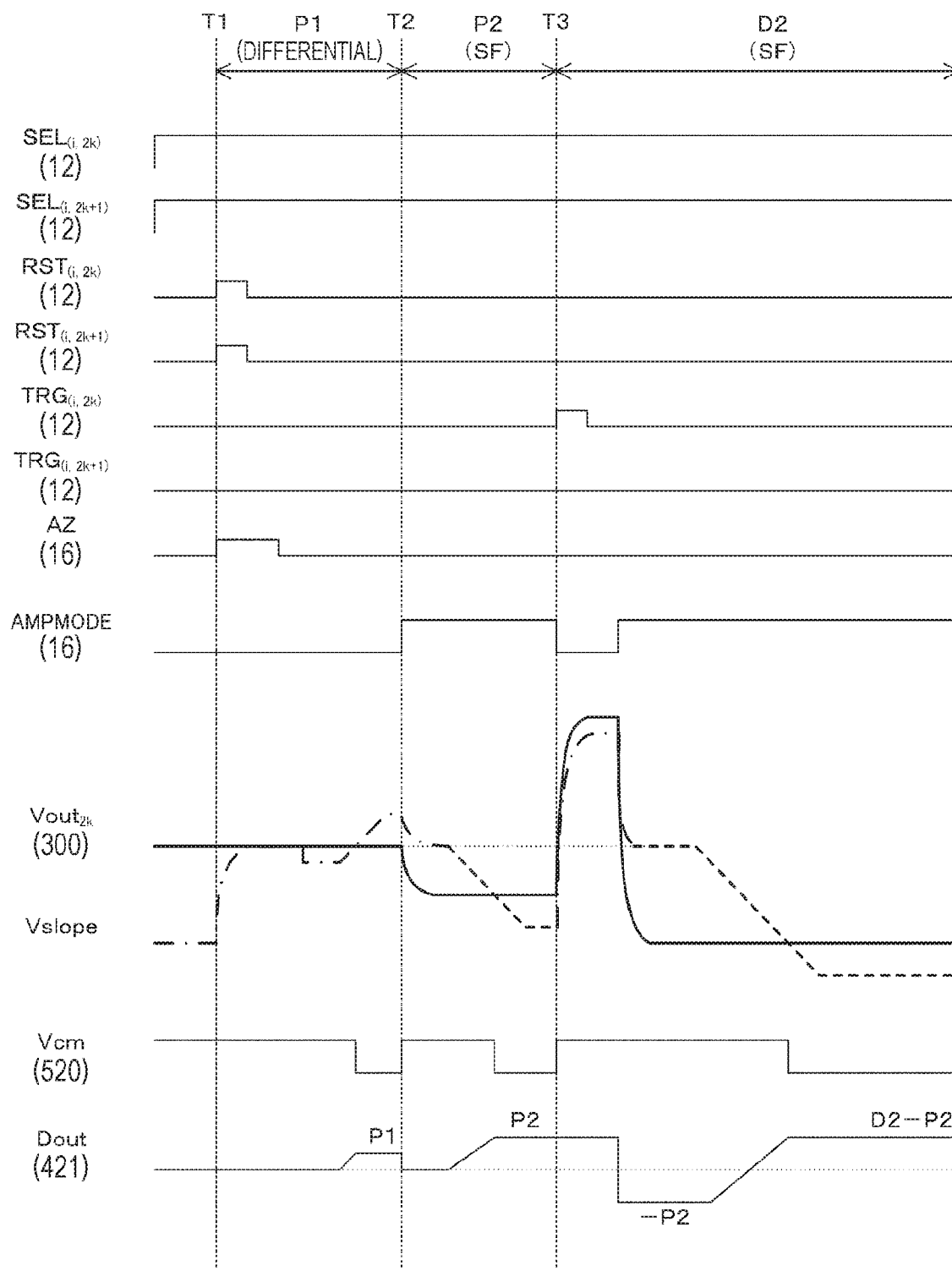
FIG. 22 is a timing chart illustrating an example of an operation of a solid-state imaging element at the time of high illuminance according to a fifth embodiment of the present technology.

FIG. 22 is a timing chart illustrating an example of an operation of the solid-state imaging element at the time of high illuminance according to the fourth embodiment of the present technology. The control up to the timing T3 is similar to that at the time of low illuminance.

Immediately after the timing T3, the system control unit 16 refers to the comparison result Vcm and determines whether or not the illuminance is higher than a predetermined value. In a case where the illuminance is higher than the predetermined value, the system control unit 16 reverses sign of the count value P2 of the counter 421. The vertical drive unit 12 also refers to the comparison result Vcm, and in a case where the illuminance is higher than a predetermined value, causes the D2 level to be generated by differential reading. The count value of the counter 421 at the end of counting is the difference between the D2 level and the P2 level. The difference between the D2 level and the P2 level is output as it is as pixel data SIG.

As described above, according to the fourth embodiment of the present technology, since only one of the D1 level and the D2 level is AD-converted according to the illuminance, the reading speed can be increased as compared with the case where both of them are AD-converted. Therefore, the frame rate of the synthesis frame can be improved.

5. Fifth Embodiment

In the above-described first embodiment, the pixels 220 and 230 adjacent in the horizontal direction are used as the read pixel and the reference pixel to perform the differential reading. However, with this configuration, there is a possibility that as the number of rows increases, the number of horizontal signal lines between the vertical drive unit 12 and the pixel array unit 11 increases. The solid-state imaging element 10 of the fifth embodiment differs from that of the first embodiment in that the number of horizontal signal lines is reduced by using the vertically adjacent pixels 220 and 230 as the read pixel and the reference pixel.

Figure 23:
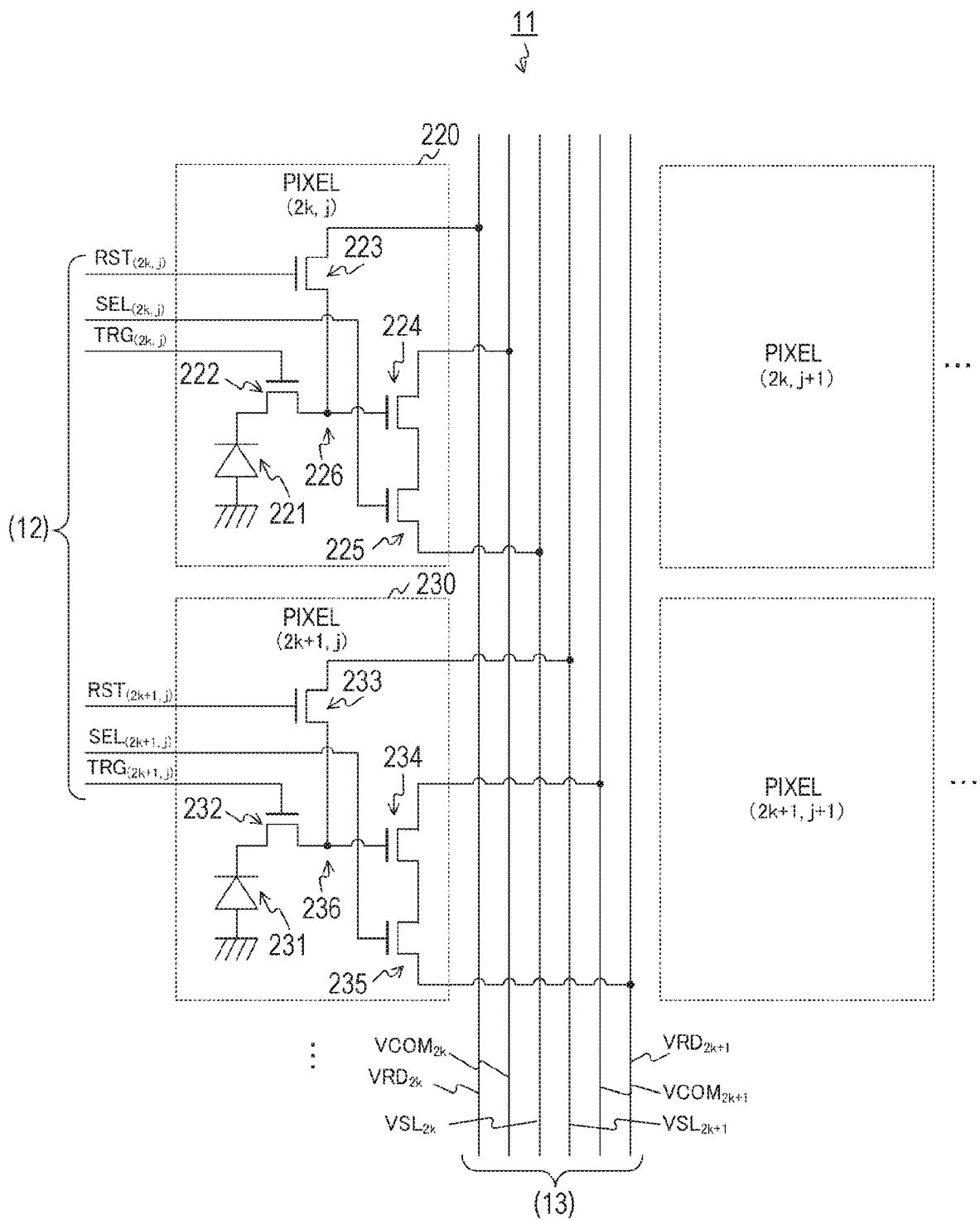
FIG. 23 is a plan view illustrating an example of a pixel array unit according to the fifth embodiment of the present technology.

FIG. 23 is a plan view illustrating an example of the pixel array unit 11 according to the fifth embodiment of the present technology. The pixel array unit 11 of the fifth embodiment is different from that of the first embodiment in that the pixel 220 is arranged in 2k row, which is an even number row and the pixel 230 is arranged in 2k+1 row, which is an odd number row.

Furthermore, three horizontal signal lines are provided for each row between the pixel array unit 11 and the vertical drive unit 12.

Furthermore, the vertical signal lines $VSL_{2k}$ and $VSL_{2k+1}$, the vertical reset input lines $VRD_{2k}$ and $VRD_{2k+1}$, and the vertical current supply lines $VCOM_{2k}$ and $VCM_{2k+1}$ are wired for each column. The pixel 220 is connected to the vertical signal line $VSL_{2k}$, the vertical reset input line $VRD_{2k}$, and the vertical current supply line $VCOM_{2k}$. On the other hand, the pixel 230 is connected to the vertical signal line $VSL_{2k+1}$, the vertical reset input line $VRD_{2k+1}$, and the vertical current supply line $VCOM_{2k+1}$.

Figure 24:
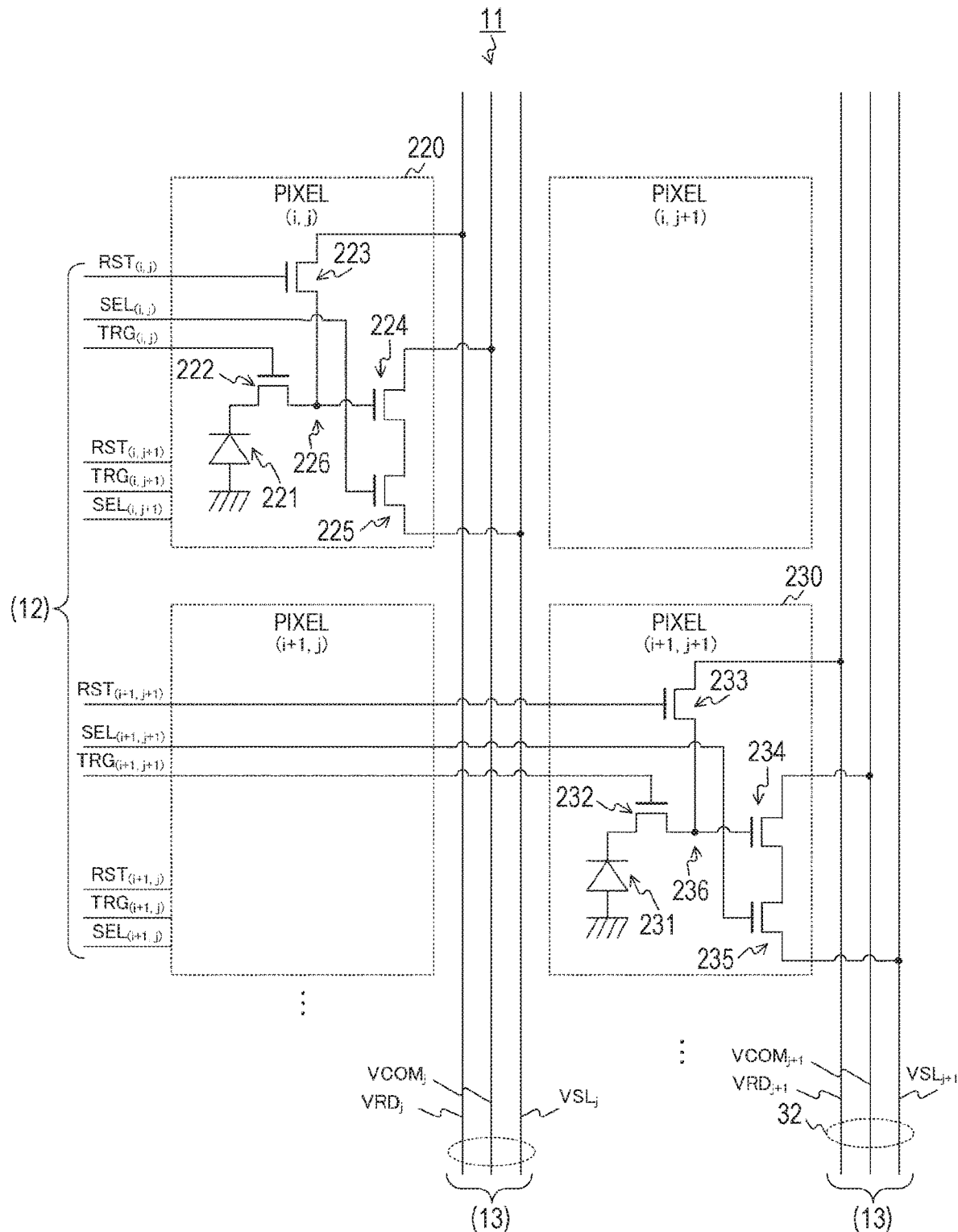
FIG. 24 is a plan view illustrating a configuration example of a diagonally arranged pixel array unit according to the fifth embodiment of the present technology.

Note that, as illustrated in FIG. 24, the pixel 220 and the pixel 230 forming a pair can be arranged at positions where both the vertical addresses and the horizontal addresses are different from each other. For example, the pixel 220 is arranged at address (i,j), and the pixel 230 is arranged at address (i+1,j+1), which is diagonally down to the right.

Thus, according to the fifth embodiment of the present technology, since the vertical drive unit 12 drives the vertically adjacent pixels 220 and 230, the number of horizontal signal lines that transmit the drive signal from the vertical drive unit 12 can be reduced.

6. Sixth Embodiment

In the above-described first embodiment, the read pixel and the reference pixel are interchanged and the differential reading is performed, but with this configuration, it is necessary to arrange a large number of switches for interchange in the column reading circuit unit 13, resulting in an increase in circuit scale because of the switches. The solid-state imaging element 10 of the sixth embodiment is different from that of the first embodiment in that the position of the reference pixel is fixed and the number of switches is reduced.

Figure 25:
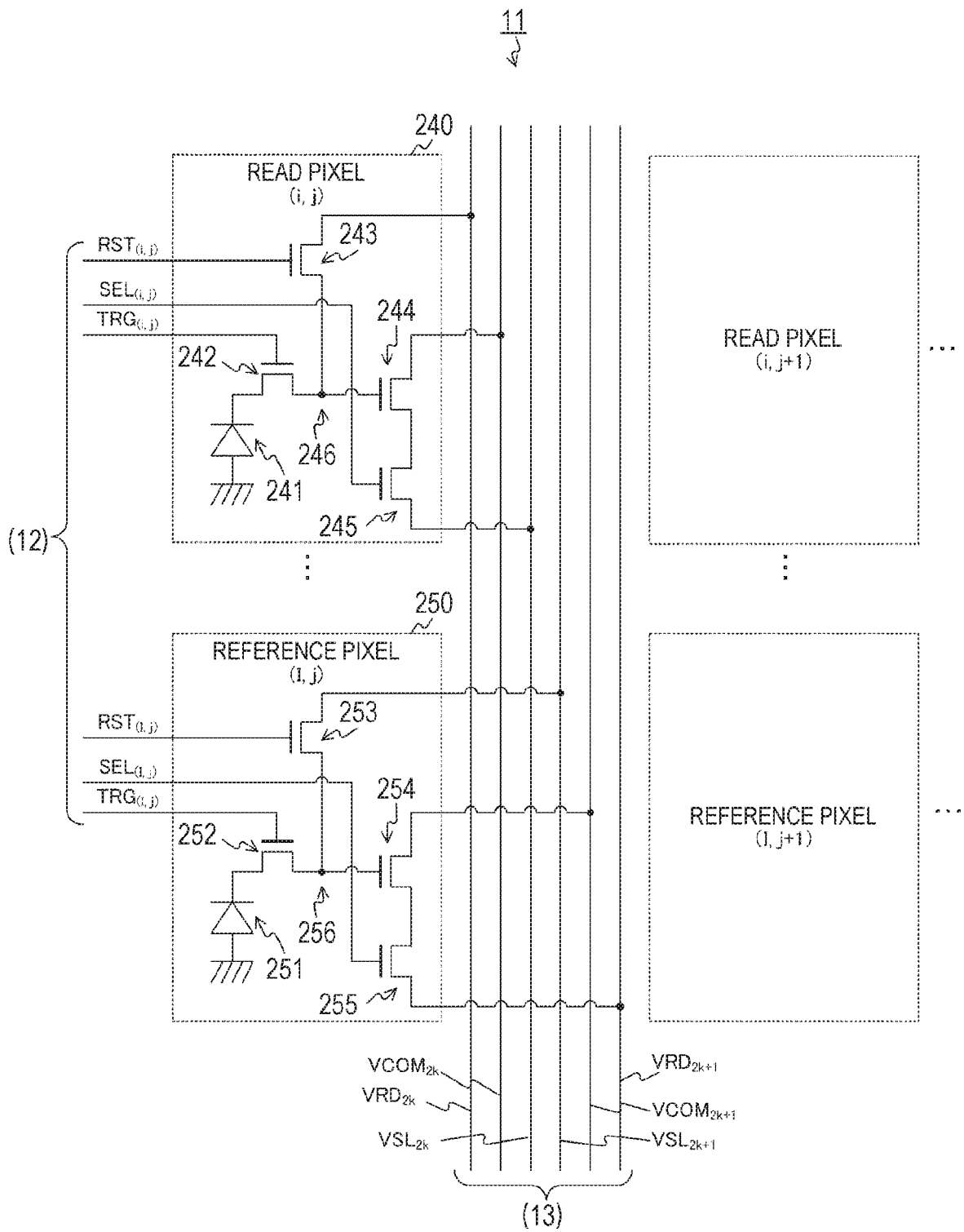
FIG. 25 is a plan view illustrating an example of a pixel array unit according to a sixth embodiment of the present technology.

FIG. 25 is a plan view illustrating an example of the pixel array unit 11 according to the sixth embodiment of the present technology. In the pixel array unit 11 of the sixth embodiment, a plurality of read pixels 240 and a plurality of reference pixels 250 are arranged in a two-dimensional grid pattern. The reference pixels 250 are arranged, for example, in a specific row. The read pixels 240 are arranged in a row different from the row of the reference pixels 250.

The read pixel 240 includes a photodiode 241, a transfer transistor 242, a floating diffusion region 246, a reset transistor 243, an amplification transistor 244, and a selection transistor 245. The connection configuration of these elements is similar to that of the pixel 220.

The reference pixel 250 is a pseudo pixel showing reset feedthrough characteristics similar to that of the read pixel 240. The reference pixel 250 includes, for example, a photodiode 251, a transfer transistor 252, a floating diffusion region 256, a reset transistor 253, an amplification transistor 254, and a selection transistor 255. The connection configuration of these elements is similar to that of the pixel 220.

Note that a pixel having a configuration similar to that of the read pixel 240 can be arranged as the reference pixel 250 except that the light-shielded pixel and the photodiode are eliminated.

Furthermore, the unit reading circuit 300 of the sixth embodiment is arranged for each column, and reads the differentially amplified signal from the reference pixel 250 in the corresponding column and any of the read pixels 240. The unit reading circuit 300 does not include a switch (switch 313 or the like) group for interchanging the read pixel and the reference pixel.

As described above, in the sixth embodiment of the present technology, since the position of the reference pixel is fixed, it is not necessary to interchange the reference pixel and the read pixel, and the circuit scale of the unit reading circuit 300 can be reduced for the switch group for interchanging.

7. Seventh Embodiment

In the above-described first embodiment, the normal current mirror circuit in which the P-type transistors 311 and 312 are connected in parallel to the power supply voltage is used, but there is a possibility that the pixel signal Vout output from the current mirror circuit fluctuates due to fluctuation in the power supply voltage. The solid-state imaging element 10 of the seventh embodiment differs from that of the first embodiment in that the cascode current mirror circuit suppresses the influence of fluctuations in the power supply voltage.

Figure 26:
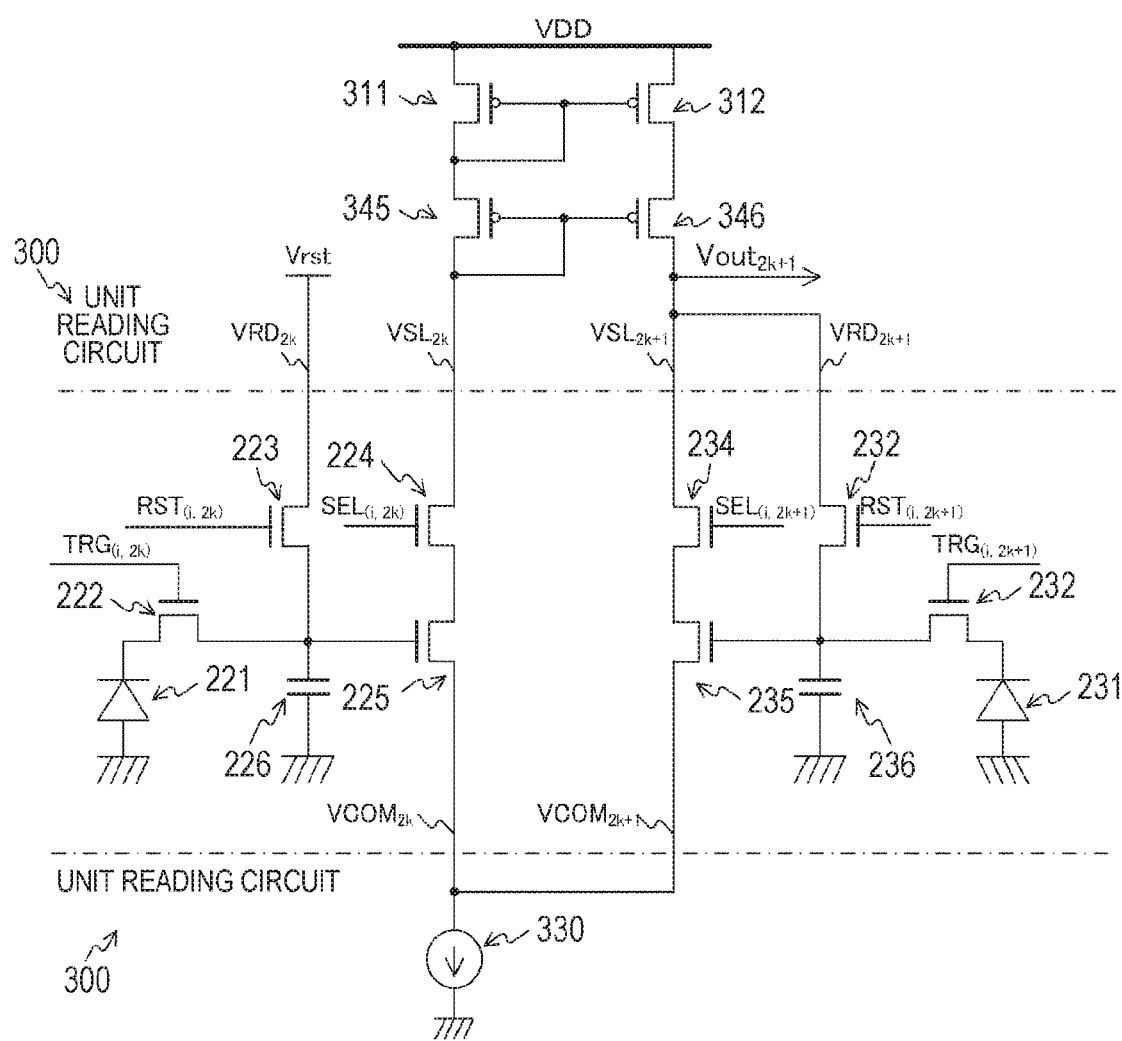
FIG. 26 is a circuit diagram illustrating a configuration example of a differential amplifier circuit according to a seventh embodiment of the present technology.

FIG. 26 is a circuit diagram illustrating a configuration example of the differential amplifier circuit according to the seventh embodiment of the present technology. The differential amplifier circuit of the seventh embodiment differs from that of the first embodiment in that the unit reading circuit 300 further includes P-type transistors 345 and 346.

The P-type transistor 345 is cascode-connected to the P-type transistor 311 and the P-type transistor 346 is cascode-connected to the P-type transistor 312. The drain and gate of the P-type transistor 345 are connected to, for example, the reference-side vertical signal line $VSL_{2k}$. Furthermore, the drain of the P-type transistor 346 is connected to, for example, the read-side vertical signal line $VSL_{2k+1}$. Such a current mirror circuit is called a cascode current mirror circuit.

As described above, according to the seventh embodiment of the present technology, since the cascode current mirror circuit is arranged, the fluctuation in the pixel signal Vout due to the fluctuation in the power supply voltage can be suppressed as compared with the case where the normal current mirror circuit that is not cascode-connected is arranged.

8. Eighth Embodiment

In the above-described first embodiment, the switch 410, the ADC 420, and the synthesis processing unit 430 are arranged for each column in the column signal processing unit 14, but there is a possibility that as the number of columns increases, the circuit scale of the column signal processing unit 14 increases. The solid-state imaging element 10 of the eighth embodiment differs from that of the first embodiment in that the switch 410 is omitted.

Figure 27:
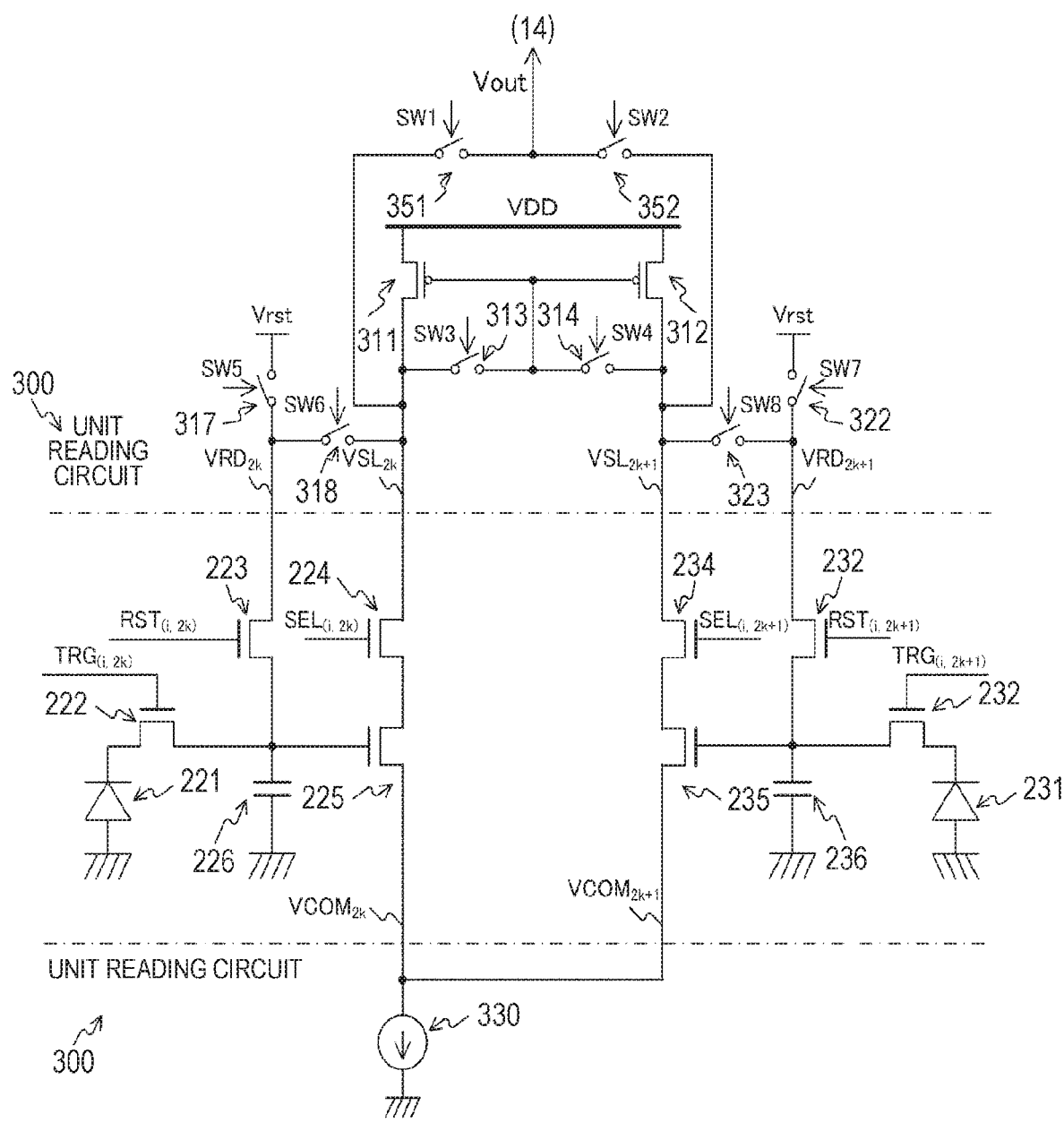
FIG. 27 is a circuit diagram illustrating a configuration example of a differential amplifier circuit according to an eighth embodiment of the present technology.

FIG. 27 is a circuit diagram illustrating a configuration example of the differential amplifier circuit according to the eighth embodiment of the present technology. The differential amplifier circuit of the eighth embodiment differs from that of the first embodiment in that switches 351 and 352 are further arranged in the unit reading circuit 300.

The switch 351 connects the vertical signal line $VSL_{2k}$ to the column signal processing unit 14 according to a drive signal SW1 from the system control unit 16. For example, when the high level drive signal SW1 is supplied, the switch 351 connects the vertical signal line $VSL_{2k}$ to the column signal processing unit 14.

The switch 352 connects the vertical signal line $VSL_{2k+1}$ to the column signal processing unit 14 according to a drive signal SW2 from the system control unit 16. For example, when the high level drive signal SW2 is supplied, the switch 352 connects the vertical signal line $VSL_{2k+1}$ to the column signal processing unit 14.

Furthermore, in the eighth embodiment, a drive signal SW3 is input to the switch 313, and a drive signal SW4 is input to the switch 314. Furthermore, a drive signal SW5 is input to the switch 317, and a drive signal SW6 is input to the switch 318. A drive signal SW7 is input to the switch 322, and a drive signal SW8 is input to the switch 323.

Furthermore, the switch 410 is not arranged in the column signal processing unit 14 of the eighth embodiment.

Figure 28:
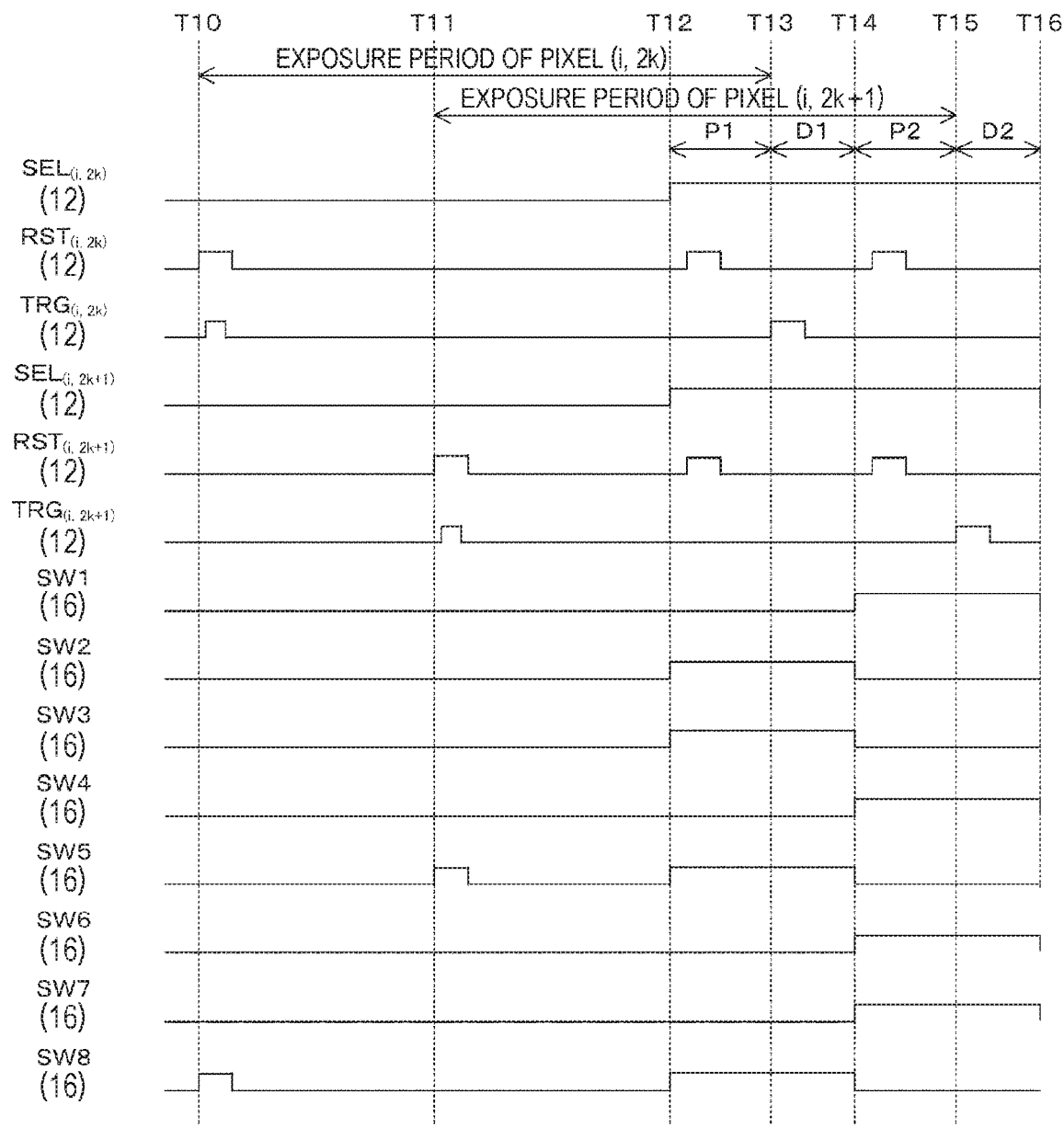
FIG. 28 is a timing chart illustrating an example of an operation of a solid-state imaging element according to the eighth embodiment of the present technology.

FIG. 28 is a timing chart illustrating an example of an operation of the solid-state imaging element 10 according to the eighth embodiment of the present technology. At timing T10, the vertical drive unit 12 supplies the drive signals $RST_{(i,2k)}$ and $TRG_{(i,2k)}$ to start the exposure of a pixel (i,2k). At timing T11, the vertical drive unit 12 supplies the drive signals $RST_{(i,2k+1)}$ and $TRG_{(i,2k+1)}$ to start the exposure of a pixel (i,2k+1).

At timing T12, the vertical drive unit 12 supplies the drive signals $RST_{(i,2k)}$ and $RST_{(i,2k+1)}$ to generate a P-phase level. At timing T13, the vertical drive unit 12 supplies the drive signal $TRG_{(i,2k)}$ to end the exposure of the pixel (i,2k) and generates a D-phase level.

At timing T14, the vertical drive unit 12 supplies the drive signals $RST_{(i,2k)}$ and $RST_{(i,2k+1)}$ to generate a P-phase level. At timing T15, the vertical drive unit 12 supplies the drive signal $TRG_{(i,2k+1)}$ to end the exposure of the pixel (i,2k+1) and generates a D-phase level.

On the other hand, the system control unit 16 supplies the drive signal SW8 at the timing T10 and supplies the drive signal SW5 at the timing T11. Furthermore, the system control unit 16 sets the drive signals SW2, SW3, SW5, and SW8 to high level and the rest to low level during the timings T12 to T14. The system control unit 16 sets the drive signals SW1, SW4, SW6, and SW7 to high level and the rest to low level during the timings T14 to T16.

By the above control, the P1 level is AD-converted during the timings T12 to T13, and the D1 level is AD-converted during the timings T13 to T14. Furthermore, the P2 level is AD-converted during the timings T14 to T15, and the D2 level is AD-converted during the timings T15 to T16.

As described above, in the eighth embodiment of the present technology, since the switches 351 and 352 for switching the vertical signal lines are arranged in the unit reading circuit 300, it is not necessary to arrange the switch 410 having the same functions as the switches 351 and 352 in the column signal processing unit 14. Therefore, the circuit scale of the column signal processing unit 14 can be reduced.

9. Ninth Embodiment

In the above-described first embodiment, in the differential reading, the AD conversion is performed using the reference signal $V_{slope}$ having the amplitude range similar to that in the SF reading, but there is a possibility that with this configuration, the power consumption cannot be reduced sufficiently. The solid-state imaging element 10 of the ninth embodiment is different from that of the first embodiment in that the current in the DAC is controlled to reduce the power consumption.

Figure 29:
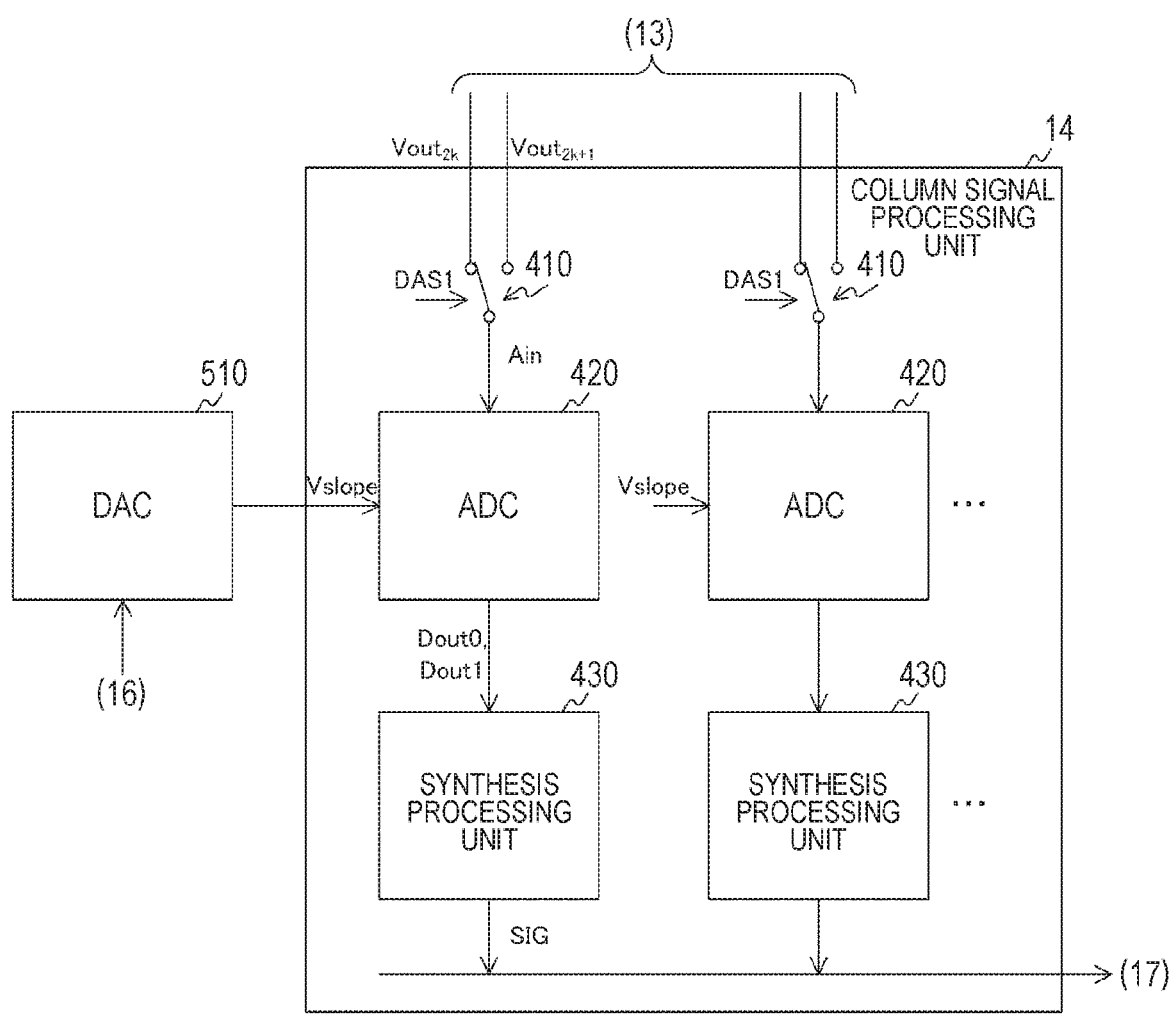
FIG. 29 is a block diagram illustrating a configuration example of a solid-state imaging element according to a ninth embodiment of the present technology.

FIG. 29 is a block diagram illustrating a configuration example of the solid-state imaging element 10 according to the ninth embodiment of the present technology. A DAC 510 is arranged in the solid-state imaging element 10 of the ninth embodiment.

The DAC 510 generates the reference signal $V_{slope}$ according to the control signal from the system control unit 16 and supplies it to a comparator 520.

Figure 30:
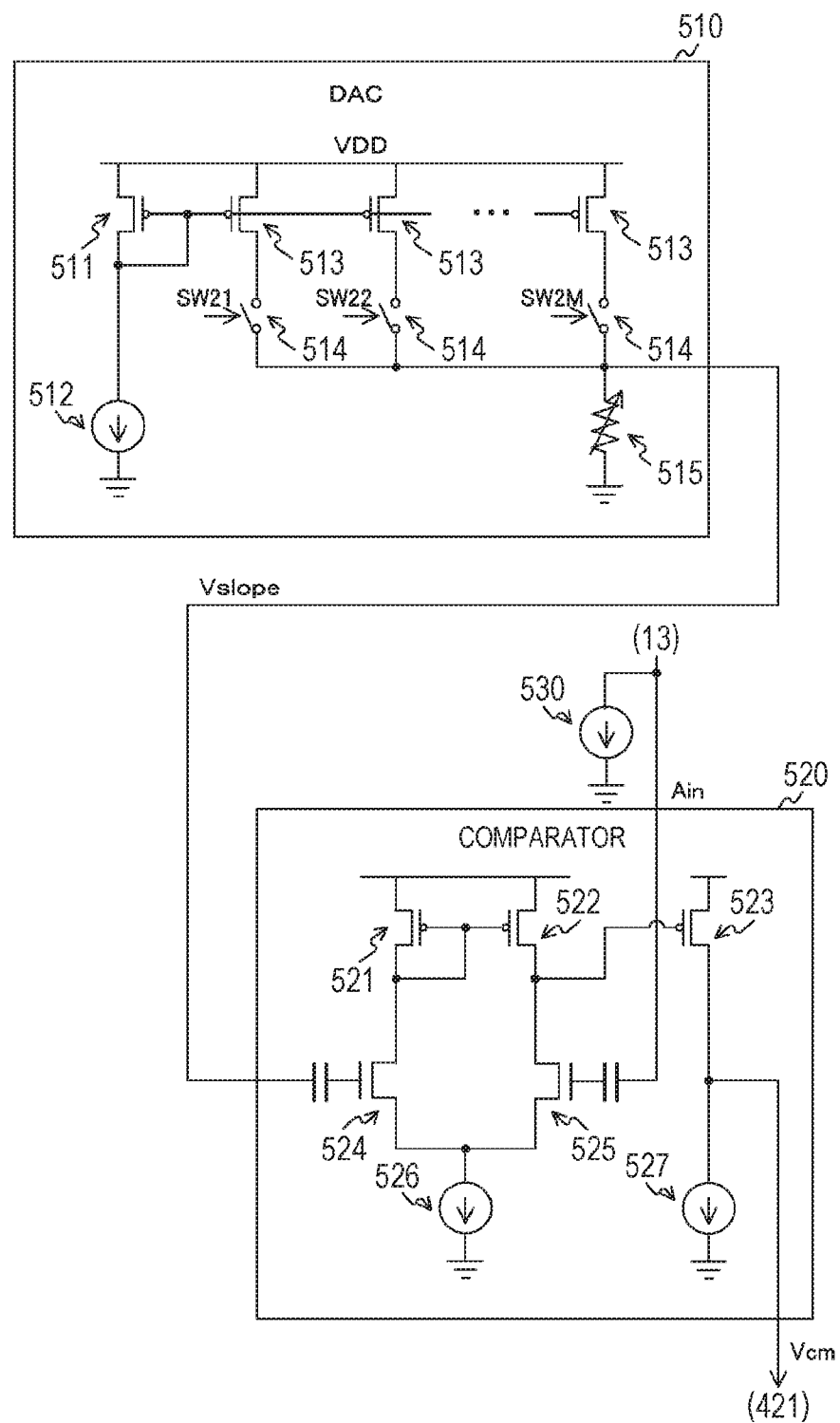
FIG. 30 is a circuit diagram illustrating a configuration example of a digital to analog converter (DAC) and a comparator according to the ninth embodiment of the present technology.

FIG. 30 is a circuit diagram illustrating a configuration example of the DAC 510 and the comparator 520 according to the ninth embodiment of the present technology. The DAC 510 includes a P-type transistor 511, a current source 512, a plurality of P-type transistors 513, a plurality of switches 514, and a variable resistor 515. M (M is an integer) P-type transistors 513 are arranged, and the switch 514 is provided for each P-type transistor 513. As the P-type transistor, for example, a MOS transistor is used.

The current source 512 is to generate a predetermined reference current. The system control unit 16 can control the value of this reference current. For example, in the differential reading, the system control unit 16 generates a reference current $I_{DA\_D}$, and in the SF reading, generates a reference current $I_{DA\_S}$ different from $I_{DS\_A}$.

The P-type transistor 511 and the plurality of P-type transistors 513 are connected in parallel to the terminal of the power supply voltage. Furthermore, the gate of the P-type transistor 511 is connected to each gate of the plurality of P-type transistors 513. The drain of the P-type transistor 511 is connected to the current source 512 and its gate.

The switch 514 connects the drain of the corresponding P-type transistor 513 to the variable resistor 515 according to a control signal SW2m (m is an integer of 1 to M) from the system control unit 16. For example, when the high level control signal SW2m is supplied, the switch 514 connects the drain of the corresponding P-type transistor 513 to the variable resistor 515.

The reference signal $V_{slope}$ is output from the connection point between the variable resistor 515 and the switch 514. The system control unit 16 can control the resistance value of the variable resistor 515. For example, it is controlled to a resistance value of R_D in the differential reading, and it is controlled to a resistance value of R_S in the SF reading.

The P-type transistor 511 and the M P-type transistors 513 described above constitute a current mirror circuit. The system control unit 16 turns on and off the M switches 514 in a time division manner to change the current flowing from the current mirror circuit to the variable resistor 515 to generate the slope-shaped reference signal $V_{slope}$.

Furthermore, the comparator 520 includes P-type transistors 521, 522, and 523, N-type transistors 524 and 525, and current sources 526 and 527. As the transistors, for example, a MOS transistor is used.

The P-type transistors 521 and 522 are connected in parallel to the terminal of the power supply voltage. The gate of the P-type transistor 521 is connected to its drain and the gate of the P-type transistor 522. The drain of the P-type transistor 521 is connected to the drain of the N-type transistor 524. The drain of the P-type transistor 522 is connected to the gate of the P-type transistor 523 and the drain of the N-type transistor 525.

The N-type transistors 524 and 525 constitute a differential pair, and the reference signal $V_{slope}$ is input to the gate of the N-type transistor 524. On the other hand, the analog signal Ain is input to the gate of the N-type transistor 525. The sources of the N-type transistors 524 and 525 are commonly connected to the current source 526.

The P-type transistor 523 and the current source 527 are connected in series to the terminal of the power supply voltage, and the comparison result Vcm is output from their connection point. A tail current flowing through the current source 526 during differential reading is $I_{CM\_D1}$ and an output current flowing through the current source 527 is $I_{CM\_D2}$. Furthermore, a tail current flowing through the current source 526 during SF reading is $I_{CM\_S1}$, and an output current flowing through the current source 527 is $I_{CM\_S2}$.

Furthermore, a load MOS circuit 530 is connected to the signal line that transmits the analog signal Ain. A load current flowing through the load MOS circuit 530 during differential reading is $I_{LM\_D}$, and a load current flowing during SF reading is $I_{LM\_S}$. There is an advantage that the larger the current value, the lower the noise and the faster the response speed, but there is a disadvantage that the power consumption increases and the amplitude range of the output signal decreases. The load currents $I_{LM\_D}$ and $I_{LM\_S}$ have different current values, and a current value suitable for each reading mode can be set by controlling the reference current. For example, when the load current $I_{LM\_D}$ is made larger than the load current $I_{LM\_S}$, noise can be reduced during differential amplification reading that is intended for imaging in dark places, and the signal amplitude range can be expanded during SF reading that is intended for imaging in bright places.

Furthermore, in the DAC 510, the reference currents $I_{DA\_D}$ and $I_{DA\_S}$ have different current values, and the current value suitable for each reading mode can be set by controlling the system control unit 16. For example, the reference current $I_{DA\_D}$ is assumed to be smaller than the reference current $I_{DA\_S}$ and the resistance value R_D is assumed to be larger than the resistance value R_S. In the DAC 510, the thermal noise of the variable resistor 515 is the dominant component of the total noise, and the smaller the resistance value, the lower the noise. However, even when a large resistance value is used during differential reading and the noise of the DAC is deteriorated, because the conversion efficiency is high, the influence on image quality due to the noise deterioration at a subsequent stage is a negligible level. Further, because the current value is small, power consumption can be reduced.

Furthermore, there is an advantage that the larger the current value of current flowing through the current sources 526 and 527 in the comparator, the lower the noise and the faster the response speed, but there is a disadvantage that the power consumption increases and the amplitude range of the output signal decreases. The tail current $I_{CM\_D1}$ and the tail current $I_{CM\_S1}$ have different current values, and the output current $I_{CM\_D2}$ and the output current $I_{CM\_S2}$ have different current values. For example, when the tail current $I_{CM\_D1}$ is made smaller than the tail current $I_{CM\_S1}$ and the output current $I_{CM\_D2}$ is made smaller than the output current $I_{CM\_S2}$, it is possible to reduce the power consumption during the differential reading. Instead, the noise of the comparator 520 is deteriorated, but since the conversion efficiency is high due to the differential reading, the influence on image quality due to noise deterioration at a subsequent stage is negligibly small level.

As described above, in the ninth embodiment of the present technology, the reference current and the load current in the DAC 510 are reduced during the differential reading, so that the power consumption during the differential reading can be reduced.

10. Application Examples to Mobile Objects

The technology according to the present disclosure (present technology) is applicable to a variety of products. For example, the technology according to the present disclosure may be implemented as apparatuses mounted on any type of movable bodies such as automobiles, electric vehicles, hybrid electric vehicles, motorcycles, bicycles, personal mobilities, airplanes, drones, ships, or robots.

Figure 31:
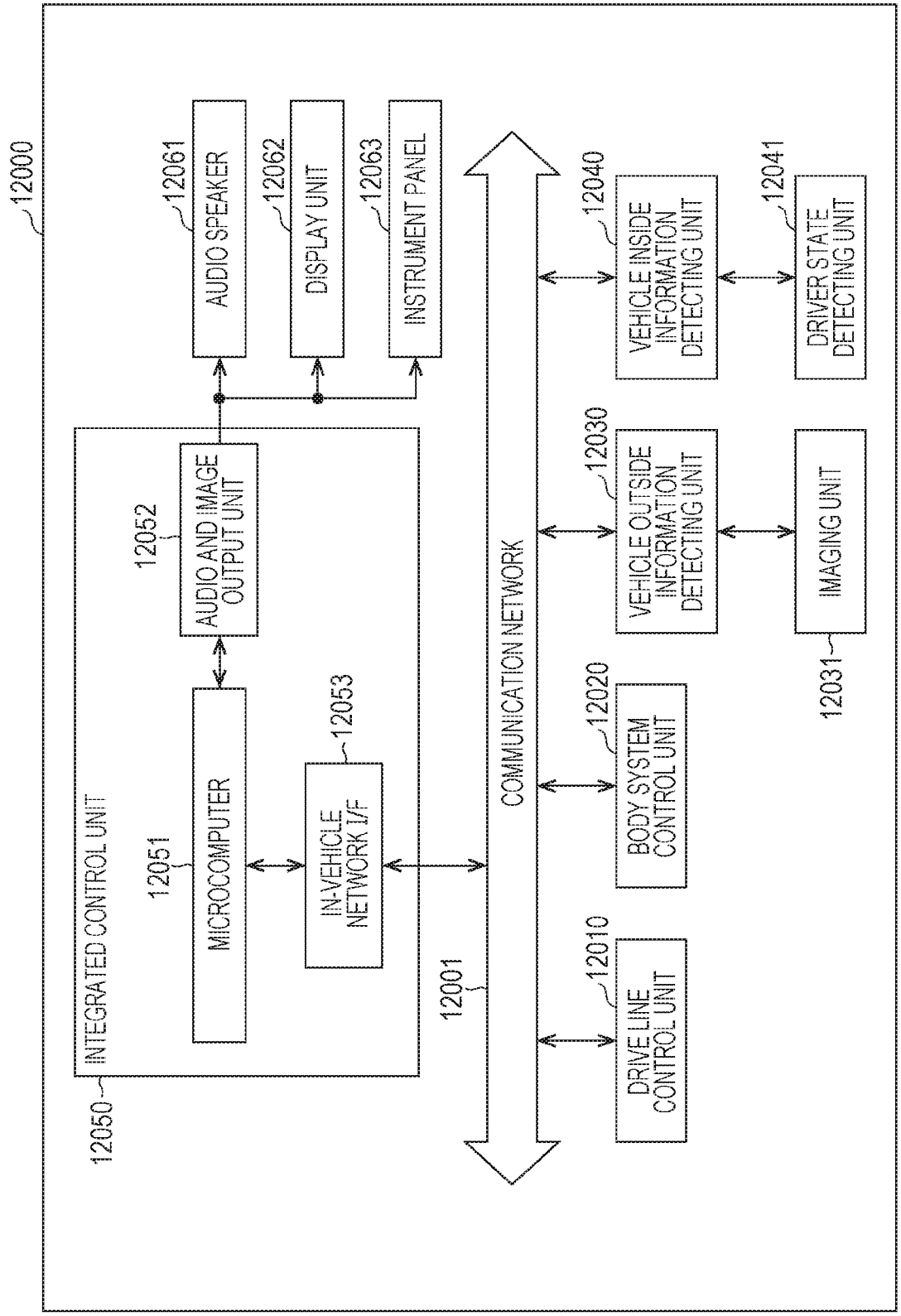
FIG. 31 is a block diagram illustrating a schematic configuration example of a vehicle control system.

FIG. 31 is a block diagram illustrating a schematic configuration example of a vehicle control system, which is an example of a movable body control system to which the technology according to the present disclosure can be applied.

The vehicle control system 12000 includes a plurality of electronic control units connected via a communication network 12001. In the example illustrated in FIG. 31, the vehicle control system 12000 includes a drive line control unit 12010, a body system control unit 12020, a vehicle outside information detecting unit 12030, a vehicle inside information detecting unit 12040, and an integrated control unit 12050. Furthermore, a microcomputer 12051, an audio and image output unit 12052, and an in-vehicle network interface (I/F) 12053 are illustrated as functional configurations of the integrated control unit 12050.

The drive line control unit 12010 controls the operation of apparatuses related to the drive line of the vehicle in accordance with a variety of programs. For example, the drive line control unit 12010 functions as a control apparatus for a driving force generating apparatus such as an internal combustion engine or a driving motor that generates the driving force of the vehicle, a driving force transferring mechanism that transfers the driving force to wheels, a steering mechanism that adjusts the steering angle of the vehicle, a braking apparatus that generates the braking force of the vehicle, and the like.

The body system control unit 12020 controls the operations of a variety of apparatuses attached to the vehicle body in accordance with a variety of programs. For example, the body system control unit 12020 functions as a control apparatus for a keyless entry system, a smart key system, a power window apparatus, or a variety of lights such as a headlight, a backup light, a brake light, a blinker, or a fog lamp. In this case, the body system control unit 12020 can receive radio waves transmitted from a portable device that serves instead of the key or signals of a variety of switches. The body system control unit 12020 accepts input of these radio waves or signals, and controls the door lock apparatus, the power window apparatus, the lights, or the like of the vehicle.

The vehicle outside information detecting unit 12030 detects information regarding the outside of the vehicle including the vehicle control system 12000. For example, the imaging unit 12031 is connected to the vehicle outside information detecting unit 12030. The vehicle outside information detecting unit 12030 causes the imaging unit 12031 to capture images of the outside of the vehicle, and receives the captured image. The vehicle outside information detecting unit 12030 may perform processing of detecting an object such as a person, a car, an obstacle, a traffic sign, or a letter on a road, or processing of detecting the distance on the basis of the received image.

The imaging unit 12031 is an optical sensor that receives light and outputs an electric signal corresponding to the amount of received light. The imaging unit 12031 can output the electric signal as the image or output the electric signal as ranging information. Furthermore, the light received by the imaging unit 12031 may be visible light or invisible light such as infrared light.

The vehicle inside information detecting unit 12040 detects information of the inside of the vehicle. The vehicle inside information detecting unit 12040 is connected, for example, to a driver state detecting unit 12041 that detects the state of the driver. The driver state detecting unit 12041 includes, for example, a camera that images a driver, and the vehicle inside information detecting unit 12040 may compute the degree of the driver's tiredness or the degree of the driver's concentration or determine whether or not the driver has a doze, on the basis of detection information input from the driver state detecting unit 12041.

The microcomputer 12051 can calculate a control target value of the driving force generating apparatus, the steering mechanism, or the braking apparatus on the basis of information regarding the inside and outside of the vehicle acquired by the vehicle outside information detecting unit 12030 or the vehicle inside information detecting unit 12040, and output a control instruction to the drive line control unit 12010. For example, the microcomputer 12051 can perform cooperative control for the purpose of executing the functions of the advanced driver assistance system (ADAS) including vehicle collision avoidance or impact reduction, follow-up driving based on the inter-vehicle distance, constant vehicle speed driving, vehicle collision warning, vehicle lane deviation warning, or the like.

Furthermore, the microcomputer 12051 can perform cooperative control for the purpose of automatic driving or the like for autonomous running without depending on the driver's manipulation through control of the driving force generating apparatus, the steering mechanism, the braking apparatus, or the like on the basis of information around the vehicle acquired by the vehicle outside information detecting unit 12030 or the vehicle inside information detecting unit 12040.

Furthermore, the microcomputer 12051 can output a control instruction to the body system control unit 12020 on the basis of the information outside the vehicle obtained by the vehicle outside information detecting unit 12030. For example, the microcomputer 12051 can perform the cooperative control for realizing glare protection such as controlling the head light according to a position of a preceding vehicle or an oncoming vehicle detected by the vehicle outside information detecting unit 12030 to switch a high beam to a low beam.

The audio and image output unit 12052 transmits an output signal of at least one of a sound or an image to an output apparatus capable of visually or aurally notifying a passenger of the vehicle or the outside of the vehicle of information. In the example of FIG. 31, an audio speaker 12061, a display unit 12062, and an instrument panel 12063 are exemplified as the output apparatus. For example, the display unit 12062 may include at least one of an onboard display or a head-up display.

Figure 32:
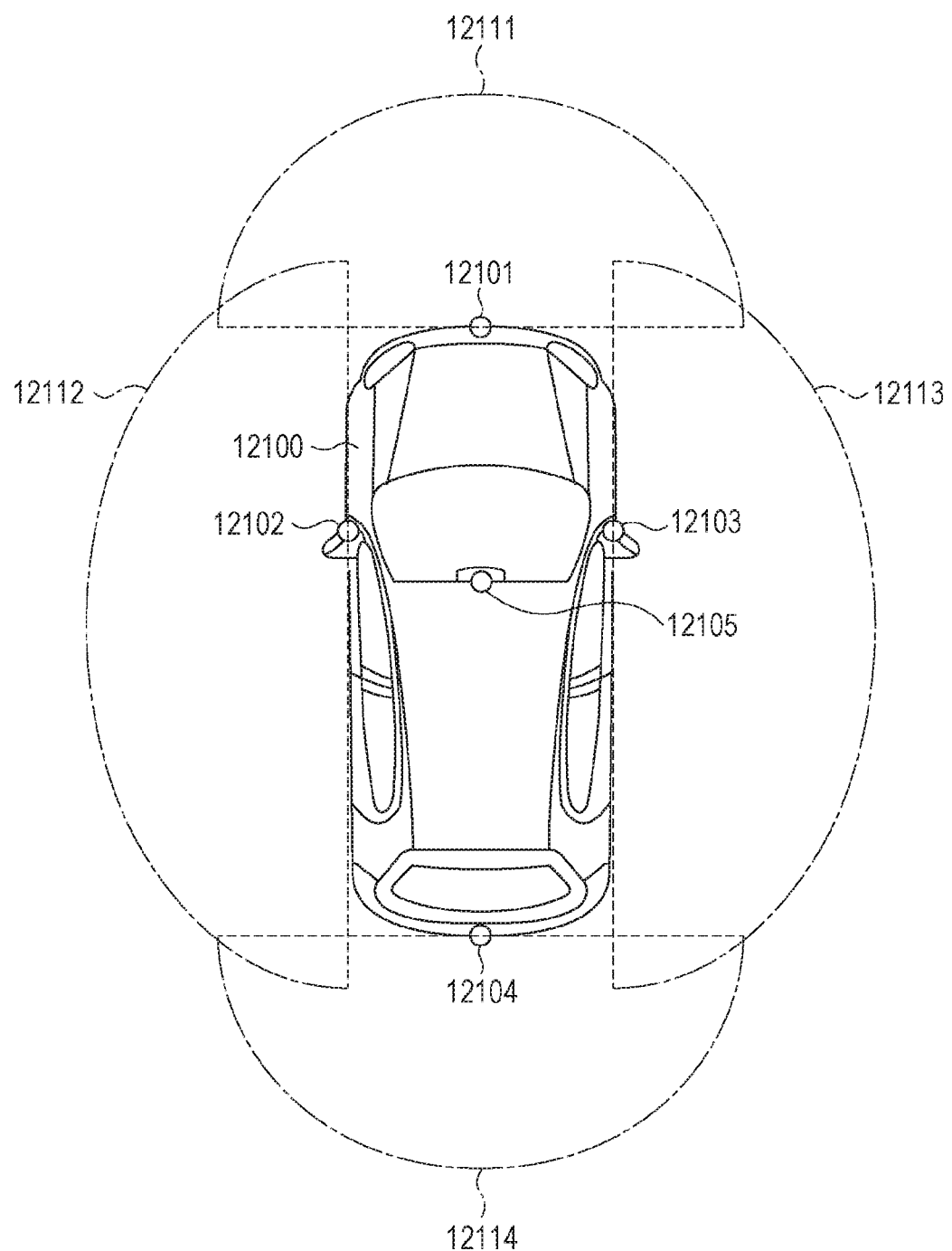
FIG. 32 is an explanatory diagram illustrating an example of an installation position of an imaging unit.

FIG. 32 is a view illustrating an example of an installation position of the imaging unit 12031.

In FIG. 32, imaging units 12101, 12102, 12103, 12104, and 12105 are provided as the imaging unit 12031.

Imaging units 12101, 12102, 12103, 12104, and 12105 are positioned, for example, at the front nose, a side mirror, the rear bumper, the back door, the upper part of the windshield in the vehicle compartment, or the like of the vehicle 12100. The imaging unit 12101 attached to the front nose and the imaging unit 12105 attached to the upper part of the windshield in the vehicle compartment mainly acquire images of the area ahead of the vehicle 12100. The imaging units 12102 and 12103 attached to the side mirrors mainly acquire images of the areas on the sides of the vehicle 12100. The imaging unit 12104 attached to the rear bumper or the back door mainly acquires images of the area behind the vehicle 12100. The imaging unit 12105 attached to the upper part of the windshield in the vehicle compartment is used mainly to detect a preceding vehicle, a pedestrian, an obstacle, a traffic light, a traffic sign, a lane, or the like.

Note that FIG. 32 illustrates an example of the respective imaging ranges of the imaging units 12101 to 12104. An imaging range 12111 represents the imaging range of the imaging unit 12101 attached to the front nose. Imaging ranges 12112 and 12113 respectively represent the imaging ranges of the imaging units 12102 and 12103 attached to the side mirrors. An imaging range 12114 represents the imaging range of the imaging unit 12104 attached to the rear bumper or the back door. For example, overlaying image data captured by the imaging units 12101 to 12104 offers an overhead image that looks down on the vehicle 12100.

At least one of the imaging units 12101 to 12104 may have a function of obtaining distance information. For example, at least one of the imaging units 12101 to 12104 may be a stereo camera including a plurality of image sensors, or may be an image sensor having pixels for phase difference detection.

For example, the microcomputer 12051 may extract especially a closest three-dimensional object on a traveling path of the vehicle 12100, the three-dimensional object traveling at a predetermined speed (for example, 0 km/h or higher) in a direction substantially the same as that of the vehicle 12100 as the preceding vehicle by determining a distance to each three-dimensional object in the imaging ranges 12111 to 12114 and change in time of the distance (relative speed relative to the vehicle 12100) on the basis of the distance information obtained from the imaging units 12101 to 12104. Moreover, the microcomputer 12051 can set an inter-vehicle distance to be secured in advance from the preceding vehicle, and can perform automatic brake control (including follow-up stop control), automatic acceleration control (including follow-up start control), and the like. In this manner, it is possible to perform the cooperative control for realizing automatic driving or the like to autonomously travel independent from the manipulation of the driver.

For example, the microcomputer 12051 can extract three-dimensional object data regarding the three-dimensional object while sorting the data into a two-wheeled vehicle, a regular vehicle, a large vehicle, a pedestrian, and other three-dimensional object such as a utility pole on the basis of the distance information obtained from the imaging units 12101 to 12104 and use the data for automatically avoiding obstacles. For example, the microcomputer 12051 discriminates obstacles around the vehicle 12100 into an obstacle visibly recognizable to a driver of the vehicle 12100 and an obstacle difficult to visually recognize. Then, the microcomputer 12051 determines a collision risk indicating a degree of risk of collision with each obstacle, and when the collision risk is equal to or higher than a setting value and there is a possibility of collision, the microcomputer 12051 can perform driving assistance for avoiding the collision by outputting an alarm to the driver via the audio speaker 12061 and the display unit 12062 or performing forced deceleration or avoidance steering via the drive line control unit 12010.

At least one of the imaging units 12101 to 12104 may be an infrared camera for detecting infrared rays. For example, the microcomputer 12051 can recognize a pedestrian by determining whether or not there is a pedestrian in the captured images of the imaging units 12101 to 12104. Such pedestrian recognition is carried out, for example, by a procedure of extracting feature points in the captured images of the imaging units 12101 to 12104 as infrared cameras and a procedure of performing pattern matching processing on a series of feature points indicating an outline of an object to discriminate whether or not the object is a pedestrian. When the microcomputer 12051 determines that there is a pedestrian in the captured images of the imaging units 12101 to 12104 and recognizes the pedestrian, the audio and image output unit 12052 causes the display unit 12062 to superimpose a rectangular contour for emphasis on the recognized pedestrian. Furthermore, the audio and image output unit 12052 may causes the display unit 12062 to display icons or the like indicating pedestrians at desired positions.

An example of the vehicle control system to which the technology according to the present disclosure is applicable is heretofore described. The technology according to the present disclosure can be applied to the imaging unit 12031 among the configurations described above. For example, the solid-state imaging element 10 of FIG. 1 can be applied to the imaging unit 12031. By applying the technology according to the present disclosure to the imaging unit 12031, the dynamic range can be widened and a captured image that is more viewable can be obtained, and thus driver fatigue can be reduced.

Note that the embodiments described above are examples for embodying the present technology, and matters in the embodiments each have a corresponding relationship with invention-specifying matters in the claims. Similarly, the invention-specifying matters in the claims each have a corresponding relationship with matters in the embodiments of the present technology denoted by the same names. However, the present technology is not limited to the embodiments, and can be embodied by subjecting the embodiments to various variation in the scope without departing from the spirit.

Furthermore, the processing sequences described in the embodiments described above may be regarded as a method having a series of sequences or may be regarded as a program for causing a computer to execute the series of sequences or a recording medium storing the program. As the recording medium, for example, a Compact Disc (CD), a MiniDisc (MD), and a Digital Versatile Disc (DVD), a memory card, a Blu-ray (registered trademark) disc, and the like can be used.

Note that the effects described in the present description are merely illustrative and are not limitative, and other effects may be provided.

Note that the present technology may be configured as below.

(1) A solid-state imaging element including:

a reading circuit that performs processing of outputting a differentially amplified signal obtained by amplifying a difference between generated voltages of a pair of pixels and processing of outputting a pixel signal of the generated voltage of at least one of the pair of pixels each time the pair of pixels are exposed; and a processing unit that performs synthesis processing of synthesizing the output differentially amplified signal and the output pixel signal.

(2) The solid-state imaging element according to (1), in which each of the pair of pixels generates a reset level as the generated voltage when initialized, and generates a signal level as the generated voltage when exposure is ended.

(3) The solid-state imaging element according to (2), in which the reading circuit outputs at least one of a first reset level obtained by differentially amplifying the reset level of each of the pair of pixels or a second reset level that is the reset level of one of the pair of pixels, and outputs a first signal level obtained by differentially amplifying the signal level of each of the pair of pixels and a second signal level that is the signal level of one of the pair of pixels.

(4) The solid-state imaging element according to (3), in which the reading circuit outputs the first signal level and the second signal level after outputting the first reset level and the second reset level.

(5) The solid-state imaging element according to (3), in which the reading circuit further outputs the second signal level and the second reset level after outputting the first reset level and the first signal level.

(6) The solid-state imaging element according to (5), in which the processing unit includes:

an analog-digital converter that sequentially converts the first reset level, the first signal level, the second signal level, and the second reset level into a digital signal in a case where illuminance is higher than a predetermined value, and sequentially converts the first reset level and the first signal level into a digital signal in a case where the illuminance is less than the predetermined value; and a synthesis processing unit that performs the synthesis processing on the basis of the digital signal.

(7) The solid-state imaging element according to any of (3) to (6), in which the processing unit selects and outputs the differentially amplified signal in a case where illuminance is less than a predetermined value, and selects and outputs the pixel signal in a case where the illuminance exceeds the predetermined value.

(8) The solid-state imaging element according to (3), in which the reading circuit outputs one of the first signal level and the second signal level after outputting the first reset level and the second reset level.

(9) The solid-state imaging element according to any of (1) to (8), in which in the reading circuit, a plurality of unit reading circuits each including a current mirror circuit, a current source, and a switch is arranged in a predetermined direction, and the switch connects the current mirror circuit and the current source of each of the plurality of unit reading circuits to each other.

(10) The solid-state imaging element according to any of (1) to (9), further including a pixel array unit in which a plurality of pixels is arranged in a two-dimensional grid pattern, in which the pair of pixels are horizontally arranged in the pixel array unit.

(11) The solid-state imaging element according to any of (1) to (9), further including a pixel array unit in which a plurality of pixels is arranged in a two-dimensional grid pattern, in which the pair of pixels are vertically arranged in the pixel array unit.

(12) The solid-state imaging element according to any of (1) to (9), further including a pixel array unit in which a plurality of pixels to each of which a vertical address and a horizontal address are assigned is arranged in a two-dimensional grid pattern, in which the pair of pixels are pixels in which the vertical addresses and the horizontal addresses are different from each other in the pixel array unit.

(13) The solid-state imaging element according to any of (1) to (12), further including a pixel array unit in which a plurality of read pixels and a reference pixel associated with the plurality of read pixels are arranged, in which one of the pair of pixels is one of the plurality of read pixels, and another of the pair of pixels is the reference pixel, the reading circuit performs processing of outputting a differentially amplified signal obtained by amplifying a difference between pixel signals of the read pixel and the reference pixel, and processing of outputting the pixel signal of the read pixel.

(14) The solid-state imaging element according to any of (1) to (13), in which the reading circuit includes a current mirror circuit.

(15) The solid-state imaging element according to (14), in which the current mirror circuit includes a cascode current mirror circuit.

(16) The solid-state imaging element according to (14) or (15), in which the current mirror circuit is connected to a pair of vertical signal lines, and the reading circuit further includes a switch that selects one of the pair of vertical signal lines and connects the vertical signal line to the processing unit.

(17) The solid-state imaging element according to any of (1) to (16), further including:

a digital-analog converter that includes a current source that generates a predetermined reference current and a resistor that generates a predetermined reference signal according to the reference current; and a system control unit that controls a value of the reference current, in which the processing unit includes a comparator that compares a signal output by the reading circuit with a predetermined reference signal.

(18) An imaging apparatus including:

a pair of pixels;

a reading circuit that performs processing of outputting a differentially amplified signal obtained by amplifying a difference between generated voltages of the pair of pixels and processing of outputting a pixel signal of the generated voltage of at least one of the pair of pixels each time the pair of pixels are exposed; and a processing unit that performs synthesis processing of synthesizing the output differentially amplified signal and the output pixel signal.

(19) A method for controlling a solid-state imaging element, the method including:

a reading procedure that performs processing of outputting a differentially amplified signal obtained by amplifying a difference between generated voltages of a pair of pixels and processing of outputting a pixel signal of the generated voltage of at least one of the pair of pixels each time the pair of pixels are exposed; and a processing procedure that performs synthesis processing of synthesizing the output differentially amplified signal and the output pixel signal.

REFERENCE SIGNS LIST

10 Solid-state imaging element
11 Pixel array unit
12 Vertical drive unit
13 Column reading circuit unit
14 Column signal processing unit
15 Horizontal drive unit
16 System control unit
17 Signal processing unit
18 Data storage unit
220, 230 Pixel
221, 231, 241, 251 Photodiode
222, 232, 242, 252 Transfer transistor
223, 233, 243, 253 Reset transistor
224, 234, 244, 254 Amplification transistor
225, 235, 245, 255 Selection transistor
226, 236, 246, 256 Floating diffusion region
240 Read pixel
250 Reference pixel
300 Unit reading circuit
311, 312, 345, 346, 511, 513, 521 to 523 P-type transistor
313 to 329, 333, 334, 351, 352, 410, 423, 433, 434, 514 Switch
330, 331, 332, 512, 526, 527 Current source
420 ADC
421, 422 Counter
430 Synthesis processing unit
431 Multiplier
432 Determination circuit
435 Memory
510 DAC
515 Variable resistance
520 Comparator
524, 525 N-type transistor
530 Load MOS circuit
12031 Imaging unit

The invention claimed is:

1. A solid-state imaging element comprising:
a reading circuit that performs processing of outputting a differentially amplified signal obtained by amplifying a difference between generated voltages of a pair of pixels and processing of outputting a pixel signal of the generated voltage of at least one of the pair of pixels each time the pair of pixels are exposed; and
a processing unit that performs synthesis processing of synthesizing the output differentially amplified signal and the output pixel signal.

2. The solid-state imaging element according to claim 1, wherein
each of the pair of pixels generates a reset level as the generated voltage when initialized, and generates a signal level as the generated voltage when exposure is ended.

3. The solid-state imaging element according to claim 2, wherein
the reading circuit outputs at least one of a first reset level obtained by differentially amplifying the reset level of each of the pair of pixels or a second reset level that is the reset level of one of the pair of pixels, and outputs a first signal level obtained by differentially amplifying the signal level of each of the pair of pixels and a second signal level that is the signal level of one of the pair of pixels.

4. The solid-state imaging element according to claim 3, wherein
the reading circuit outputs the first signal level and the second signal level after outputting the first reset level and the second reset level.

5. The solid-state imaging element according to claim 3, wherein
the reading circuit further outputs the second signal level and the second reset level after outputting the first reset level and the first signal level.

6. The solid-state imaging element according to claim 5, wherein
the processing unit includes:
an analog-digital converter that sequentially converts the first reset level, the first signal level, the second signal level, and the second reset level into a digital signal in a case where illuminance is higher than a predetermined value, and sequentially converts the first reset level and the first signal level into a digital signal in a case where the illuminance is less than the predetermined value; and
a synthesis processing unit that performs the synthesis processing on a basis of the digital signal.

7. The solid-state imaging element according to claim 3, wherein
the processing unit selects and outputs the differentially amplified signal in a case where illuminance is less than a predetermined value, and selects and outputs the pixel signal in a case where the illuminance exceeds the predetermined value.

8. The solid-state imaging element according to claim 3, wherein
the reading circuit outputs one of the first signal level and the second signal level after outputting the first reset level and the second reset level.

9. The solid-state imaging element according to claim 1, wherein
in the reading circuit, a plurality of unit reading circuits each including a current mirror circuit, a current source, and a switch is arranged in a predetermined direction, and
the switch connects the current mirror circuit and the current source of each of the plurality of unit reading circuits to each other.

10. The solid-state imaging element according to claim 1, further comprising
a pixel array unit in which a plurality of pixels is arranged in a two-dimensional grid pattern, wherein
the pair of pixels are horizontally arranged in the pixel array unit.

11. The solid-state imaging element according to claim 1, further comprising
a pixel array unit in which a plurality of pixels is arranged in a two-dimensional grid pattern, wherein
the pair of pixels are vertically arranged in the pixel array unit.

12. The solid-state imaging element according to claim 1, further comprising
a pixel array unit in which a plurality of pixels to each of which a vertical address and a horizontal address are assigned is arranged in a two-dimensional grid pattern, wherein
the pair of pixels are pixels in which the vertical addresses and the horizontal addresses are different from each other in the pixel array unit.

13. The solid-state imaging element according to claim 1, further comprising
a pixel array unit in which a plurality of read pixels and a reference pixel associated with the plurality of read pixels are arranged, wherein
one of the pair of pixels is one of the plurality of read pixels, and another of the pair of pixels is the reference pixel,
the reading circuit performs processing of outputting a differentially amplified signal obtained by amplifying a difference between pixel signals of the read pixel and the reference pixel, and processing of outputting the pixel signal of the read pixel.

14. The solid-state imaging element according to claim 1, wherein
the reading circuit includes a current mirror circuit.

15. The solid-state imaging element according to claim 14, wherein
the current mirror circuit includes a cascode current mirror circuit.

16. The solid-state imaging element according to claim 14, wherein
the current mirror circuit is connected to a pair of vertical signal lines, and
the reading circuit further includes a switch that selects one of the pair of vertical signal lines and connects the vertical signal line to the processing unit.

17. The solid-state imaging element according to claim 1, further comprising:
a digital-analog converter that includes a current source that generates a predetermined reference current and a resistor that generates a predetermined reference signal according to the reference current; and
a system control unit that controls a value of the reference current, wherein the processing unit includes a comparator that compares a signal output by the reading circuit with a predetermined reference signal.

18. An imaging apparatus comprising:
a pair of pixels;
a reading circuit that performs processing of outputting a differentially amplified signal obtained by amplifying a difference between generated voltages of the pair of pixels and processing of outputting a pixel signal of the generated voltage of at least one of the pair of pixels each time the pair of pixels are exposed; and
a processing unit that performs synthesis processing of synthesizing the output differentially amplified signal and the output pixel signal.

19. A method for controlling a solid-state imaging element, the method comprising:
a reading procedure that performs processing of outputting a differentially amplified signal obtained by amplifying a difference between generated voltages of a pair of pixels and processing of outputting a pixel signal of the generated voltage of at least one of the pair of pixels each time the pair of pixels are exposed; and
a processing procedure that performs synthesis processing of synthesizing the output differentially amplified signal and the output pixel signal.

* * * * *